US012026700B2

(12) United States Patent
Maim

(10) Patent No.: US 12,026,700 B2
(45) Date of Patent: Jul. 2, 2024

(54) METHODS AND SYSTEMS FOR EXECUTING SMART CONTRACTS IN SECURE ENVIRONMENTS

(71) Applicant: Enrico Maim, Sceaux (FR)

(72) Inventor: Enrico Maim, Sceaux (FR)

( * ) Notice: Subject to any disclaimer, the term of this patent is extended or adjusted under 35 U.S.C. 154(b) by 0 days.

(21) Appl. No.: 18/170,986

(22) Filed: Feb. 17, 2023

(65) Prior Publication Data
US 2023/0206220 A1     Jun. 29, 2023

Related U.S. Application Data

(63) Continuation of application No. 16/477,631, filed as application No. PCT/IB2018/050247 on Jan. 16, (Continued)

(51) Int. Cl.
    *G06Q 20/36*      (2012.01)
    *G06F 21/51*      (2013.01)
    (Continued)

(52) U.S. Cl.
CPC ......... *G06Q 20/3674* (2013.01); *G06F 21/51* (2013.01); *G06Q 20/065* (2013.01); (Continued)

(58) Field of Classification Search
CPC ............. G06Q 20/3674; G06Q 20/065; G06Q 20/3678; G06Q 20/3823; G06Q 20/389; (Continued)

(56) References Cited

U.S. PATENT DOCUMENTS 9,584,517 B1    2/2017   Roth et al.
2016/0092988 A1   3/2016   Letourneau
(Continued)

FOREIGN PATENT DOCUMENTS

WO     2016120826 A2    8/2016

OTHER PUBLICATIONS

Town Crier ("Town Crier: An Authenticated Data Feed for Smart Contracts", Oct. 2016, 20 pages) (Year: 2016).*
(Continued)

*Primary Examiner* — James D Nigh
(74) *Attorney, Agent, or Firm* — Leason Ellis LLP

(57) ABSTRACT

Method for the secure execution of programs (smart contracts) implemented between a first wallet node (WN) (WN1) and a second wallet node (WN2), at least the second WN being implemented in an enclave of a processor, and the WNs being capable of executing programs designated in the messages that reach them, the method comprising the following steps: a) sending by WN1 to WN2 of a pre-message; b1) in response to this pre-message, execution in the enclave of a first program (WNRoT); b2) generation by the enclave of a certificate of authenticity of said first program and of the integrity of its execution; b3) sending said certificate to WN1; c) verification by WN1 of said certificate; d) in the event of successful verification, sending by WN1 to WN2 of a message intended to trigger the execution of a given program in WN2, and e) execution of said program in WN2.

20 Claims, 24 Drawing Sheets

Related U.S. Application Data 2018, now Pat. No. 11,587,070, which is a continuation of application No. PCT/IB2017/050228, filed on Jan. 16, 2017.

(60) Provisional application No. 62/462,390, filed on Feb. 23, 2017, provisional application No. 62/454,370, filed on Feb. 3, 2017.

(51) Int. Cl.
  *G06Q 20/06* (2012.01)
  *G06Q 20/38* (2012.01)
  *H04L 9/00* (2022.01)
  *H04L 9/32* (2006.01)
  *G09C 1/00* (2006.01)
  *H04L 9/40* (2022.01)

(52) U.S. Cl.
  CPC ..... *G06Q 20/3678* (2013.01); *G06Q 20/3823* (2013.01); *G06Q 20/389* (2013.01); *H04L 9/3236* (2013.01); *H04L 9/3247* (2013.01); *H04L 9/50* (2022.05); *H04L 2209/56* (2013.01)

(58) Field of Classification Search
  CPC .. G06Q 20/36; G06Q 20/367; G06Q 20/3829; G06Q 2220/00; G06F 21/51; H04L 9/3236; H04L 9/3247; H04L 9/50; H04L 9/3234; H04L 63/12; H04L 2209/56; G09C 1/00
  USPC .......................................................... 705/67
  See application file for complete search history.

(56) References Cited

U.S. PATENT DOCUMENTS

| | | | |
|---|---|---|---|
| 2016/0275461 | A1 | 9/2016 | Sprague et al. |
| 2016/0286391 | A1* | 9/2016 | Khan ................... G06Q 20/327 |
| 2017/0352027 | A1 | 12/2017 | Zhang et al. |
| 2018/0040007 | A1 | 2/2018 | Lane et al. |
| 2018/0114012 | A1* | 4/2018 | Sood ........................ G06F 21/79 |
| 2019/0095879 | A1 | 3/2019 | Eyal et al. |

OTHER PUBLICATIONS

Teechan ("Teechan: Payment Channels Using Trusted Execution Environments", Lind et al, Dec. 22, 2016, 14 pages) (Year: 2016).*
Ethereum Homestead Documentation, downloaded from Wayback Machine to show priority date availability: https://web.archive.org/web/20160322191520/http://www.ethdocs.org/en/latest/ attached as PDF file, dated Mar. 22, 2016 (Year: 2016).
Town Crier ("Town Crier: An Authenticated Data Feed for Smart Contracts", dated Oct. 2016, downloaded from https://dl.acm.org/doi/pdf/10.1145/2976749.2978326 and attached as PDF file) (Year: 2016).
Teechan ("Teechan: Payment Channels Using Trusted Execution Environments" by Joshua Lind, Ittay Eyal, Peter Pietzuch, and Emin Gun Sirer, dated Dec. 22, 2016, downloaded from https://arxiv.org/pdf/1612.07766v1.pdf and attached as a PDF file) (Year: 2016).
Restriction Requirement in U.S. Appl. No. 16/477,631, mailed Jul. 19, 2021 (9 pages).
Non Final Office Action in U.S. Appl. No. 16/477,631, mailed Jan. 7, 2022 (26 pages).
Lind et al. "Teechan: Payment channels using trusted execution environments." ARXIV.org, Cornell University Library, 201 Olin Library. Cornell University. Dec. 22, 2016. XP080742528. 15 pages.
Luu. "Using Secure Hardware to Harden Casper for Greater Defense In Depth." Jan. 4, 2017. XP055469269. Retrieved from https://medium.com/@loiluu/casper-sgx-8475e56244b [on Apr. 20, 2018]. 7 pages.
Khalil et al. "Revive: Rebalancing Off-Blockchain Payment Networks." Proceedings of the 2017 ACM SIGSAC Conference on Computer and Communications Security. ACM. 2017. 15 pages.
Miller et al. "Sprites and State Channels: Payment Networks that Go Faster than Lightning." Nov. 30, 2017 XP055489680. Retrieved from https://arxiv.org/pdf/1702.05812.pdf [on Jul. 3, 2018]. 24 pages.
No Author. "NEM Technical Reference Version 1.0." May 15, 2015. XP055491061. Retrieved from https://web.archive.org/web/20170914042746/https://nem.io/wp-content/themes/nem/files/NEM techRef.pdf [on Jul. 9, 2018]. 58 pages.
Gentilal et al. "TrustZone-Backed Bitcoin Wallet." Proceedings of the Fourth Workshop on Cryptography and Security in Computing Systems. ACM. Jan. 24, 2017. 4 pages.
Asokan et al. "Mobile Platform Security Trusted Execution Environments Summer School, 2014." Sep. 7, 2014. XP055202881 Retrieved from http://asokan.org/asokan/Padova2014/tutorial-mobileplatsec.pdf [on Jul. 16, 2015]. 122 pages.
Kokoris-Kogias et al. "Omniledger: A Secure, Scale-Out, Decentralized Ledger Via Sharding." IACR vol. 20171010:135000. May 11, 2017. XP061023391. Retrieved from http://eprint.iacr.org/2017/406.pdf [on May 11, 2017]. 17 pages.
Karst et al. "Connecting Multiple Devices with Blockchain in the Internet of Things." Jan. 5, 2017. XP055489909 Retrieved from https://courses.cs.ut.ee/MTAT.03.323/2016fall/uploads/Main/002.pdf [on Jul. 3, 2018]. 23 pages.
No Author. "Filament Security Overview Networking Devices at the Edge of Risk." Apr. 1, 2017. XP055491328. Retrieved from https://filament.com/assets/downloads/Filament%20Security.pdf [on Jul. 10, 2018]. 12 pages.
Poon et al. "Plasma: Scalable Autonomous Smart Contracts." Aug. 11, 2017. XP055491638. Retrieved from https://plasma.io/plasma.pdf. 47 pages.
International Search Report and Written Opinion in corresponding International Patent Application No. PCT/IB2018/050247 mailed Jul. 18, 2018. 62 pages.
International Preliminary Report on Patentability in corresponding International Patent Application No. PCT/IB2018/050247 mailed Jul. 16, 2019. 29 pages.
Notice of Allowance in U.S. Appl. No. 16/477,631, mailed Oct. 14, 2022 (10 pages).

* cited by examiner

METHODS AND SYSTEMS FOR EXECUTING SMART CONTRACTS IN SECURE ENVIRONMENTS

CROSS-REFERENCE TO RELATED PATENT APPLICATIONS

This application is a Continuation of U.S. application Ser. No. 16/477,631, filed on Jul. 12, 2019, which is a U.S. National Stage Application under 35 U.S.C. § 371 of International Patent Application No. PCT/IB2018/050247, filed Jan. 16, 2018, which claims the benefit of priority under 35 U.S.C. § 119 of International Patent Application No. PCT/IB2017/050228, filed Jan. 16, 2017, U.S. Patent Application No. 62/462,390 filed Feb. 23, 2017, and U.S. Patent Application No. 62/454,370 filed Feb. 3, 2017, all of which are incorporated by reference in their entireties.

FIELD OF THE INVENTION

The present invention relates to methods and systems useful in an architecture of networked nodes, usually decentralized, capable of performing transactions between one another on the basis of messages.

BACKGROUND OF THE INVENTION AND SUMMARY OF THE INVENTION

It will be noted here that some parts of the following description are in English, their faithful translation into French also to be regarded as forming part of the description.

Moreover, reference will be made to application WO2016120826A2 in the name of the applicant, the contents of which are incorporated here by reference.

The decentralized PGP trust model is already known (Web-of-Trust, 1992) enabling peers to act as introducers and validators of public keys and proposing a decentralized validation metric of a digital identity, which is focused on the email addresses of the peers in question. Other approaches have since been proposed to establish identity without the certification authority (like those by Carl Ellison in 1996). Moreover, methods are known using an "out-of-band channel" approach and requiring the use of a reliable terminal to perform a secure exchange of public keys when faced with the risk of a "Man-in-the-Middle (MitM) attack," specifically the SafeSlinger method [http://www.netsec.ethz.ch/publications/papers/farb_safeslinger_mobicom2013.pdf] designed to optimize the case where each of the users in a group, such as in a "key signing party," exchanges keys with all of the other users.

The invention aims firstly to enable a decentralized identification that is both simple and of broader use, and directly meets the requirements of implementing "smart contract" type executable commitments [https://en.wikipedia.org/wiki/Smart_contract], now used in consensus protocols, particularly in a permissionless environment where anyone can join and leave dynamically, and where there is no prior knowledge of the consensus nodes, usually supported by computational puzzles [Dwork & Naor, 1992: http://www.hashcash.org/papers/pvp.pdf; Back, 2002: http://www.hashcash.org/papers/hashcash.pdf] to counter "sybil attacks" and with the theory that a major part of the calculation power is held by honest participants [Nakamoto, 2008: https://bitcoin.org/bitcoin.pdf]. The state of the art as regards smart contracts is mainly represented by the Ethereum system [https://github.com/ethereum/wiki/wiki/White-Paper]. There is no known implementation of smart contracts (with no trusted third-party), whose security is based on the hardware of trusted manufacturers.

New architectures of processors, such as the ARM processors or the more recent Intel processors, enable "Trusted Execution Environments" (TEE), such as the SGX enclaves of Intel processors, to be used. However, these enclaves are currently proposed only for the more lightweight protocols based on blockchain. For example, the PoET protocol proposed by Intel is still based on a blockchain.

One aspect of the invention is to enable the use of such secure environments in order to do away with blockchain or to make it optional. The invention aims more specifically an implementation on hardware that is available to a large number of manufacturers, in order to achieve decentralization even with respect to the manufacturers themselves, and also aims to propose decentralized identification mechanisms that mitigate Sybil attacks (when an adversary creates any number of new nodes that it controls within the network).

Another aspect of the invention is to be able to make wallet node type entities and secured unit type entities (TEE) cooperate together, specifically SGX type enclaves of Intel processors (hereinafter, the word "enclave" will describe such an enclave or generally any TEE).

Thanks to the hardware, the invention aims not only for the advantages of speed (consensus by blockchain is slow) and cost (transaction fees), but also qualitative advantages that will be discussed later. The blockchain approach involves by nature a data structure that is centralized but also replicated on a large scale. The real decentralization proposed by the invention does away with the need for "scaling" which constitutes the most high-priority challenge for Bitcoin and Ethereum today.

According to a first aspect, a method is proposed for the secure execution of programs (smart contracts) implemented between a first WN (WN1) and a second WN (WN2), at least the second WN being implemented in an enclave of a processor, and the WNs being capable of executing programs designated in the messages that reach them, the method comprising the following steps:
  a) sending a pre-message by WN1 to WN2;
  b1) in response to this pre-message, execution in the enclave of a first program (WNRoT);
  b2) generation, by the enclave, of a certificate of authenticity of said first program and of the integrity of its execution;
  b3) sending said certificate to WN1;
  c) verification by WN1 of said certificate;
  d) in the event of successful verification, sending by WN1 to WN2 of a message intended to trigger the execution of a given program in WN2, and
  e) execution of said program in WN2.
  Some preferred but optional aspects are as follows:
  step b2) also comprises the generation of a nonce, step b3) also comprises the sending of said nonce to WN1, and the method furthermore comprises, before step d), a step implemented at WN1 of encryption of the message to be sent with the nonce, and before step e), a step implemented at WN2 of decryption of said encrypted message;
  the designation of a program to be executed in a WN is performed by a hash of the contents of said program;
  said pre-message contains a designation of said given program, with a view to pre-loading said program by WN2 into a working memory;
  WN1 is also an enclave of a processor, in which at each receipt of a pre-message or a message by WN2 coming from WN1, WN2 verifies the presence in this premessage or message of a certificate of authenticity and integrity of execution of a program executed in WN1, and having triggered the sending of this pre-message or message;

the method also comprises:
- between steps a) and c), a step of generation by WN2 of a pair of public/private keys derived from a secret key of WN2 and from the designation of said given program;
- before step d), a step of sending the public derived key to WN1;
- before step d), a step of encryption of a data part of said message with said public derived key in WN1, and after step d), a step of decryption in WN2 of said data part with the private derived key;
- said pair of derived keys is also generated from designation information contained in the pre-message;
- the step of sending the public derived key to WN1 is implemented during step b3).

According to a second aspect, a method is proposed for the secure execution of transactional programs implemented between a first WN (WN1) and a second WN (WN2), WN1 and WN2 each being either an enclave of a processor or a dedicated SoC, in which the WNs are capable of communicating by transactional messages containing a designation of a program to be executed in the receiver WN, and a pair of WNs exchanging transactional messages, both executing the same program in secure conditions.

According to a third aspect, a method is proposed for securing the operation of a network of nodes (WNs) capable of executing programs (WPs) in response to the receipt of messages (WMs), the nodes being implemented by an enclave of a processor or by an SoC and the nodes being capable of being linked together on the basis of connection weight values, comprising the following steps:
- assign to each node at least one countersigner node having a connection weight in relation thereto;
- for each node, keep a list of countersigner nodes capable of receiving messages from the node in question, each node and its countersigner nodes forming a set of mirror nodes;
- validate or authorize a message between an emitter node and a receiver node based on coherence constraints at the mirror nodes to which the emitter node and/or receiver node belong.

In another field (subsequently Weighted Lightning Network), according to a fourth aspect of the invention, a transactional system is proposed with peer-to-peer architecture, implementing unit of account transfer transactions between unit emitter nodes and unit receiver nodes, each incoming transaction having an input referring to an output of a previous transaction (or several inputs each referring to an output of a previous transaction) and itself having at least one new output specifying a number of units of account and a receiver node, each transaction capable of being validated in response to a broadcast, by insertion, in a blockchain stored in a distributed manner between at least some nodes, of at least one signature of the transaction, at least some nodes also being capable of exchanging units of account by transactions without compulsory broadcast via payment channels between nodes, each node having a channel (Ch (i,j)) with another node possessing a ceiling (C(i,j)) of units of account transferable through this channel without the need to broadcast, and a transfer of units of account between two nodes, the transfer being capable of being performed via a node chain having in pairs a payment channel, characterized in that the nodes have connection weights (W(i,j)) with respect to other nodes, representative of a degree of trust or proximity between the nodes or users associated with the nodes, and in that it comprises means of adjustment of the unit of account ceiling of a given node on a given channel based on a connection weight of said node with respect to the node with which it possesses said given channel.

Some preferred but optional aspects are as follows:
- the adjustment involves a raising of the ceiling in relation to the weight;
- the weight of one node with respect to another is determined on the basis of the existence of real connections (IRL Connections) or quasi-real connections in the surroundings of both nodes.

According to a fifth aspect (subsequently Manufacturer's Weight), a transactional system is proposed with peer-to-peer architecture, to execute secure transactions using hardware nodes (SoC; enclave) capable of being manufactured by manufacturers in a decentralized manner, each node having, with respect to another node, a degree of trust or proximity embodied chiefly by a connection weight or by a number of mirror nodes in common between both nodes, characterized in that it comprises means to assign to each manufacturer a manufacturer's weight, and to adjust the degree of trust of a hardware node with respect to another node (not necessarily a hardware node) based on the manufacturer's weight of the manufacturer of this hardware node.

Some preferred but optional aspects are as follows:
- the manufacturer's weight is linked to the number of hardware nodes manufactured by the manufacturer in question;
- the manufacturer's weight is linked to the number of active hardware nodes in the system and manufactured by the manufacturer in question;
- the system comprises means for determining the activity of a hardware node based on the existence of transactions using said node;
- the system comprises means for determining the activity of a hardware node based on the existence of interactions with other nodes and on connection weight values of the nodes involved in these interactions.

According to a sixth aspect (subsequently Body SoC and Body Enclave), a secure processor (SoC; enclave) is proposed, characterized in that it is capable of hosting a plurality of WNs of a network, and in that it comprises a cryptographic memory management unit (CMMU) with encryption, capable of ensuring a secure execution of programs in which:
- stored (or dynamically regenerated) in the CMMU is a secret program encryption key that can only be accessed by the CMMU;
- the CMMU is capable of storing at least one program to be executed after encryption by the CMMU with the aid of said secret key and of generating a hash of the program or of each program enabling the encrypted program to be found;
- said processor is capable of executing programs only at the command of the CMMU;
- the interactions between network nodes are performed exclusively by messages and the messages are received/emitted exclusively by the CMMU;
- the messages contain the identification of a receiver WN hosted in the processor and the identification of a certain program to be executed by the receiver WN, identified by its hash;

in response to the receipt of a message:
the processor initializes as a receiver WN and the CMMU (i) accesses the encrypted program to be executed by this WN on the basis of the hash of the program received in the message (specifically via a PHT), (ii) decrypts the program instructions, and (iii) transmits to the processor to execute the decrypted instructions concerning said received data,
the processor storing for each hosted WN a pair of keys intended for the signature of contents of messages generated by said WN with the aid of the private key of said pair.

Some preferred but optional aspects are as follows:
at least one hosted WN constitutes a countersigner WN of another WN within a group of mirror WNs, the pair of keys of this countersigner WN being identical to the pairs of keys of the other WNs of said group;
the processor is capable of storing processor variables, WN variables and WP variables separately from one another;
the processor is associated with an SAM and the processor variables comprise activation or sensor data associated with said module, accessible by at least two WNs.

According to a seventh aspect (subsequently Guard WN), a transactional system with peer-to-peer distributed architecture is proposed, implementing transactions with cryptographic security for the transfer of units of account between unit emitter nodes and unit receiver nodes, each incoming transaction having an input referring to an output of a previous transaction (or several inputs each referring to an output of a previous transaction) and itself having at least one new output specifying a number of units of account and a receiver node, each transaction capable of being validated in response to a broadcast, by insertion, in a blockchain stored in a distributed manner between at least some nodes, of at least one transaction signature, at least some nodes also being capable of exchanging units of account by transactions without compulsory broadcast, broadcast, it being possible to associate to each node information on the degree of trust or proximity with respect to another node, the system comprising means, within an uptree chain of transactions that have not been broadcast, capable of determining whether the information on the degree of trust or proximity of at least one node, among the nodes (GuardWNs) having generated the farthest upstream transactions in said chain, with respect to the node having received the farthest downstream transaction in the chain, satisfies a determined criterion and, in the affirmative, accepting said farthest downstream transaction.

Some preferred but optional aspects are as follows:
the degree of trust or proximity information contains a number of mirror nodes in common between at least one node, among the nodes having generated the farthest upstream transactions in said chain, and the node having received the farthest downstream transaction in the chain;
each node is designed to sign a transaction as a GuardWN only if the outputs of said transaction require its signature in the transactions that said transaction will feed, so that a GuardWN having generated a farthest upstream transaction that is farthest upstream controls the transactions (avoids double spending) that will be fed by the transaction that is farthest downstream;
each node is designed to sign a transaction as a GuardWN only if the outputs of said transaction require its signature in the transactions that said transaction will feed, so that a GuardWN having generated a transaction that is farthest upstream controls (avoids double spending) on the entire dtree of downstream transactions starting with itself;
the request for signature by a GuardWN is extended to each collateral node of another node (these two nodes being respective signer GuardWNs required on the outputs of two transactions feeding in common the same downstream transaction) whose signature is required.

According to another aspect, a system-on-chip is proposed, capable of receiving messages in order to execute programs in secure execution conditions, in which is stored a secret key (SK) constituting the private key of a pair of public/private keys, comprising:
means that are capable, on receiving a message from another system-on-chip system (WN or secure unit (enclave) of a processor), of deriving a new pair of keys called derived keys from said secret key SK and information contained in the message received, and of sending the public derived key to said other WN or enclave, and
means capable, on receipt, from said other WN or enclave, of a message containing the same information, of decrypting another part of said message with said private derived key.

According to another aspect, a method is proposed, executed in a secure unit (enclave) of a processor, comprising, upon receipt of a message from either a system-on-chip or a secure unit of another processor (another enclave), the following execution steps implemented without leaving the enclave:
derive a pair of derived keys from the secret key SK of the enclave and from information contained in said message,
send the public derived key to said WN or other enclave, and
wait for the receipt from said WN or other enclave of an additional message containing the same information, and
upon receipt of said additional message, decrypt another part of said message with the private derived key.

Some preferred but optional aspects are as follows:
the step of sending also involves sending a certificate of authenticity and integrity of execution of the program in the process of execution;
the method comprises an additional step preceding the step of sending and consisting in generating a random key, the step of sending comprising sending this random key to said WN or other enclave, and in which the step of decrypting uses said random key.

According to another aspect, we propose a method executed in a secure unit (enclave) of a processor comprising, upon receipt of a message from either a system-on-chip or a secure unit of another processor (other enclave), the following execution steps implemented without leaving the enclave:
generate a random key;
send said random key to said WN or other enclave, and
wait for the receipt from said WN or other enclave of an additional message containing the same information, and
upon receipt of said additional message, decrypt another part of said message with said random key.

Some preferred but optional aspects are as follows:
the method comprises, following receipt of the additional message and without leaving the enclave, a step of loading and executing a program corresponding to said information contained in the message and taking as an input said other decrypted part;

the method also comprises, on execution of the program, the generation of a message bound for a WN or other enclave, containing said information as well as a certificate of execution of said program corresponding to said information.

According to another aspect, a processor is proposed that comprises a secure unit (enclave), said enclave comprising:

a secret key;

means to generate a secret key derived from a combination of said secret key and other information;

means to load, via a correspondence table, a program corresponding to given information and for executing said program, characterized in that said enclave also comprises means that are capable:

upon receipt of a message, part of which is encrypted and can only be decrypted by means of said derived key;

of activating said means in order to generate this derived key on the basis of said other information contained in the message received;

of loading, without leaving the enclave, a program corresponding to said other information and of executing said program on the input data containing the message received, of which said encrypted part has been decrypted by means of the secret derived key.

According to another aspect of the invention, a processor is proposed comprising a secure unit (enclave), said enclave comprising:

a secret key;

means to load via a correspondence table a program corresponding to given information and to execute said program, characterized in that said enclave comprises means that are capable, on receipt from a WN or another enclave of a message containing given information, of loading a first program and of executing it in a secure manner, this execution comprising the following steps:

a) sending to this WN or other enclave a request comprising:
 a certificate signed by the enclave with its secret key and certifying that this first program is in the process of execution;
 a random key;

b) loading via a correspondence table a program corresponding to said information, and waiting for the response to the request sent at step a);

c) on receipt of this response, the latter comprising at least one part (payload) encrypted by means of said random key, decrypting said encrypted part (payload), and d) triggering the execution of the program on input data containing the response received, after decryption.

Some preferred but optional aspects are as follows:

the request sent at step a) also contains an identifier of said received message;

the request sent at step a) is encrypted with the public key of the WN or other enclave;

the execution of the program comprises the generation of a message bound for a WN or other enclave containing said information as well as a certificate of execution of said program corresponding to said information;

the message received from a WN or from another enclave also contains a certificate of execution by this WN or other enclave of said program corresponding to said information;

the message received from the WN or other enclave is received in an encrypted state, thanks to the public key of the processor enclave, and is decrypted with the secret key thereof;

the enclave also comprises means capable, on receipt by another enclave of a request containing a certificate certifying that said first program (WNRoT) is in the process of execution and of a random key, of generating and returning a message containing at least one part (payload) encrypted by means of said random key.

According to yet another aspect, a processor is proposed that comprises a secure unit (enclave), said enclave comprising:

the secret key of a main pair of private/public keys;

means to generate a pair of private/public keys derived from a combination of the main secret key and some information, and means to load, via a correspondence table, a program corresponding to some given information and to execute it, characterized in that said enclave comprises means that are capable, upon receipt from a WN or another enclave of a message containing some given information, of loading a first program and executing it in a secure manner, this execution comprising the following steps:

a) using (generating or retrieving from the memory) a pair of keys derived from the main secret key and said received given information;

b) sending to this WN or other enclave a request containing:
 a certificate signed by the enclave with its secret key and certifying that this first program is in the process of execution;
 the public key of the pair of derived keys;

c) loading, via a correspondence table, a program corresponding to said information and waiting for the response to the request sent at step b), and d) upon receipt of this response, the latter comprising at least one part (payload) encrypted by means of the public derived key, decrypting this encrypted part (payload) with the secret derived key, and triggering the execution of the program on the input data containing the response received after decryption.

Advantageously but optionally, the request sent at step b) also contains an identifier of said received message.

According to another aspect, a processor is proposed that comprises a secure unit (enclave), said enclave comprising:

the secret key of a main pair of private/public keys;

means for generating a random key;

means for loading, via a correspondence table, a program corresponding to given information and for executing it, characterized in that said enclave comprises means that are capable, upon receipt from a WN or from another enclave of a message containing given information, of loading a first program and executing it in a secure manner, this execution comprising the following steps:

a) sending to this WN or other enclave a request containing:
 a certificate signed by the enclave with its secret key and certifying that this first program is in the process of execution;
 the random key;

b) loading, via a correspondence table, a program corresponding to said information and waiting for the response to the request sent at step a), and c) upon receipt of this response (WM2), the latter comprising at least one part (payload) encrypted by means of the random key, decrypting this encrypted part (payload) with the random key and triggering the execution of the program (WP) on the input data containing the response received after decryption.

Some preferred but optional aspects are as follows:

the request sent at the sending step is encrypted with the public key of the WN or other enclave;

the message received from the WN or other enclave also contains the public key and a pair of private/public keys derived from the same given information, and the request sent at the sending step to WN or to the other enclave is encrypted with said public key derived from the WN or other enclave;

the execution of the program also comprises the generation of a message bound for a WN or other enclave containing said information as well as a certificate of execution of said program corresponding to said information;

the message received from the WN or other enclave also contains a certificate of execution by said WN or other enclave of said program corresponding to said information;

the message received from said WN or other enclave is received in an encrypted state, thanks to the public key of the enclave, and is decrypted with the secret key thereof;

the enclave also comprises means capable, upon receipt by another enclave of a request containing a certificate certifying that said first program is in the process of execution and of said public key of the derived pair of keys, of generating and returning a message containing at least one part (payload) encrypted by means of said public key;

said received request also contains a random key and the encryption means in order to return a message containing this key.

Furthermore, the secure processes of implementing smart contracts are usually completely disconnected from the physical world. In this regard, to make a processing unit implemented in a process communicate with the outside world in principle opens the door to possible fraud.

One aspect of the invention aims to enable the execution of smart contracts to be connected with the real world, as will be seen later, while preserving the security of this execution.

To this end, a secure system-on-chip (SoC) is proposed, in which a private SoC key is stored in a manner that is accessible only by the SoC, or the SoC is capable of dynamically regenerating this private key, the SoC being capable of communicating with another device through messages and being capable of executing smart contracts (WP) in response to the receipt of messages, and of storing at least one smart contract to be executed in secure processing conditions, the SoC also comprising means of communication between the system and an external module comprising at least one sensor and/or an actuator, these means comprising, at least on the system side, a communication management unit, and means of securing said communication capable of preventing at least the replacement of one module by another module, the execution of at least one smart contract being capable of receiving as input from said management unit a sensor datum coming from said module and/or of emitting as output an activation datum to said module.

Some preferred but non-limiting aspects are as follows:

the system comprises means of signing with the aid of said private key a sensor datum received from the module in the context of the execution of a smart contract, and of sending said signed datum to another secure device constituting a party to the smart contract;

the system comprises means of receiving a signed activation instruction from another secure device constituting a party to a smart contract, in order to verify said signature and to apply said instruction to said module;

the security means comprise a means of learning at least one permanent property of the connection between the SoC and the module;

the learning means are capable of storing said property of said connection, and the securing means are capable of periodically comparing the current property with the stored property;

the connection is wired and said property is an impedance property;

the connection is wireless, and said property comprises at least one characteristic of the time and/or frequency domain of said connection;

said property comprises a combination of characteristics of the time and/or frequency domain of said connection;

the module comprises a part forming an RFID tag;

the module comprises a standard wireless communication tag fixed in a tamper-proof way to an off-the-shelf sensor and/or actuator;

the tag is an RFID label;

the security means comprise means of logical pairing between the system and the module;

the security means comprise means of verification of the persistence of pairing;

the means of verification of the persistence of pairing and/or the means of communication comprise the sending of a nonce to the module and the analysis of a response from the module taking said nonce into account;

the system comprises a specific memory for data from the sensor and/or actuator coming from/bound for said module and a management unit of said memory capable of reading and/or writing data into said memory during the execution of a smart contract from among the smart contracts authorized to access these data;

said memory management unit forms part of a general memory management unit also comprising a management unit of the access to a memory of smart contracts and a memory of data respectively associated with the different smart contracts;

said general memory management unit also comprises a management unit of a memory for units of account (tags) received by transactions included in messages, capable of reading and/or writing data in said unit of account memory during the execution of a smart contract from among the smart contracts authorized to access these units of account;

the general memory management unit is capable of loading a smart contract for execution from a smart contract designation contained in a message arriving in the system;

sensor and/or actuator data coming from/bound for said module are transmitted on the fly between a means of execution of a smart contract and the communication management unit.

Other Aspects

With respect to the above-mentioned qualitative advantages, the article "Why Many Smart Contract Use Cases Are Simply Impossible" http://www.coindesk.com/three-smart-contract-misconceptions/] describes the limitations of Ethereum as regards interactions with the outside world (see, in particular, "Contacting External Services":

"Often, the first use case proposed is a smart contract that changes its behavior in response to some external event. For example, an agricultural insurance policy which pays out conditionally based on the quantity of rainfall in a given month.

The imagined process goes something like this: The smart contract waits until the predetermined time, retrieves the weather report from an external service and behaves appropriately based on the data received.

This all sounds simple enough, but it's also impossible. Why? Because a blockchain is a consensus-based system, meaning that it only works if every node reaches an identical state after processing every transaction and block.

Everything that takes place on a blockchain must be completely deterministic, with no possible way for differences to creep in. The moment that two honest nodes disagree about the chain's state, the entire system becomes worthless.

Now, recall that smart contracts are executed independently by every node on a chain. Therefore, if a smart contract retrieves some information from an external source, this retrieval is performed repeatedly and separately by each node. But because this source is outside of the blockchain, there is no guarantee that every node will receive the same answer.

Perhaps the source will change its response in the time between requests from different nodes, or perhaps it will become temporarily unavailable. Either way, consensus is broken and the entire blockchain dies. So, what's the workaround? Actually, it's rather simple. Instead of a smart contract initiating the retrieval of external data, one or more trusted parties ("oracles") creates a transaction which embeds that data in the chain. Every node will have an identical copy of this data, so it can be safely used in a smart contract computation." (sic)

This drawback is overcome firstly by allowing direct access by a "Wallet Node" WN (see WO2016120826A2), in a secure manner, to any https website (thus limiting the need for an "oracle" smart contract), by exploiting the end-to-end TLS protocol. This access can be implemented on a plurality of "Clone WNs" (which are a particular implementation of mirror nodes, see section on "Mirror WNs") capable of redundantly accessing a data source. As regards the risk of modification of the response between two requests by the source, the clone WNs are able to coordinate one another so as to process, according to pre-agreed rules (depending on configuration parameters), cases of different responses to the same requests (depending on the approaches such as taking the majority, the average, etc.)—the essential advantage introduced compared to Ethereum nodes being access to the network, thus avoiding intermediation by a trusted third party.

The above-mentioned article then raises the need to emit a message to the outside world: "When it comes to smart contracts causing events in the outside world, a similar problem appears. For example, many like the idea of a smart contract which calls a bank's API in order to transfer money. But if every node is independently executing the code in the chain, who is responsible for calling this API?

If the answer is just one node, what happens if that particular node malfunctions, deliberately or not?"

This drawback is overcome by allowing the implementation of a reliable protocol whereby just one of the mirror nodes of the node supposed to emit a message to the outside world, emits this message (see section below "WN emitting a message to the outside world"). (sic).

In the two cases of use mentioned above, the intrinsic limitation of the Ethereum nodes with regard to the network runs counter to its goal of decentralization; see above-mentioned article: "they both require a trusted entity to manage the interactions between the blockchain and the outside world. While this is technically possible, it undermines the goal of a decentralized system." (sic).

The other significant limitation of Ethereum described in the above-mentioned article is its intrinsic non-confidentiality: "if one smart contract can't access another's data, have we solved the problem of blockchain confidentiality? Does it make sense to talk of hiding information in a smart contract? Unfortunately, the answer is no.

Because even if one smart contract can't read another's data, that data is still stored on every single node in the chain. For each blockchain participant, it's in the memory or disk of a system which that participant completely controls. And there's nothing to stop them reading the information from their own system, if and when they choose to do so."

This major limitation of Ethereum is overcome by the blindness property (meaning "confidentiality extended to hardware") of WNs, achieved by the hardware architecture proposed by the invention.

Ethereum smart contracts are regarded as "cryptographic "boxes" that contain value and only unlock it if certain conditions are met" [phrase taken from the previously cited Ethereum White Paper], whereas according to the system of the invention, smart contracts are implemented as Wallet Program (WP) executable contracts between nodes (WNs) of the Wallet Node network and have the following characteristics:

the WNs interact by Wallet Messages (WMs);
each WM specifying the WP that the receiver WN must execute in order to process it;
a WM being capable of containing one or more "value" transfer transactions from the emitter WN to the receiver WN;
values that will belong to the receiver WN (or at least will be managed by the receiver WN) which can in its turn transfer them by generating other transactions (in the context of the execution of a WP that in general may be different to the WP specified in the WM that transferred them to it);
the WN system comprising means in each WN to prevent double spending of these values, and
a WN advantageously comprising means to earmark the consumption of these values to one or more authorized WPs.

However, said "cryptographic boxes" can easily be built into the WNs. The system of the invention thus marries the conventional idea of contracts ("something that should be "fulfilled" or "complied with"") with that of Ethereum ("rather, they are more like "autonomous agents" that live inside of the Ethereum execution environment, always executing a specific piece of code when "poked" by a message or transaction, and having direct control over their own ether balance and their own key/value store to keep track of persistent variables") [phrases also taken from the previously-cited Ethereum White Paper].

WNs are comparable to Ethereum nodes: the address of an Ethereum node, determined on the basis of the public key of a pair of keys, is similar to the address of a WN that is determined on the basis of the public key of the WN in question. In a WN, a smart contract is a Wallet Program executable code (identified by its hash "#WP"), a code that can be compiled from a language like Solidity [http://solidity.readthedocs.io/en/develop/introduction-to-smart-contracts.html (incorporated here by reference)] but with adaptations allowing the WNs access to the network, so that the transactions generated by a WN can transfer values in any unit (and not only ethers), etc.

Whereas in Ethereum an execution of contract is performed on a large number of (minor) nodes that validate it, in the case of WNs, when a contract (WP) is executed, the node in which this execution has been triggered is the only one that executes it and has its own persistent state variables. WNs represent a more general model in this sense because the persistent variables of a node are general-purpose, they do not solely represent an Ether balance and are not necessarily the variables associated with the contract for all of the nodes that execute it (they are not necessarily the shared variables constituting the key/value store of an Ethereum contract [see the previously-cited Ethereum White Paper]).

WNs guarantee the integrity of execution by hardware constraints and, advantageously, by redundancy (for even more security), said node then being a virtual node embodied by a plurality of mirror nodes storing, manipulating and maintaining the variables specific to said virtual node in a synchronized manner.

It is useful to refer to the description of FIG. 23 at the beginning of the section "Detailed description of preferred embodiments."

Moreover, we aim to make it possible to execute smart contracts (WP) on WNs by using the Bitcoin blockchain (or another blockchain), generating and inserting in the blockchain only some of the transactions, on the instruction of the WNs concerned, which offers the triple advantage of having the power of smart contracts in Bitcoin, avoiding the slowness of its consensus protocol, and not paying transaction fees (for transactions that are not inserted in the blockchain). The "Off-chain Bitcoin Transactions" section describes a method enabling units of values (such as bitcoins or ethers) to be consumed by different types of WPs, a method that thus confers on a Bitcoin-based system the power of the smart contracts of a system such as Ethereum.

The Bitcoin protocol imposes the need to wait for transaction confirmations block by block, which, depending on the approach adopted, currently take from a few seconds to around ten minutes each and limits the volumes of transactions. Ethereum, as well as the method described in FR 3 018 377 A1 in the name of the applicant, enables the decentralized execution of executable contracts. Sidechains technology was designed, essentially, to enable commitments and transactions to be managed in a manner other than that envisaged in Bitcoin and to be able to return to the original Bitcoin on demand [https://blockstream.com/sidechains.pdf] (which the invention essentially enables). More recently, in addition to these systems, "state-channel networks" such as "Lightning Network" [https://lightning.network/lightning-network-paper.pdf], and «Payment-Channel Network» [http://raiden.network/] have been proposed for Ethereum, to avoid the need to use blockchain for each transaction. This approach involves the nodes monitoring the blockchain to react in the event of the insertion of transactions that do not reflect the current state, in order to rectify this problem, which requires implementing locks to secure an observation time window, which rather slows down the process. The invention overcomes this difficulty by guaranteeing the integrity of execution of the WPs that it offers from the outset: the inserted transactions generated by WN do not require monitoring.

Moreover, it will be noted that the hardware proposed according to the invention ensures processing without disclosure, a property (called "confidentiality") offered chiefly by secure environments such as the new Intel processors for their secure "SGX" environments (enclaves), and research is known on homomorphic encryption for processing on the Cloud which offer guarantees of integrity of execution and non-disclosure of processed data or even of the executed code. However, homomorphic encryption technology is still in the research phase and is not yet operational except in restricted or specific cases.

It will be remembered that application WO2016/120826 A2 describes a system-on-chip (SoC, called "Wallet Node" or "WN," or even "entity") integrated into—or coupled with—a connected device such as a smartphone, a connected thing of the Internet of Things (IoT) or even a computer, offering guarantees of integrity of execution so that the access restrictions between its different parts cannot be altered or circumvented. Basically, the only possible execution of a WN is to react to an incoming message, by verifying its integrity and then executing the executable Wallet Program code corresponding to the hash specified in this message. With reference to this PCT application, in the present text, "message" means "Wallet Message" except when explicitly stated otherwise.

Definition of other aspects with which the above aspects may be combined, depending on the combinations that a person skilled in the art deems compatible.

According to yet another aspect, a method is proposed to establish connection weights between nodes of a network implemented by communicating computer processing units, each node being associated with a public key and a private key, a given node being capable of communicating its public key to another node, thus forming a so-called real connection ("IRL-connected") between the two nodes, and each node also being capable of communicating to another node a public key received from yet another node, thus forming a so-called indirect connection between the other node and the yet another node, a node being capable of having a specific connection weight with respect to another node with which it has a real or indirect connection, the method comprising, in order to determine the connection weight of a second node with respect to a first node, the calculation of a determined combination of weighting factors (influence, proximity) of third nodes that are IRL-connected to the second node.

Advantageously but optionally:
the connection weight of the second node influences the weighting factors of the third nodes, and also comprises an update of the values of the weighting factors of the third nodes after calculating the connection weight of the second node;
the method is implemented iteratively until convergence;
the establishment of a so-called real connection (IRL-connection) between a first node and another node comprises the following steps:
at a first processing unit implementing the first node, make a machine-readable code encrypting a random datum (nonce) accessible by proximity reading;
at another processing unit implementing the other node, read the machine-readable code, extract said random datum and calculate a hash of said random datum;
transmit from said other processing unit to the first processing unit via a communication channel the public key associated with said other node and a signature (of the hash) of the random datum performed with its private key;

at the first processing unit, check said signature with the aid of the public key received and the random datum used to generate the machine-readable code, and save said public key if the verification is successful;

the establishment of a so-called real connection (IRL-connection) between a first node and another node comprises the following steps:

at a first processing unit implementing the first node, generate a passphrase and make it accessible to the user of said first processing unit;

at another processing unit implementing the other node, enter said passphrase, which was communicated by the user of the first processing unit to the user of the other processing unit by a communication channel involving a human action between the two users;

transmit from said other processing unit to the first processing unit via a communication channel the public key associated with said other node and a signature (of the hash) of the phrase entered, achieved with its private key;

at the first processing unit, verify said signature with the aid of the public key received and the passphrase initially made accessible to the user of the first processing unit, and save said public key if the verification is successful;

a plurality of second nodes have connection weights with the first node, and in which the determination of the connection weight of a second node with respect to the first node is also based on the connection weight of said other second nodes with respect to the first node.

According to another aspect, a method is proposed to determine the influence of a first node in a node network implemented by communicating computer processing units, one public key and one private key being associated to each node, one node being capable of communicating its public key to another node, thus forming a so-called real connection (IRL-connection) between the two nodes, and each node being equally capable of communicating to another node a public key received from yet another node, thus forming a so-called indirect connection between the other node and the yet another node, the method comprising the determination of an influence factor of a given node based on the number of second nodes having a real connection with said given node and on the values of connection weights determined by the method wherein a plurality of second nodes have connection weights with a first node, and wherein the determination of the connection weight of a second given node with respect to the first node is also based on the connection weights of said other second nodes with respect to the first node, for the different second nodes.

Advantageously but optionally:

the connection weight of a second node with respect to the first node is also determined on the basis of the respective influence factor values of the third nodes having a real connection with said second node;

the values of connection weight and influence factor are determined iteratively until their convergence into values that no longer significantly vary.

According to another aspect, a method is proposed in order to establish so-called quasi-real connections between the nodes of a network implemented by communicating computer processing units, each node being associated with a public key and a private key, a given node being capable of communicating its public key to another node, thus forming a so-called real connection (IRL-connected) between the two nodes, and each node also being capable of communicating to another node a public key received from yet another node, thus forming a so-called indirect connection between the other node and the yet another node, each node being capable of having a specific connection weight with respect to another node with which it has a real or indirect connection, comprising the following steps:

from a first node and a second node between which a connection is to be established, select a plurality of intermediate nodes between the first node and the second node, from among those having the highest connection weights with respect to the first node;

communicate from the first node to the selected intermediate nodes a random datum (nonce) intended to be communicated to the second node;

via one or more separate communication channels of the communication channel between nodes, communicate redundantly from the intermediate nodes to the second node said random code as well as the public keys of said intermediate nodes;

at the second node, in response to the receipt of the redundant random code, generate a signature of the random code with the aid of the private key of the second node and return to the intermediate nodes said signature as well as the private key of the second node, encrypted with the aid of the public keys of the intermediate nodes, respectively;

at each of the intermediate nodes, verification of the signature of the random code received from the second node and, if successful, communication to the first node of the public key of the second node encrypted with the aid of the public key of the first node, and at the first node, decryption and storage of the public key of the second node;

the first and second nodes then being able to exchange encrypted information with a security linked to the connection weights of the intermediate nodes.

Advantageously but optionally:

the selection of the intermediate nodes is also made from among those having the highest connection weights with respect to the second node;

the random code is generated jointly by a set of nodes formed by the first node and the intermediate nodes, by implementing the following steps:

generation of a random code at each node of the set;

exchange of the hashes of said random codes between the nodes of the set, with encryption using the respective keys of the nodes;

exchange of the random codes as they are between said nodes of the set, with encryption using the respective keys of the nodes;

verification, at each node of the set, that the random codes correspond, as they stand, to their respective hashes received at the preceding step, and generation of a final random code intended to be communicated to the second node by a predetermined combination of random codes generated at each node of the set;

said separate communication channel is based on a social network and comprises a publication step by the second node on said social network of a signature of said random code and its public key;

the method also comprises, in response to the success of the step of verification of the signature of the random code received from the second node, a step of assigning a connection weight of the second node with respect to the first node;

the method according to the first aspect is used in a network comprising nodes with quasi-real connections established according to the third aspect, and the quasi-real connections are regarded as real connections in the sense of the method, with a weight taking into account the quasi-real nature of the connection.

According to yet another aspect, a method is proposed for securing the operation of a network of nodes capable of executing programs (WPs) in response to the receipt of messages (WMs), the nodes being capable of being connected together according to different connection weights determined by the method according to the first aspect or by the method according to the third aspect, the method comprising, on receipt of a message (WM) at the receiver node, the comparison of the connection weight of the node having emitted this message with the connection weights of other nodes with which the receiver node possesses real connections, and the acceptance of said message only if the connection weight of the emitter node is equal to or greater than the smallest of said connection weights.

According to another aspect, a method is proposed for securing the operation of a network of nodes capable of executing programs (WPs) in response to the receipt of messages (WMs), the nodes being capable of being connected together according to the different connection weights obtained particularly by the method according to the first aspect or by the method according to the third aspect or, in response to the success of the step of verification of the signature of the random code received from the second node, a step of attribution of a connection weight of the second node with respect to the first node is envisaged, comprising the following steps:
  based on the connection weight values, assign to each node at least one countersigner node having with respect thereto a connection weight that exceeds a threshold;
  at each node, keep a list of countersigner nodes of nodes capable of receiving messages (WMs) from the node in question, each node and its countersigner nodes forming a set of mirror nodes;
  when a message must be sent by an emitter node to a receiver node, trigger the sending of this message by at least some mirror nodes of the emitter node to at least some of the mirror nodes of the receiver node;
  validate the message only if a given fraction of the messages emitted has been received.
Advantageously but optionally:
the messages are emitted to all of the mirror nodes of the receiver node;
the messages are emitted by the emitter node as well as solely by the countersigner nodes of the emitter node that are also countersigners of the receiver node;
a message sent from a first node to a second node is validated by the second node only if
  the respective sets of mirror nodes of the first and second nodes have an intersection of which the number of elements exceeds a certain threshold and if
  the second node has received this same message (redundantly) by at least a given fraction of said mirror nodes belonging to this intersection;
in a method according to the first aspect implemented in a network comprising mirror nodes according to the fifth aspect, a node is regarded as the countersigner of a given node only if the connection weight of the node in question is at least equal to the smallest of the connection weights of the nodes having real connections with the given node.

According to another aspect, a system is proposed to secure the operation of a network of nodes capable of executing programs (WPs) in response to the receipt of messages (WMs), the nodes being capable of being connected to each other according to the different connection weights, capable of:
  on the basis of the connection weight values, assigning to each node at least one countersigner node having with respect thereto a connection weight that exceeds a threshold;
  at each node, keeping a list of countersigner nodes of nodes capable of receiving messages from the node in question, each node and its countersigner nodes forming a set of mirror nodes;
  when a message must be sent by an emitter node to a receiver node, triggering the sending of this message by at least some of the mirror nodes of the emitter node to at least some of the mirror nodes of the receiver node.
Advantageously but optionally:
a node receiving a message (WM) validates it only if the respective sets of mirror nodes of the emitter and receiver nodes have an intersection of which the number of elements exceeds a given threshold and if the receiver node has received this same message (redundantly) from at least a given fraction of said mirror nodes belonging to this intersection.

According to another aspect, a system is proposed to secure the operation of a network of nodes formed by systems-on-chip capable of executing programs (WPs) in response to the receipt of messages (WMs), characterized in that it combines the following two architectures:
  at each node, an architecture to access encrypted programs based on the hashes of these programs, contained in the incoming messages;
  at each node, an architecture to determine countersigner nodes, duplication of messages from/to the countersigner nodes, and to determine the identical nature of the messages received.

According to another aspect, a system is proposed for the secure execution of programs in an architecture comprising a set of networked devices, characterized in that it comprises in at least one device, a secure system-on-chip (SoC) in which is stored a private SoC key in a manner that is accessible only to the SoC, or the SoC is capable of dynamically regenerating this private key (PUF technology);
  an SoC being capable of communicating with another device only by messages and being capable of executing programs only in response to the receipt of messages;
  an SoC being capable of storing at least one program to be executed after encryption by the SoC and of generating a hash of the, or each, program enabling the encrypted program to be retrieved;
  the device also being capable of sending to the SoC a message containing input data for a certain program to be executed, as well as the hash of said program (#P2), the SoC being able, in response to such a message, in a secure manner, (i) to access the encoded program to be executed based on the hash (#P2) of the program received in the message, (ii) to decrypt on the fly the program instructions, and (iii) to execute on the fly the decrypted instructions.
Advantageously but optionally:
before emission of a message by the SoC, the SoC inserts the hash (#P1) of the program in the process of execution into the message to be emitted, as well as the signature of this hash, by means of said secret private key of the SoC;

before emission of a message by the SoC, the SoC enters the hash (#P1) of the program in the process of execution into the body of the message to be emitted which the SoC signs by means of the secret private key of the SoC;

the SoC comprises a Crypto Memory Management Unit (CMMU) in which is stored—or is capable of being dynamically regenerated (PUF technology)—the secret key of the SoC which can only be accessed by the CMMU which never discloses it, and it is by this CMMU that the following actions are performed:

said encryption of the program before storing;

a memory address allocation (addr1 . . . addr2 range) for the program thus encrypted;

said generation of the program hash and said decryption for on-the-fly execution by at least one processor unit contained in the SoC;

the CMMU encrypts and stores instruction block by instruction block and provides said processor with one block of decrypted instructions at a time, for them to be executed on the fly;

before emission of a message by the SoC, the CMMU inserts the hash (#P1) of the program in the process of execution into the message to be emitted, as well as the signature of this hash by the CMMU, by means of said secret private key of the SoC;

before emission of a message by the SoC, the CMMU inserts the hash (#P1) of the program in the process of execution into the body of the message to be emitted that it signs by means of the secret private key of the SoC;

an SoC is capable of emitting a message having the same hash for the program in the process of execution (#P1) and for the program to be executed by the recipient (#P1=#P2), this program (P1=P2) being an executable commitment (smart contract) if the recipient of said message is an SoC.

According to another aspect, a system-on-chip is proposed that is intended to form a Wallet Node (WN) of a network, comprising a Crypto Memory Management Unit (CMMU) capable of ensuring a blind execution of programs by at least one SoC processor, in which:

in the CMMU a private key (secret key) is stored (or dynamically regenerated) in a manner accessible only by the CMMU the CMMU is capable of storing at least one program to be executed after encryption by the CMMU and of generating a hash of the, or each, program enabling the encrypted program to be retrieved;

said processor is capable of executing programs only at the command of the CMMU;

the interactions between the SoC and other nodes of the network are conducted solely by messages and the messages are received/emitted solely by the CMMU;

the messages contain the identification of a certain program to be executed, identified by its hash;

in response to the receipt of a message, the CMMU (i) accesses the encrypted program to be executed on the basis of the program hash received in the message (specifically via a PHT), (ii) decrypts the program instructions, and (iii) transmits to the processor in order to execute the decrypted instructions on said received data.

Advantageously but optionally:

the or at least one processor is capable of accessing and manipulating (creating, updating, deleting), via the CMMU, the persistent status values (PSVs) associated with a given program, which are also encrypted and stored in the memory by the CMMU and decrypted on the fly;

said program to be executed and its persistent status values (PSV) are stored in a specific address space ensuring their isolation in relation to the other programs;

a message is capable of containing one or more unit of account (UA) transfer transactions from an emitter node to a receiver node, the units of account received by a receiver node being capable of being re-transferred by a transaction contained in a message emitted by said receiver node;

the method includes a memory space for units of account (tags) received by the transactions;

the method is capable of combining the units of account of different tags in the same transaction to be emitted;

the CMMU comprises means of neutralizing a tag that feeds an emitted transaction, so that the UAs thus consumed cannot be consumed by another transaction;

the CMMU comprises means of controlling the use of tags by the different programs, so that only an authorized program can feed a transaction to be generated from a given tag;

said memory is in the SoC;

said memory is separate from the SoC;

a program can alternatively be triggered on the elapse of a timeout for a given program and the CMMU is also capable, on the occurrence of a timeout associated with the hash of a program (i) of accessing in the memory the encrypted program on the basis of this hash, (ii) of decrypting the program instructions, and (iii) of transmitting to the processor in order to execute the decrypted instructions;

the CMMU performs said encryption and storage in the memory instruction block by instruction block and provides said processor with one decrypted block at a time, for on-the-fly execution;

before emitting a message, the CMMU unit inserts the hash (#P1) of the program in the process of execution into the message to be emitted, as well as the signature of this hash by the CMMU, by means of said secret private key;

before emitting a message, the CMMU inserts the hash (#P1) of the program in the process of execution into the body of the message to be emitted, which it signs by means of said secret private key;

the CMMU is capable of emitting a message having the same hash for the program in the process of execution (#P1) and for the program (#P2) to be executed by the receiver (#P1=P #2), this program (P1=P2) thus being an executable commitment (smart contract) in the case where the receiver of said message is also an SoC where, before emission of a message by the SoC, the SoC inserts the hash (#P1) of the program in the process of execution into the message to be emitted, as well as the signature of this hash, by means of said secret private key of the SoC;

certain messages (WMs) constitute tag transfer messages stored in systems with a memory space for units of account (tags) received by the transactions, and the validation of a tag transfer message at a receiver node is performed only if at the intersection there exists between the set of mirror nodes of the receiver node and the set of mirror nodes of each of the nodes upstream, from which such a tag was originally transferred, a number of nodes exceeding a given threshold.

According to another aspect, a transactional system with peer-to-peer architecture is proposed, implementing transactions enabling units of account to be transferred between unit emitter nodes and unit receiver nodes, each transaction having an input referring to an output of a previous transaction (or several inputs each referring to an output of a previous transaction) and itself having at least one new output specifying a number of units of account and a receiver node, it being possible to validate each transaction by the insertion, in a blockchain stored in a distributed manner between the nodes, of a signature of the transaction, characterized in that at least some of the transactions are performed by nodes capable of ensuring a blindness condition of said transaction, in that it comprises means to process a set of transactions satisfying the condition of blindness so as to simplify this set based on the quantities of units of account and addresses of the emitter nodes and receiver nodes involved in these transactions, in order to generate a smaller set of transactions and to generate and store in the blockchain only the signatures of transactions of the smaller set of transactions.

According to another aspect, a transactional system with peer-to-peer architecture is proposed implementing transactions enabling units of account to be transferred between unit emitter nodes and unit receiver nodes, each transaction having an input referring to an output of a previous transaction (or several inputs each referring to an output of a previous transaction) and itself having at least one new output specifying a number of units of account and a receiver node, it being possible to validate each transaction by entering, in a blockchain stored in a distributed manner between the nodes, a signature of the transaction, characterized in that at least some of the transactions are performed by nodes capable of ensuring a blindness condition of said transactions, in that it comprises means to process a set of transactions satisfying the condition of blindness so as to simplify this set based on the quantities of units of account and addresses of the emitter nodes and receiver nodes involved in these transactions, in order to generate a smaller set of transactions and so as generate and store in the blockchain only some of the signatures of transactions of said smaller set and only on the instruction of the nodes concerned.

According to another aspect, a method is proposed for performing a transaction between network nodes associated with users and capable of transferring units of account between one another and able to communicate between one another by messages, each message designating a WP to be executed in the node receiving this message, and the users being capable of broadcasting the bid elements containing one or more bid criteria and able to give rise to transactions on the network, the method comprising the following steps:

sending, by a bidding node to a requesting node of a user having emitted corresponding bid elements, a supply bid message meeting the criterion (or criteria) and committing said node, and identifying a given WP;

sending by the requesting node to the bidding node a message of acceptance of the supply bid, identifying the same given WP;

generating a certificate of performance, of the existence or availability of the supply accessible by the bidding node, capable of being verified by said given WP;

verification of the certificate by the given WP at one of the two nodes at least, and if verification is successful, generation at the requesting node of a message to transfer units of account constituting the consideration for the supply and sending this message to the bidding node.

According to another advantageous aspect, in a method according to the second aspect and implemented in a network comprising nodes with quasi-real connections established in accordance with the method according to the third aspect, the quasi-real connections are regarded as real connections in the sense of the method, with a weight taking into account the quasi-real character of the connection.

BRIEF DESCRIPTION OF THE DRAWINGS

Further aspects, objects and advantages of the systems and methods described here will emerge more clearly from the following detailed description, given by way of example and made with reference to the accompanying drawings, in which.

DETAILED DESCRIPTION OF PREFERRED EMBODIMENTS

Hereinafter, the term "user" can describe, depending on the context, a particular node of a network, each node possessing one pair of cryptographic keys. Furthermore, the term "user," except when speaking explicitly of a human user, can describe a device or a program associated with him/her. For example, an indication of the type "user A sends to user B such data" will mean that "the device or program associated with user A sends such data to the device or program associated with user B." Lastly, with respect to a given device or program, the term "user" can in certain cases describe another device or program.

There now follows a description of a certain number of aspects of such a network where the nodes are Wallet Nodes (WNs) associated respectively with users U and capable of communicating with one another by means of Wallet Messages (WMs) with a view to realizing different types of transactions or commitments (typically of the smart contract type) affecting the users U with which the WNs are associated.

These WNs constitute the nodes of a graph with the connections between the WNs constituting the graph edges.

The WNs can be of different types (soft or system-on-chip or enclave) and the connections between WNs can be a notated or weighted. A WM cannot be sent by a source WN to a destination WN unless the connection between the two WNs in question satisfies a certain notation and/or weighting.

An example of such a network is described in application PCT WO2016120826A2 in the name of the applicant, the contents of which are incorporated here by reference. The terms "entity," "Wallet Node," "WN" or simply "node" are used to describe a node of such a network, and such a node is identified by its public key or an address derived therefrom, it being possible to use the terms "key" and "address" to mean the identifier of a node, and vice versa.

Figure 23:
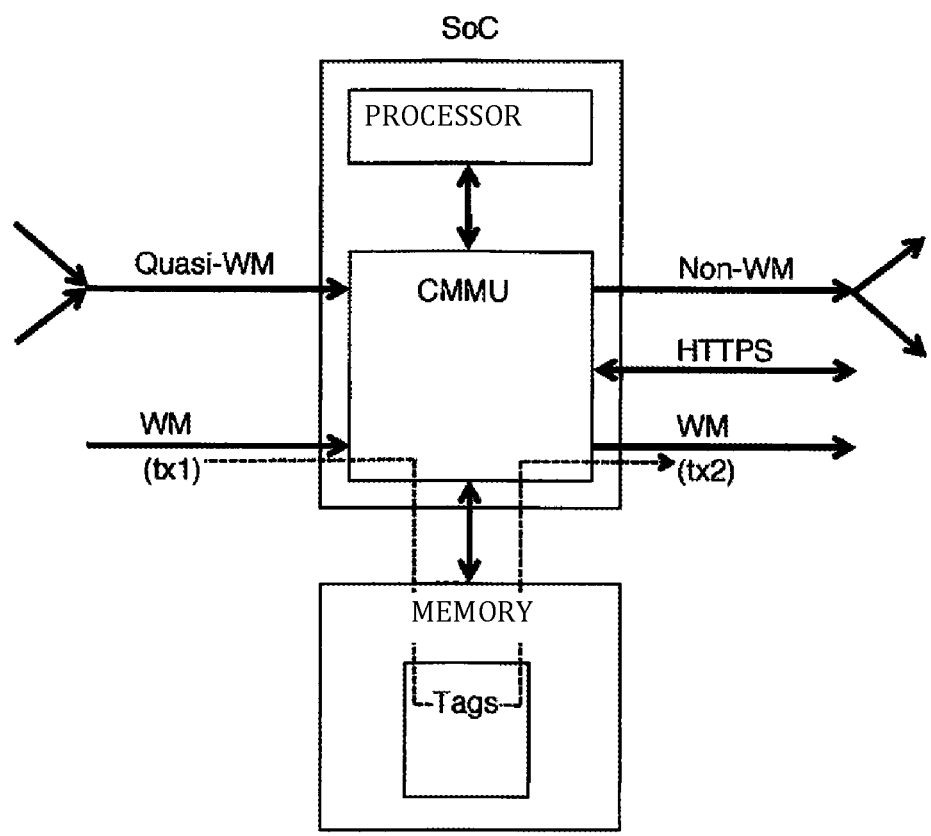
FIG. 23 presents the general architecture of a Wallet Node.

FIG. 23 shows the architecture of a WN. With reference to this Figure, the "Quasi-WMs" are (incoming) messages that are not emitted by a WN but whose format is the same in the sense that, like WMs, they contain the hash of the WP to be executed upon receipt of the message. Thus, for example, when the user initiates a transaction (via his/its terminal to which the WN is paired), his/its "Quasi-WM" contains the hash of the WP generating this transaction (this information being automatically added by the terminal). Another example, when a WP outsources a "non-lightweight" (see below) processing operation to a remote computer, the result is returned to it in the form of a "Quasi-WM" containing the hash of the WP that outsourced it to it.

Advantageously, this architecture envisages that the processing operations of the PROCESSOR are lightweight and the emissions of WMs and Non-WMs are non-blocking:

Non-blocking: A response of a WN with respect to a WM is another WM that refers to the first. Neither is the execution of a WP awaiting the "User" or "Network" response to an emitted "Non-WM" blocking—the "User" being the user's terminal (such as a computer) and the "Network" representing a remote device (such as a computer)—these messages being synchronous calls whose callback is converted into a Quasi-WM.

Lightweight: When a WP must perform a processing operation that is not lightweight (for example, multiply two matrices of around a hundred rows by around a hundred columns), it outsources it (by a Non-WM) to a computer capable of executing processing operations in a secure environment (such as the SGX enclave of the new Intel microprocessors) and capable of returning a certificate of authenticity and integrity of the execution [https://software.intel.com/en-us/articles/intel-software-quard-extensions-remote attestation-end-to-end-example].

The object of the "HTTPS" messages emitted by a WN is to enable the latter to access a data source (on a "trusted" website) in end-to-end HTTPS protocol. To do this, the WN takes charge of the TLS handshakes (that can be implemented by using a library such as "mbed TLS" [https://tls.mbed.org/] whose modules are loosely paired and which enables parts of it to be used without having to include the entire library) and performs all of the cryptographic operations, leaving to the terminal to which it is paired the role of input/output interface taking charge of the lower layers (TCP), to ensure the integrity of said end-to-end data.

Advantageously, as with the "non-lightweight" processing operations (which are outsourced by Non-WMs), the messages in HTTPS being regarded as "blocking" are outsourced to a computer capable of returning a certificate of authenticity and integrity of execution (SGX enclave). In practice, the HTTPS messages emitted that turn out to be blocking (after a period equal to a given threshold) are automatically cancelled and outsourced.

The fact that the messages are lightweight and non-blocking enables the WNs to be implemented without the need for the most recent chip-manufacture technology and places them within the reach of a larger number of WN manufacturers (and reduces their cost), thus tending to encourage decentralization also with respect to manufacturers, which is one of the objects envisaged by the invention. Classes of applications will be described later (in the section "Knowledge transaction without trusted third-parties").

Lastly, FIG. 23 shows that the WMs are capable of transferring values (tags) in the form of transactions (tx), as described later in the sections "Tags," "CMMU—Crypto Memory Management Unit" and "Improvements to CCCs."

A certain number of aspects and characteristics of systems based on such WNs will now be described in detail.

Decentralized Identity

Firstly, a method will be described for assigning to a WN a connection weight, based on identifications between WN users by passing along different paths in the graph, then different methods using said connection weights will be described.

Communication on Out-of-Band Channels

In order to identify oneself in a decentralized manner, individuals can, via respective intelligent terminals, exchange their respective public keys directly and confirm with one another the attributes associated therewith. It is essential at this step to protect oneself from a Man in The Middle (MitM) attack. An example of a method for two individuals to exchange their keys without risking an MitM attack (a method that can be adapted for n individuals) is as follows:

1. A first user (and his terminal, for example a mobile phone) approaches another user and shows him a nonce (a random number that can be used only once), presented in the form of a QR code generated in his terminal on the basis of this nonce.

2. Said other user (who is nearby, by means of his terminal) photographs this QR code, interprets it to reconstitute this nonce, calculates its hash (hash means the result of the application of a common predetermined cryptographic hashing function), and returns to the first user his own public key in plain text and his signature (of the hash) of said nonce. (It will be noted that instead of—or in addition to—the QR code, a secret passphrase can be communicated orally, this can be done over the phone if the other user is not nearby, and the other user calculates in his terminal the hash of this passphrase instead of the hash of the nonce, then returns thereto his signature with his key).

3. The terminal of the first user verifies the signature in relation to the key received and to the nonce (and/or passphrase) and saves the (public) key of the other user.

4. Provided that their terminals are reliable (see the description of Wallet Nodes in WO2016120826A2), the two users can now communicate encrypted information to one another (optionally by generating/using a common Diffie-Hellman symmetric key)—obviously to be started by communication by the first user of his public key (encrypted by means of the public key of the other user). These communications also include the keys of other users that each user was previously able to receive by using the same method or keys communicated by yet other users to these other users by the same method, and so on.

The node of the first user is said to be "IRL-connected" (IRL for "In Real Life") to the node of each of said other users having communicated to it its key by the method described above, each node being identified by its public key (or an address that is derived therefrom).

Provided that (as mentioned above) the nodes also communicate to one another the keys of nodes that are not IRL-connected but indirectly connected via one or more intermediate nodes, each node can reconstitute part of the network, constituting its "surrounding," and associate a "connection weight" to each node of the surrounding.

Several embodiments will now be described of a method for determining, by a first node (N1, the user), respective connection weights (with respect to the first node) of the nodes (all called "second node") constituting its surrounding.

The methods are illustrated by an example of 8 IRL-connections (or "real connections") in the surrounding of a node N1, composed of six nodes (including N1) for which the connection weight is therefore to be determined. The connections are bidirectional and the solid lines represent the IRL connections.

These methods are implemented according to configuration parameters (such as thresholds or weighting coefficients), which can advantageously be refined by learning.

It should be noted that application WO2016120826A2, which is incorporated here by reference, describes how to complete such a decentralized identification process, based in particular on user attributes recognized by other users and based on the WN graph.

Such methods can be combined together.

Connection Weights by Distillation

The method is implemented by the first node (N1), which associates with each node of its surrounding a connection weight and an influence factor (which are implicitly equal to zero by default). Initially, the first node has an influence factor equal to 1 (and all the other nodes implicitly have a null influence factor). The method comprises the following steps:

Step 1: The connection weight of each second node is the normalized sum of the influence factors of the nodes (referred to as "third nodes") which are IRL-connected to it (or to which it is IRL-connected), added to its previous connection weight. The connection weights are then normalized again (that is to say, divided by 2).

Step 2: The influence factor of each third node is the normalized sum of the connection weights of the (second) nodes which are IRL-connected to it.

Step 3: the process is repeated starting from step 1 until convergence (that is to say, as long as the difference between the last connection weights determined in step 2 and the previous connection weights remains greater than a threshold).

Figure 1A:
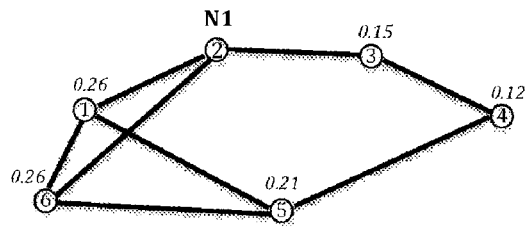
FIGS. 1a, 1b and 2a, 2b present the methods of calculating the connection weights of the connection nodes of the user's surrounding.

FIG. 1a presents an example of IRL-connections between nodes. The connection weights resulting from the method, associated by the first node with the nodes of its surrounding, are indicated on each node. Note that node 3, which is IRL-connected, has a connection weight (equal to 0.15) less than that of node 5 (0.21), which is not IRL-connected, this being due to the fact that the latter is indirectly connected via the cluster of nodes 1 and 6.

Advantageously, the first node (the user) will accept messages (WMs) only from nodes whose connection weight is greater than or equal to the smallest connection weight of the connection weights of the nodes to which it is IRL-connected. In other words, for the user, the messages (WMs) from the nodes whose connection weight is less than the connection weights of all the nodes IRL-connected to the first node are not valid. Thus, in the example in FIG. 1a, N1 accepts the messages (WMs) arriving from any node of its surrounding except for node 4 (whose connection weight, 0.12, is less than the connection weights of all of the nodes IRL-connected to the first node, that is to say nodes 1, 3 and 6).

It should be noted that the validation of WM can be implemented with a coefficient applied to the connection weights (determined according to the configuration parameters, as already said). Thus, the messages (WMs) from nodes whose connection weight multiplied by a given coefficient is less than the connection weight of all the nodes IRL-connected to the first node are not valid.

Figure 1B:
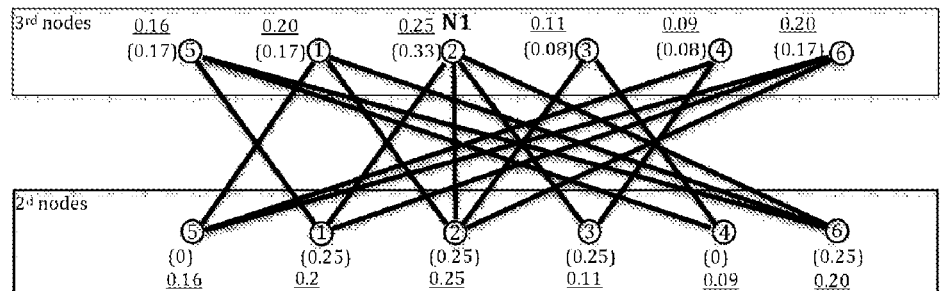

FIG. 1b presents these same nodes placed in a set of second nodes ($2^{nd}$ nodes) and third nodes ($3^{rd}$ nodes). The respective influence factors of the third nodes and the respective connection weights of the second nodes are indicated in brackets insofar as their values after first iteration are concerned, and they are underlined when they have converged.

Finally, at step 1 of this method, a coefficient (determined according to the configuration parameters, in particular the size of the surrounding) can advantageously be applied to said previous connection weights before addition.

Connection Weights as Proximity

According to this variation, a first node (the user) assigns a "connection weight" to a second node based on the number of intermediate nodes leading to it (and on configuration parameters).

For example, a weight 1 is associated with the first node itself; a weight of 0.5 is associated with the nodes that are IRL-connected to the first node, and a weight of 0.25 is associated with the nodes that are IRL-connected to the latter nodes, and so on, dividing them by two (if that is the parameter) upon each addition of an additional intermediate node.

Each additional path leading to the same node further increases the connection weight associated with this node. For example, if, to a node with which a current connection weight of 0.25 is associated, another path contributes 0.12, the factor associated with this node is increased by half of this additional contribution (if this is the parameter), i.e. 0.25+0.12/2=0.31 (half of the additional contribution is added to the highest contribution).

Figure 2A:
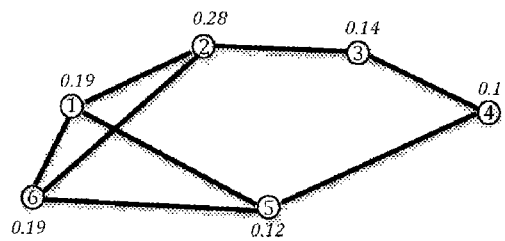

The connection weight is normalized. FIG. 2a shows an example of connection weights as "proximity" to a node N1, associated by this node with the nodes of its surrounding.

Mixed Method

A first node (the user) assigns a "connection weight" to a second node as follows:

Among the nodes of the surrounding of the first node
the more third nodes there are which are IRL-connected to the second node
and the closer they are to the first node, the greater the weight of connection of the first node to the second is
the influence of the third nodes also being a function of the connection weights of the second nodes which are IRL-connected to them.

As in the case of the "Connection weight by distillation" method, this circular definition requires an iterative method by successive refining operations until convergence (or quasi-convergence, that is to say until the gain of an additional iteration becomes negligible), a method wherein a given node in turn can play the role of second and third node.

An implementation of the method can comprise the following steps:

Step 1: With each node of the surrounding of the user, a proximity factor (proximity to the first node) is associated, based on configuration parameters, as described in the previous section "Connection weights as proximity."

Step 2: With each (second) node of the surrounding of the user, a connection weight is associated, which is equal to the (normalized) sum of the respective proximities of the (third) nodes which are IRL-connected to it.

Step 3: With each (third) node of the surrounding of the user, an influence factor is re(associated), which is equal to the sum of the connection weights of the (second) nodes of the surrounding of the user. This factor is normalized.

Step 4: With each (second) node of the surrounding of the user, a new connection weight is associated, which is equal to the normalized sum (on nodes IRL-connected to the second node) of the "influence*proximity" products, the "influence*proximity" product being normalized, that is to say equal to the normalized sum of the respective influences of the (third) nodes of the surrounding of the user that are IRL-connected to the second node weighted by their respective proximities to the first node (or another combination of these factors, as described below).

Step 5: Repeating starting from Step 3 as long as the difference between the last connection weights determined at Step 4 and the preceding connection weights remains greater than a threshold (based on configuration parameters).

Figure 2B:
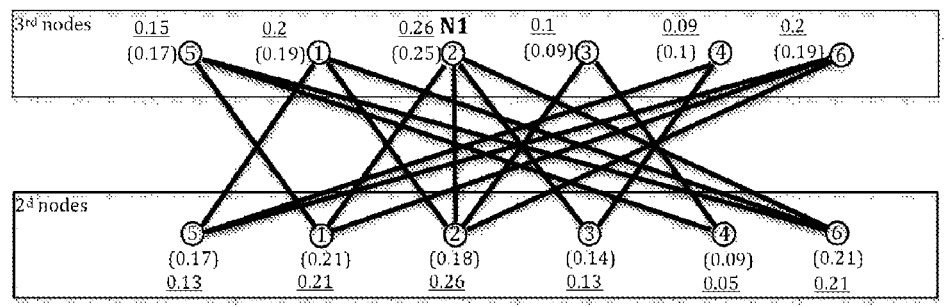

This method is illustrated in FIGS. 2a and 2b based on the same example of a surrounding of 6 nodes whose connection weight is to be determined.

FIG. 2a represents the nodes of the surrounding of the user with their respective proximity factors (calculated in step 1) in relation to the first node (identified by "2"), factors indicated in italics.

FIG. 2b represents these same nodes in two sets: the set of the third nodes ("$3^{rd}$ nodes") and the set of the second nodes ("$2^{nd}$ nodes"). This Figure indicates (in brackets) an initial connection weight (calculated in step 2, in relation to the first node) for each second node (as being the sum of the respective proximities of the third nodes that are IRL-connected to it). The initial influence factor (calculated in the first execution of step 3) is indicated in brackets to the left of each third node (this factor is equal to the sum of the connection weights of the nodes to which the third node is IRL-connected). The connection weight (in relation to the first node) calculated in step 4 after convergence, is indicated by underlining (in $2^{nd}$ nodes).

In this example, the initial connection weight with the value 0.09 for node "4" (which is indicated in brackets in FIG. 2b in the second nodes) is obtained by adding the proximity factors of nodes "3" and "5" (indicated in FIG. 1a) then dividing the result of this addition by the total of the connection weights in order to normalize them (0.14+0.12)/2.76=0.09). The initial influence factor of value 0.09 associated with node "3" (which is indicated in brackets in FIG. 2b in the third nodes) is obtained by adding the initial connection weights of the nodes "2" and "4" (indicated in brackets in FIG. 2a in the second nodes) and then dividing the result of this addition by the total of the influence factors in order to normalize them (0.18+0.09)/2.96=0.09). In the last steps, the connection weight is obtained by adding up (and by normalizing) the "influence*proximity" products. The method here converges in three steps to provide the value 0.1 for the final influence factor associated with node "3" (indicated by underlining in FIG. 2b in the third nodes) and the value 0.05 for the final connection weight of node "4" (indicated by underlining in FIG. 2b in the second nodes). With regard to the final connection weight of node 5, the method converges to the value 0.13, which is equal to the value for node 3.

Finally, in a last variation, in step 4 of the mixed method, the "influence*proximity" term of the expression for calculation of the connection weight can be replaced by an expression of the type "lambda*fluence+(1-lambda)*proximity" and the lambda coefficient typically can take on the value 0.5. Advantageously, with each iteration of step 5, this coefficient is increased, the proximity factor (proximity to the first node) of each third node thus gradually making way for the weights of connection to the first node, of the second nodes which are IRL-connected to it.

Various embodiments of a method for determining connection weights, such as the methods presented above or in application WO2016120826A2, can be combined. Advantageously, their results can be weighted according to coefficients refined by learning. These results enable the first node (the user) to validate other nodes in the context of the different methods presented in this text.

Redundant Key Communication

The connection weights make it possible to use a connection method similar to the one described above in the section "Communication on Out-of-Band Channels," but automatically, if a plurality of nodes are used redundantly.

A process implementing this method is described below in an example of a key exchange between a first node (Alice) and a second node (Bob) via intermediate nodes having a high connection weight in relation to the first node. For this implementation, the WNs corresponding to these nodes are capable of receiving or emitting messages on a plurality of channels (such as SMS, email, etc.). This method comprises the following steps:

1. The WN of Alice selects N intermediate nodes among those having the highest weight of connection to the Alice node and preferably having, if applicable, the highest weights of connection to the Bob node (here three intermediate nodes are selected (N=3), this number being determined according to configuration parameters, as a function in particular of the value of these connection weights), and communicates to them in an encrypted manner a nonce to be communicated to the Bob node;
2. The WNs of said intermediate nodes use a separate and easily automated channel, such as SMS, to (redundantly) communicate the same nonce to the Bob node, as well as their respective public keys (it is even better if they use channels that are different from one another);
3. The WN of the Bob node detects the arrival of these nonces and returns, to said intermediate nodes, its signature of this nonce as well as its public key encrypted by means of the public keys of the latter;
4. The WNs of said intermediate nodes verify the signature by the Bob node of this nonce (by decrypting it with its public key and by verifying its hash) and, in the case of success, communicate to WN of Alice, the key of the Bob node signed by themselves and encrypted with the public key of Alice;
5. The WN of Alice then saves the key of the Bob node and can then exchange encrypted information with this node.

The keys thus exchanged can then represent connections that are all the more secure the higher the connection weights of said intermediate nodes are and the more significant their number is. The connections with the nodes for which said intermediate nodes have high connection weights and are present in sufficient number are marked "quasi-real" and the method of determining connection weights (such as those described above: "Connection weight by distillation," "Connection weight as proximity" and "Mixed method") likens them to IRL-connections, to the nearest coefficient.

Advantageously, in step 1 of the above method, instead of the WN of Alice generating said nonce individually, this nonce is generated jointly with the WNs of said selected intermediate nodes. This complementary method is also automatic and includes the following steps:
1. generation of a nonce by each one of said WNs of the selected N nodes as well as by the WN of Alice (each generates a nonce separately and keeps it secret until step 3);
2. exchange (in an encrypted manner) between these WNs, of the hashes of said respective nonces which they generated (without yet disclosing the nonces themselves);
3. exchange (in an encrypted manner) between these WNs, of uncoded nonces, and each receiver node verifies that the received nonces correspond in fact to the respective hashes received in step 2;
4. generation of the final nonce (the one to be communicated to Bob) by combination, according to a previously agreed-upon common rule (such as simple arithmetic operations), of said respective nonces which they generated.

Moreover, in step 2 of the "Redundant key communication" method, the intermediate nodes do not simply communicate the same final nonce to the Bob node, but instead they also communicate the respective nonces which they each generated separately (as described above); in step 3, Bob signs the set of these nonces received; this allows the N intermediate nodes to ascertain in step 4 that Bob has in fact received the N nonces communicated to him in total.

Advantageously, in the case in which, on the two sides, the connection weights of a sufficient number of intermediate nodes are high (in relation to Alice and in relation to Bob), the WN of the first node (Alice) obtains the key of the second node (Bob) directly from these intermediate nodes.

Utilizing an Existing Social Network

"WN app" application on a social network will now be described. The user "Alice" of this app constitutes one of the nodes of the social network. This app is capable of receiving and emitting messages on a plurality of channels (such as SMS, email, etc.).

Upon installation, the WN app:
generates its pair of private/public keys (unless the WN app is paired with a hard WN (system-on-chip or enclave, described later, in which case this pair of keys already exists);
stores a list of directly connected "Friend" nodes, provided by the social network: Friends(Alice)
and determines (by requests to the friends) which friends have the WN app installed (and the friends who do not have it are invited to install it):
FriendsWN(Alice)

To the extent that certain nodes are IRL-connected and serve as intermediaries, the connection weight of a friend can be determined according to the above-described method, be added as attribute to said list of friend nodes and be made accessible from this list. Thus, friends having a connection weight greater than a given threshold (this threshold being determined according to configuration parameters) can be retrieved by a function call such as the following:
FriendsWNConnected(Alice)

To be IRL-connected to a friend node "Bob" which is part of FriendsWN(Alice), Alice can communicate to him via an Out-of-Band-Channel a nonce which Bob must return to her signed, as described above.

However, the social network can be utilized to communicate the key of the WN app of the Bob node according to an automatic method (simply by extending the method described in the section "Redundant key communication"):
1. The WN app of the Alice node selects N friends, among the elements of the intersection between FriendsWNConnected(Alice) and FriendsWN(Bob), having the highest weight of connection to the Alice node and preferably also having the highest weight of connection to the Bob node (here N=3, this number N being determined according to configuration parameters, in particular as a function of the value of these connection weights), and communicates to them in an encrypted manner a nonce to be communicated to the WN app of the Bob node;
2. The respective WN apps of these friends use a separate and easily automated channel, such as SMS, to (redundantly) communicate to the WN app of Bob this same nonce, as well as their respective public keys (it is even better if these friends use channels that are different from one another);
3. The WN app of Bob detects the arrival of these nonces and publishes its public key and its signature of this nonce in the social network (on its wall)—in addition, optionally, the WN app of Bob returns directly to the WN apps of said three friends of Alice, its signature of this nonce and its public key, which are encrypted by means of the public keys of the latter friends;
4. The respective WN apps of said three friends of Alice verify the signature by the WN app of Bob of this nonce (by decrypting it with its key and verifying its hash) and, in the case of success, communicate to the WN app of Alice the key of the Bob node signed by themselves and encrypted with the public key of Alice (advantageously, in addition, they certify this key by publishing their own signature on Bob's wall);

5. The WN app of Alice then verifies (double checks) the key of the Bob node by decrypting its signature published on his wall with this key and by verifying the hash of the nonce, saves the key of the Bob node and can then, in the case of success, exchange encrypted information with the Bob node.

Here again, the connections with the nodes for which said friends have high connection weights and are in sufficient number are marked "quasi-real" and the method for determining the connection weights likens them to IRL-connections, to the nearest coefficient.

Advantageously, the public key of Bob published by Bob in the social network is always accessible by at least all of the nodes connected to Bob as friends.

And here again, advantageously, in step 1 of the above method, instead of the WN app of Alice generating said nonce individually, this nonce is generated jointly with the WN apps of said selected friends nodes. This complementary method is the same as the method presented above, except that the WNs here are WN apps.

As also described above, said N friends will also communicate to Bob the different nonces (respectively) from which the final nonce was generated, which will allow them to verify that Bob has indeed received the N nonces which they communicated to him in total.

Finally, in the case in which, on the two sides, the connection weights of a sufficient number of intermediate nodes are high (in relation to Alice and in relation to Bob), the WN of the first node (Alice) obtains the key of the second node (Bob) directly from these intermediate nodes. Thus, in order to be connected to the WN app of a "Bob" node, an "Alice" node can ask him (by a WM) for its friends having a high connection weight:

FriendsWNConnected(Bob), and take the intersection with its own highly connected friends:

FriendsWNConnected(Alice), and if this intersection is not null, request the key of Bob from a subset of this intersection consisting of the friends selected from those having the highest connection weights.

Mirror WNs

Advantageously, a redundancy is created for each node with "mirror nodes" in which the data are kept synchronized and wherein some perform mirrored processing operations so as to simultaneously:

overcome non-responsiveness and mitigate the risk of tampering.

Definition

A "node" (Wallet Node) is now a virtual node (notated as $VWN_x$, for "Virtual Wallet Node" of the user x), embodied by a plurality of mirror nodes comprising:

a Real Wallet Node (RWN), corresponding to said virtual node, and a set of Countersigner Wallet Nodes (CWN).

In this aspect of the invention, two nodes (WNs) can only be connected by smart contracts (see the Wallet Program (WP) smart contracts described in application PCT WO2016120826A2) which are executed on their respective nodes:

if they are each associated with a number greater than the first given threshold of common mirror nodes having connection weights (in relation to each of one these two nodes) greater than a second threshold (thresholds determined according to configuration parameters) and when two nodes interact by execution of a smart contract (WP), a message (WM) sent from one to the other is valid only if at least 10% (or another percentage also determined according to configuration parameters, or a given number also determined according to configuration parameters) of the common mirror nodes have executed this contract identically ("in mirrored mode") and have emitted an identical message (WM) to the other node.

In other words, a node receiving a message (WM) validates this message only if the respective sets of mirror nodes of the emitter and receiver nodes have an intersection of which the number of elements is greater than a first given threshold and if the receiver node has received this same message (redundantly) from at least one given number or one given fraction (corresponding to a second threshold, also according to configuration parameters) of said mirror nodes belonging to this intersection.

For example, the real WN app of the Bob node will consider a WM sent by the real WN app of the Alice node to be valid only if it also receives this message emitted (in the name of the Alice node) from at least 10% of their common mirror nodes (which are also WN apps, for example).

Each node executing the Wallet Programs synchronizes its data, namely: the PSV (Program State Variables) and NSV (Node State Variables), as well as its Tags (described below) over the set of its mirror nodes, this set including the union of all of the respective sets of mirror nodes that are in common with the nodes with which said each node has an active Wallet Program.

Said synchronizations of data are carried out:

in part by sending (by Wallet Program) WMs which trigger the updating of the data (PSV, NSV and tags) by the (same) Wallet Programs which are executed on the receiver nodes and for the nodes that do not receive them, the data are synchronized directly by data-update-notification WMs.

Each node synchronizes the list of its mirror nodes with the nodes with which it has a connection weight which is higher than a threshold, and said data synchronizations are carried out there with respect to these lists of mirror nodes. The synchronization of the lists is carried out by corresponding WMs.

Figure 3A:
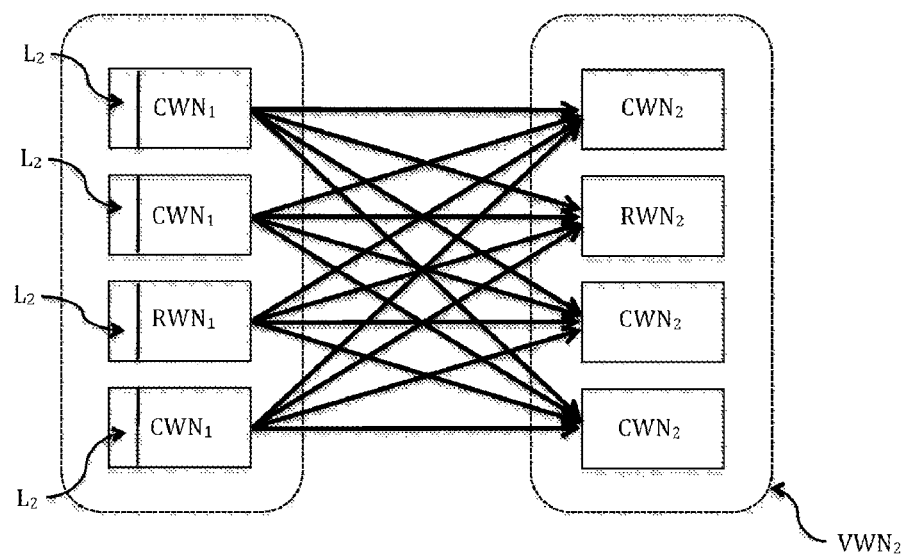
FIGS. 3a to 3d diagrammatically present the sending of messages between mirror nodes.

FIG. 3a shows the propagation of a WM from a given VWN1 to a receiver VWN2. The mirror nodes RWN1, CWN1 each store the list L2 of the mirror nodes of VWN2 in order to be able to route the WM of identical content for all of the emitter mirror nodes and the receiver mirror nodes.

Figure 3B:
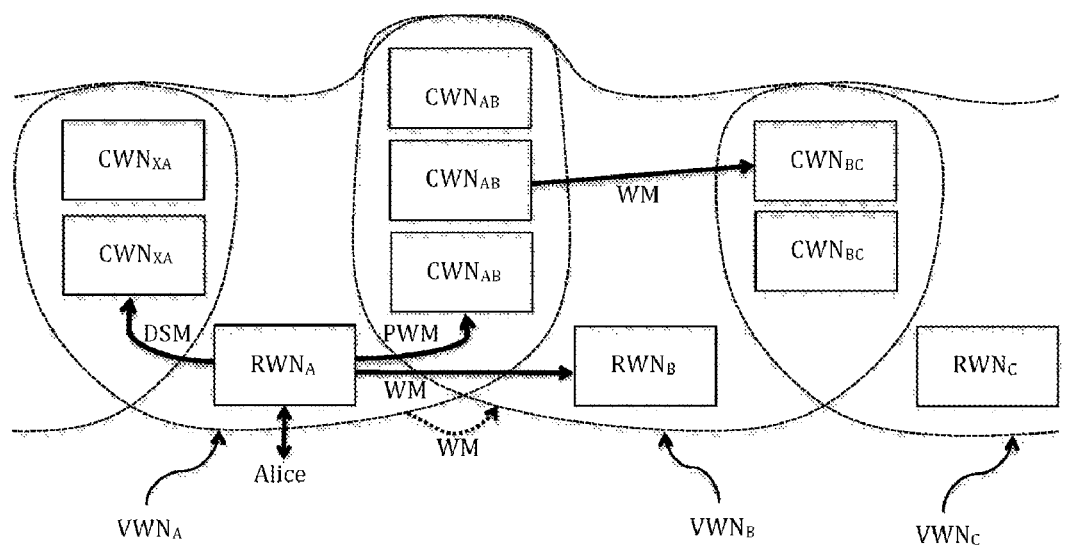

FIG. 3b describes in finer detail the sending of messages between mirror nodes. It shows, from among the sets of countersigner nodes in common, $CWN_{AB}$ between the nodes of Alice and Bob, on the one hand, and $CWN_{BC}$ between the nodes of Bob and Carl, on the other, the union of these two sets (+ the real Bob node $RWN_B$) being the set of mirror nodes of the Bob node, which are synchronized following any WM sent to the Bob node.

Thus, the nodes of Alice and Carl each know not only their respective mirror nodes in common with the Bob node, but also the entire set of mirror nodes of the Bob node (thanks to the above-mentioned synchronization of the list of mirror nodes).

FIG. 3b also shows a WM generated by the Alice node after an interaction with the user (Alice), a WM which is to be sent to the Bob node. First, an announcement message (notated PWM, for Pre-Wallet Message) of the WM is sent by the real Alice node $RWN_A$ to mirror nodes of Alice $CWN_{AB}$ which are in common with the Bob node (only one PWM being shown so as not to complicate the Figure), and the other nodes of Alice $CWN_{XA}$ receive a data synchronization message (notated as DSM, for Data Sync Message]. Then, the real Alice node $RWN_A$, and each one of said countersigner nodes $CWN_{AB}$ in common with the Bob node, sends the WM in question to the Bob node, that is to say to the real Bob node $RWN_B$ and to the countersigner nodes of the Bob node (only some of these WMs being shown so as not to complicate the Figure).

It should be noted here that when such a WN is to be sent by a CWN to itself, it is not emitted (here, $CWN_{AB}$ does not send the WN to itself).

Figure 3C:
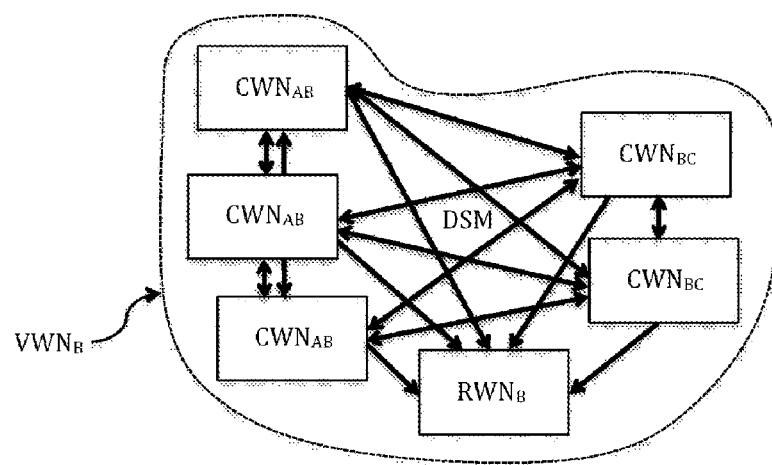

FIG. 3c shows a phase of an attempt at synchronization of the set of the mirror nodes ($RWN_B$, $CWN_{AB}$, $CWN_{BC}$) of Bob via DSM type messages, in a situation where the real node $RWN_B$ is non-responsive for one reason or another.

Figure 3D:
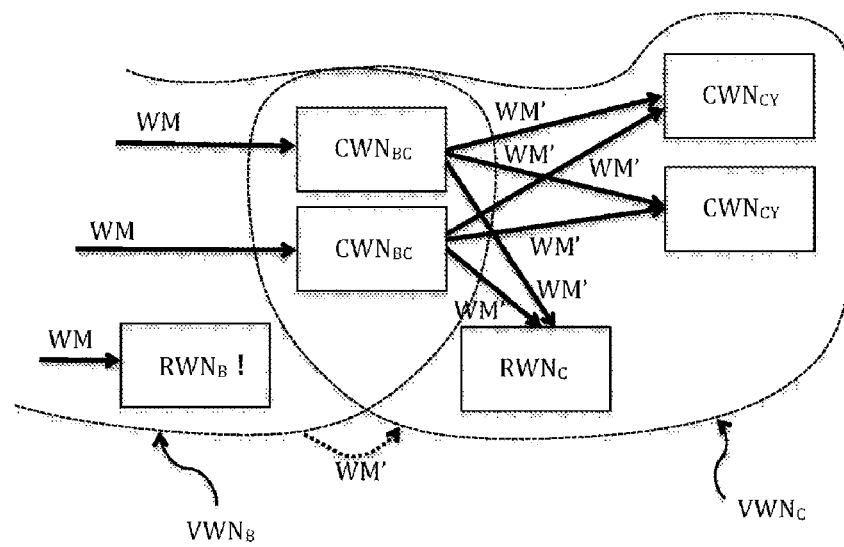

Finally, FIG. 3d shows a WM' sent by the node $VWN_B$ to the Carl node $VWN_C$, a message generated not after an interaction of the real Bob node with its user (Bob), but after said WM received from the Alice node (generated by the instructions of the executed WP). In this case, the mirror nodes which have in fact received this message from the Alice node are capable of generating said message for the Carl node (by the execution of this WP). FIG. 3d shows, however, that the real Bob node is non-responsive and so does not emit the message WM' (which is represented by a "!" in the Figure), and that, in spite of this, the other mirror nodes of the Bob node send this message to the Carl node $VWN_C$ (which solves the problem of non-responsiveness).

Finally, again, since WM' is emitted (by the Bob node) not after an interaction with the user but by the execution of a smart WP contract (on this Bob node) in response to a WM (received from the Alice node), each of the mirror nodes of $VWN_C$ which receive WM' will request the receipt of an identical message from 10% (or another percentage determined according to configuration parameters) of the mirror nodes $CWN_{BC}$ in common with this node (of Bob). Carl can thus count on the fact that said message has indeed been generated and has been generated by the smart WP contract in question which has not been altered (in this way the commitment guarantee problem is solved).

A process of selection of mirror nodes will now be described.

For each node, the connection weights of the mirror nodes are each greater than or equal to the lowest connection weight of the IRL-connected nodes (or in quasi-real-connection) of its surrounding. Advantageously, a coefficient can be applied to it: the connection weight of each mirror node must be greater than or equal to the lowest connection weight multiplied by a coefficient (determined according to configuration parameters), among the connection weights of the nodes to which it is IRL-connected (and by another coefficient for the nodes in quasi-real-connection).

Among said mirror nodes in common between an emitter node and a receiver node of a WM, at least one (or a certain number according to configuration parameters) of them is a hard WN (a hard WN is an SoC as described in application PCT WO2016120826A2 and below in the section "CMMU," or an enclave as described in the sections "Mixed Network of WN SoCs and WN Enclaves," "Mixed Network of WN SoCs and Body Enclaves" or a Body SoC, as described in the section "Mixed Network of Body SoCs and Body Enclaves"), the public key (corresponding to the secret private key) of each hard WN being certified by its manufacturer, and these hard Wallets possibly being produced by different manufacturers—however, the messages exchanged between nodes are only valid if the nodes of their manufacturers themselves are linked by mirror nodes from common manufacturers (see the description below).

In the event of a conflict detected with the mirror nodes of a given node (conflict detected during synchronizations between the mirror nodes associated with a node, or following the receipt of incompatible WMs from the mirror nodes of said given node, etc.), the node that detects this conflict reports the information of the keys of the mirror nodes that are in conflict to their respective manufacturers and these keys are then revoked by these manufacturers. Then, after the recycling thereof, they are replaced. This is implemented according to the following steps:

- associated with each manufacturer is a hard WN representing it and of which it is itself the manufacturer (certifying its own public key);
- each manufacturer node is IRL-connected to the node of every other manufacturer that communicated its key by the method described in the section "Communication on Out-of-Band-Channels," some of which also communicating to it keys of other manufacturer nodes which are thus indirectly connected, each thus constituting its surrounding, a connection weight being associated with each node of the surrounding, as described above;
- for any WM to be validated by its receiver node, the respective sets of mirror nodes of the manufacturer node of the emitter node, on the one hand, and of the manufacturer node of the receiver node, on the other, must have an intersection, the number of elements of which is greater than a given threshold (this in addition to the two conditions specified above concerning the mirror nodes of the emitter and receiver nodes)—the number of mirror nodes of said intersection being advantageously weighted by the number of active hard WNs manufactured by the respective manufacturers of these manufacturer mirror nodes (cf. "Manufacturer Weights" below);
- in the case of conflict (during a synchronization (by DSM), or upon receipt of incompatible WMs from mirror nodes of the same emitter node, etc.), the information of the keys of the mirror nodes that are in conflict is communicated by sending messages (WMs) to the nodes of their respective manufacturers (and, if they are different, to their respective mirror nodes);
- the manufacturer nodes (that is to say the mirrors thereof) record the keys of the mirror nodes in conflict in a revocation list;
- the mirror nodes in conflict that are hard WNs are replaced by their respective manufacturers;
- if the conflict is resolved, said synchronization (DSM) and/or the WM which, if necessary, was suspended because it was in conflict, is resumed/resent, respectively;
- if the conflict persists, the majority of the hard WNs are considered to be bona fide and the mirror nodes that differ from them are invalidated and blacklisted.

The information of the blacklisted nodes is immediately communicated to the nodes of the surrounding of the user and from these to the nodes of their own surroundings, and so on (and the method can be sophisticated, depending on the state of the art and progress in the field of byzantine consensus protocols).

Manufacturer's weight: As previously stated, manufacturer nodes are advantageously weighted depending on the number of active WNs of the manufacturer in question. In this context, a hard WN of a manufacturer whose manufacturer node has a manufacturer weight below a certain threshold (depending on configuration parameters) is regarded as a soft WN. Furthermore, the rules to be followed for manufacturers of hard WN enclaves (see the section "Mixed Network of WN SoCs and WN enclaves" and subsequent sections) can be configured differently to the rules for manufacturers of SoCs.

A possible approach to determine the number of active WNs of a given manufacturer can consist in browsing the blockchain and counting the number of nodes that were involved in transactions by referring directly or indirectly to the manufacturer's certificate (signature by the manufacturer, see elsewhere). More generally, the existence of interactions with other nodes and values of connection weights of the nodes involved in these interactions can be taken into account.

It should be noted that a cost token, analogous to the "gas" of Ethereum (see Ethereum: A secure decentralized generalised transaction ledger, EIP-150 revision, Dr. Gavin Wood—Appendix G. Fee Schedule—http://paper.gavwood.com/), which makes it possible to identify the relative cost between the operations (calculations, storage, access to memory, etc.) of a contract execution can be used to control the processing operations by mirrors.

WN Emitting a Message to the Outside World

In order to send a message to the outside world (that is to say to an entity that is not a WN) each mirror WN which is a hard WN proposes, to the other hard mirror WNs, if applicable, to emit itself the message in question, and the first wins. The method comprises the following steps:

a first hard mirror WN proposes to the other hard mirror WNs (if applicable) to emit the message in question, a proposal that expires after a pre-agreed duration (according to a configuration parameter);

when such a proposal is received by a hard mirror WN, if this proposal precedes another proposal received or emitted (for said message in question), it is then approved, otherwise it is rejected;

when the number of approvals is greater than half the number of hard mirror WNs that have responded, this proposal is assigned, the message in question is then actually emitted and the other hard mirror WNs are notified that the message in question has in fact been emitted.

Depending on circumstances, the need to emit the message in question can be closed directly or when a return arrives from the receiver. A person skilled in the art will moreover be able to make use of the state of the art as relates to the byzantine consensus protocol.

Tags

Figure 7:
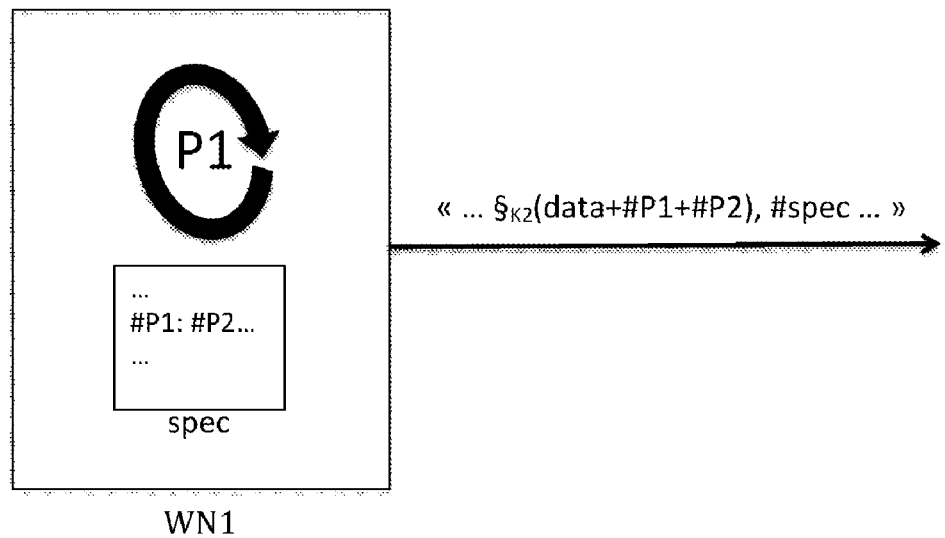
FIG. 7 shows a message comprising a specification of the set of hashes of valid executable codes.

Reference is made again here to the concept of Wallet Node (WN) described in detail in document WO2016120826A2 in the name of the applicant. FIG. 7 of WO2016120826A2 shows a payment of 10 units of account (UA) from a node "WN 1" to a node "WN 2." These 10 UAs are subtracted from the balance of WN1 and added to the balance of WN2, these balances being Persistent State Variables (PSVs) on these WNs.

Figure 4:
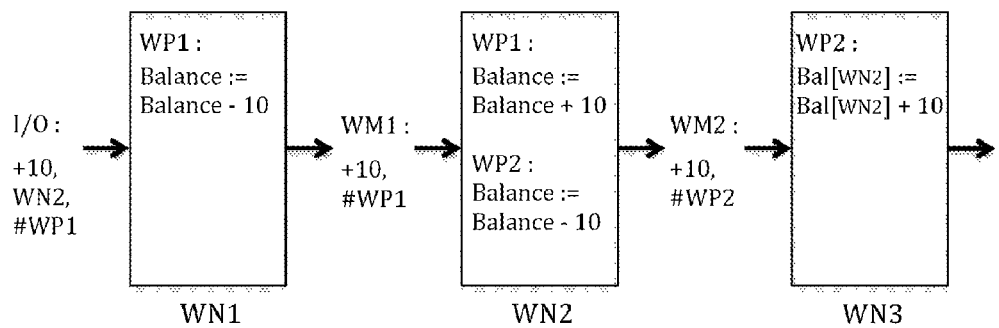
FIG. 4 shows a use of a persistent state variable (tag) by two WPs in a Wallet Node.

In reference to FIG. 4, it will next be considered that said UA balances are not the PSVs of a certain particular WP executed in a WN, but are data, called tags (or value tags), that can be used by the WN regardless of the WP which executes it. UAs supplied in the form of a tag by a WP thus belong to the WN and can be used by another WP on the same WN—they are persistent state variables for the WN considered overall.

To consider an example, the user WN2 who receives a message WM1 of payment from a node WN1, after a sale which the latter carried out, executes a payment Wallet Program WP1 and then pays an insurance premium by executing an insurance Wallet Program WP2. Thus, in the example presented in FIG. 4, 10 UAs are transferred from WN1 to WN2, by means of a message WM1 emitted by executing WP1 (this message comprising the hash #WP1) and these 10 UAs are paid by WN2 to pay an insurance premium, by executing WP2 which sends a message WM2 (comprising the hash #WP2) to a node WN3.

To give a concrete example, BTCs (Bitcoin units) originally coming from a Bitcoin transaction inserted and confirmed n times in the Bitcoin blockchain (as explained below, in this case, the secret private key of the beneficiary WN is a private key corresponding to a Bitcoin address) will now be considered as tag UAs, without this being a limitation, since the same mechanisms can be used for any types of UA, particularly UAs created ex-nihilo by WNs, such as in Gift Cards. In particular, application WO2016120826A2 describes certain uses of tags that are created by an Owner Wallet Node (OWN), which have attributes certified by Viewer Wallet Nodes (VWN) in the context of a transformation chain or supply chain (or else a commercial chain) and which are transferred from one OWN to another, reflecting the fact that the product instances (the physical or immaterial products) which they represent are transferred in the real world between the users of these OWN Wallet Nodes.

Figure 5A:
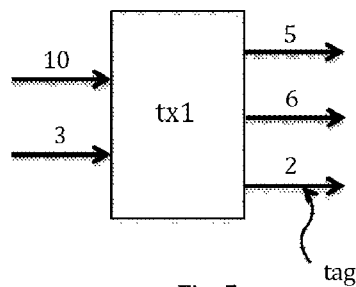
FIGS. 5a and 5b diagrammatically present tag transfer transactions.
Figure 5B:
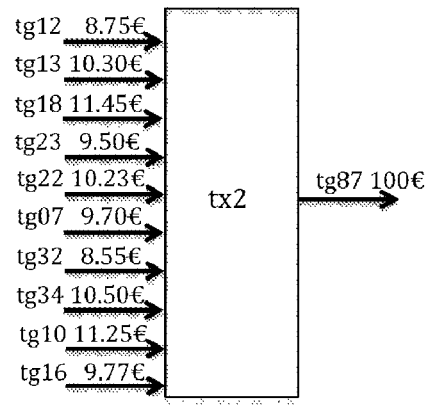

Such tags can be recomposed (that is to say merged or decomposed) in a transaction to yield other tags. For example, with reference to FIG. 5a, in a given transaction (tx1), a tag of 10 UAs and a tag of 3 UAs, constituting the inputs of the transaction, can be recomposed into three tags, constituting the outputs of the transaction, here a tag of 5 UAs, a tag of 6 UAs and a tag of 2 UAs, the total UAs being preserved (the UA in question has not been shown in the Figure, it can be a BTC, for example—a Bitcoin transaction is a particular case of transaction involving the transfer of tags). These transactions will be called "tag transfer transactions." Another example of a tag transfer transaction is shown in FIG. 5b, which shows the case of 10 fish (10 different tags), each having a different value in euros, transformed (for example, cut up) into a fish box (the box having an individual tag having the label "tg87") with a value of 100 euros, this transaction tx2 being generated by the owner OWN of the 10 fish.

It should be noted that the particular case of a transfer of a tag from one OWN to another, even without merging or decomposition, will always be represented here by such a recomposition transaction, this for the purpose of simplicity of implementation. (The implementation of the processing of the tag transfer transactions will be described later in the section "CMMU").

Figure 6:
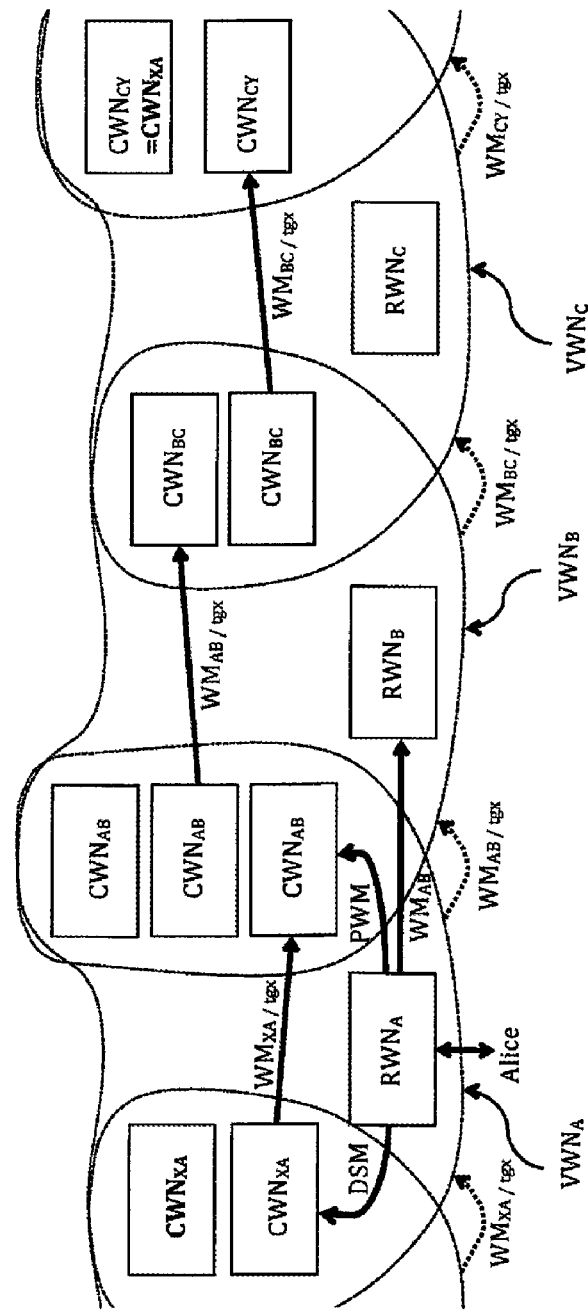
FIG. 6 diagrammatically presents the behavior of mirror nodes in the case of a chain of messages transmitting tag transfer transactions.

With reference to FIG. 6, a method will now be described for using mirror nodes (described above) in order to mitigate the risk of double-spending in a succession of tag transfer WMs, this method making it possible in particular to implement off-chain Bitcoin transactions (the use of the blockchain becoming optional). This Figure shows a message notated "$WM_{CY/tgx}$" sent by the Carl node to a Y node (of which only the countersigner nodes "$CWN_{CY}$" in common with the Carl node are shown in the Figure). This message $WM_{CY/tgx}$ transmits a transaction whose predecessor transactions (in the "tgx" chain of successions of tags) were transmitted beforehand by the messages $WM_{XA/tgx}$, $WM_{AB/tgx}$ and $WM_{BC/tgx}$. The purpose of this Figure is to show that the Carl node is assured of having one or a certain number of mirror nodes in common, of which one is (or some are) hard WNs, with all upstream nodes, including here with the Alice node (this is shown in the Figure as: "$CWN_{CY}=CWN_{X4}$").

Let us recall that a Bitcoin transaction is equivalent to transferring BTCs by signing (with a private key) at least one output of a previous transaction which allocates them to at least one new owner, the Bitcoin address of which is derived from its public key. Here, we consider the case in which the secret private key of a WN is a private key corresponding to a Bitcoin address (that is to say the WN generates a Bitcoin address from its secret private key). A WN is thus able to generate a Bitcoin transaction whose input (or one of whose inputs) is connected with an output (which is intended for it) of an upstream transaction (output which, for example, the user of said WN was able to access due to the fact that said transaction is published in the blockchain and entered in said WN as input into its terminal), and (optionally) to announce (broadcast) said transaction so that it is inserted in the blockchain. This should be understood to mean that this is a real and properly formed Bitcoin transaction which is generated by said WN, although below (in the section "Bitcoin Off-chain Transactions") an explanation of precisely the advantages of not inserting it therein is given.

BTCs spent by a WN can originate from a succession of off-chain transactions (forming a tree) transferring the BTCs from one or more nodes to one or more other nodes, and the intention is to mitigate the risk of double-spending on any one of these nodes generating these transactions. This is achieved by the following additional condition (which is added to the conditions specified above concerning the mirror nodes of the emitter and receiver nodes of a WM): For a WM transferring a given tag (for example 0.5 BTC) to be validated by its receiver node, the set of mirror nodes of the receiver node must have an intersection, the number of elements of which is greater than a given threshold, with the set of mirror nodes of each of the nodes of the upstream tree (of tag transfer transactions) from which this tag originates, and at least one of them (or a certain number of them) must be hard WNs. The implementation of the execution of the method by a WN thus includes the passing from downstream to upstream through the upstream tree conveying the tag transfer transactions and the verification of said condition of intersection of mirror nodes (see also the section "GuardWN, GuardTx and GuardedTx" below, which describes a method doing away with the need for mirrors, except for with the transactions furthest upstream).

Advantageously, each tag includes the information of the tree of upstream tag transfer transactions, each transaction indicating the address of the WN which generated it (these WNs are called "upstream WNs"), which enables a receiver WN of a tag transfer WM to verify directly whether at least one mirror (or a certain number) of all the upstream nodes appears in its surrounding, is part of its own mirror nodes and is a hard WN, and for each upstream WN which is not covered by this case, whether the connection weight of one of its mirrors which is a hard WN would enable it to be part of them (after possible exchanges of new connections with the nodes of its surrounding). Thus, more precisely, associated with each tag are all the upstream tags (that is to say those appearing in the upstream tree, in all of the chains of successions of tag transfer transactions leading to the tag in question), with the address of the owner node which generated it and, if applicable, the address of each one of its subsequent owners (OWNs), as well as the addresses of their mirror nodes, which enables each receiver node of a WM transmitting a tag transfer transaction to directly verify the intersection required between its own mirror nodes and said addresses of mirror nodes of each one of these owners, as well as the fact that at least one (or some, according to the configuration parameters) are hard WNs, and a search for nodes having high connection weights is launched if necessary in order to associate new mirror nodes.

Knowledge Transaction

The ability of WNs to outsource processing operations to trusted computers (capable of returning a certificate of authenticity and integrity of execution, such as computers provided with Intel microprocessor(s) having SGX enclaves), makes it possible to implement a knowledge transaction without trusted third parties directly and more simply than in the state of the art of smart contracts:

Let us assume, for example, that the user U1 (having a Wallet Node WN1 with public key K1) is looking for another user U2 (WN2, K2) who sells it a secret (S1) which U2 knows and which U1 does not know, but for which U1 knows the hash (H(S1)) for one reason or another, and that U1 is ready to pay for this service rendered an amount $R1 (R for Reward) which is currently available in the balance (of tags) of WN1 and U1.

More precisely, such a purchase bid from a WN with key K comprises a set of elements {H(S);$R;$P;T[;params]} announced in this transaction with signature SigK({H(S); $R;$P;T[;params]}) of this WN, where $P is a penalty which a supplier who agrees to supply at time T must pay if he does not do so (see also "Scenario of Use" below). Subsequently, the term {H(S);$R;$P;T[;params]} is also referred to as "bid elements."

In essence, this is how the method works:

1. U1 makes available and broadcasts a Wallet Program (WP1), making it possible to emit three types of messages (only the essential elements have been indicated and in an abstract manner; we shall see the precise components of a WM below):

WMBid: WM(Sig, #WP1), which communicates a service offer declaration for a service "Sig" (corresponding to a signature of bid elements by a WN, as described above), a message of which the recipient is the signer of Sig and which, in the case of acceptance by the latter, commits its emitter (the one who offers the service in question) to paying a penalty of an amount $P in the case of failure to supply within a given time T;

WMAccept: WM(WMBid, #WP1), which communicates, in response to a given WMBid, the acceptance of the service offer in question and which commits its emitter to paying the amount $R (specified in the bid elements in question) on receipt of a WMS message comprising the secret whose hash corresponds to H(S) (specified in the bid elements in question); and WMS: WM(WMAccept, S, #WP1), which communicates the secret S in response to a given WMAccept message and triggers on the receiver WN the verification thereof (with respect to the H(S) specified in the bid elements in question in the previous messages) and, in the case of success of this verification, the generation on the receiver WN of a transaction of payment of the amount $R (also specified in the bid elements) sent to the emitter of this WMS message by a final WM of the receiver WN.

Moreover, on receipt of a WMAccept message, WP1 is able to outsource the processing operations (here processing in order to search by brute force for the secret S) to a trusted computer capable of returning a certificate of authenticity and integrity of execution, a certificate which will be verified automatically by WP1 before emission of the WMS message.

1. U1 announces its bid {H(S1);$R1;$P1;T1[;params1]} which it broadcasts with its signature Sig1({H(S1);$R1;$P1; T1[;params1]}).

Here is the scenario of use:

Let us assume that the user U2 of WN2 does not already know this secret S, and let us also assume that the parameters params1 include the indication of the maximum number of characters of the desired secret, a number which indicates that the trusted computer will be able to find the desired secret by brute force searching within a reasonable time. U2 then decides to have its Wallet Node WN2 send to Wallet Node WN1 of U1 the message:

WMBid2:WM(Sig1, #WP1)

as a service offer, then (since U1 accepts this service offer) WN1 replies to it with the message:

WMAccept1:WM(WMBid2, #WP1)

as acceptance, which (either automatically or upon command of user U2 which can, for example, select which trusted computer to outsource to) triggers the outsourcing in question to a trusted computer. Later, when the result—the desired secret S1 corresponding to H(S1)—is returned by this trusted computer, WN2 automatically sends the message:

WMS2:WM(WMAccept1, S1, #WP1)

which communicates the desired secret S1 to WN1, and upon receipt of this message and verification of the correspondence of the hash of the secret received with H(S1), WN1 generates the payment transaction of $R to WN2 and sends it (by WM) to WN2.

It should be noted that the bid elements can also represent a sales bid and the approach of the method makes possible the negotiation by bid and counter-bid iterations, the bid elements being capable of evolving in these iterations, and the messages then basically being as follows (if one considers that the first message, here WMBid, is sent by the supplier):

WMBid: WM(Sig, {H(S);$R;$P;T[;params]}, WP1), which communicates a counter-bid {H(S);$R;$P;T[; params]} with respect to "Sig," a message of which the recipient is the signer of Sig and which, in case of acceptance "identically" by the latter, commits its emitter (the WN which offers the service in question) to paying a penalty of the given amount $P in case of failure to supply within the given time T;

WMAccept: WM(WMBid or WMNewBid, {H(S);$R;$P; T[;params]}, #WP1), which communicates a counter-bid in response to a given message WMBid or WMNewBid; in the case in which {H(S);$R;$P;T[; params]} is identical to the bid elements of the latter, this message WMAccept commits its emitter to paying the given amount $SR upon receipt of a WMS message comprising said secret whose hash corresponds to H(S); also, in the case in which, within a (previously agreed upon) time limit a message WMNewBid offering identical bid elements arrives, this WMAccept message directly commits its emitter to paying the given amount $R upon receipt of a WMS message comprising the secret whose hash corresponds to H(S);

WMNewBid: WM(WMAccept, {H(S);$R;$P;T [;params]}, WP1), which communicates a counter-bid {H(S);$R;$P;T[;params]} in response to a given WMAccept bid and of which recipient is the emitter of this WMAccept message; in the case in which {H(S); $R;$P;T[;params]} is identical to the bid elements of this given WMAccept message, this WMNewBid message directly commits is emitter (the one who offers the service in question) to paying the penalty of an amount $P in case of failure to supply within the given time T (without waiting for a new WMAccept acceptance message);

WMS: WM(WMAccept, S, #WP1), which communicates the secret S in response to a given WMAccept message and which triggers on the receiving WN its verification and, in case of success of this verification, the generation of a transaction of payment of the amount $R sent to the emitter of this WMS message by a final WM from the receiving WN.

A variation of this method consists in shifting to said trusted computer, in addition, the task of verification of the result supplied, and said trusted computer provides a certificate (of the authenticity and integrity of the processing operations performed for this verification) which serves as proof.

Thus, at the time of supplying the result S1, instead of a simple message "WMS2: WM(WMAccept1, S1, #WP1)," WN2 returns a message:

WMA2:WM(WMAccept1, S1, A2, #WP1)

in which A2 is said certificate of this successful verification carried out in said trusted computer, and WN1 does not then have to perform this verification before generating the transaction of payment of $R to WN2.

As a variation and to provide additional security, the certificate A2 is returned without immediately supplying the result S1, and this result is supplied after WN1 returns (a WM containing) a transaction of payment (which is at least partial, the payment being then completed by sending a final transaction after receiving the result S1—it should also be noted that in the case in which the result can be partitioned, several payment-partition iterations can succeed one another until the supply has been completed).

The fact of communicating such a certificate (A2) covers a broader field of application, in fact said verification can sometimes consist of long and costly processing operations (in contrast to the above example which involved only the verification that the hash of the result S1 supplied corresponds to the H(S1) specified at the start) or processing operations which simply do not have to be carried out in a Wallet Node, a Wallet Node being intended to manage only agreements between nodes and having to remain available (in performances) for this purpose.

Finally, a problem-resolution auction transaction can be created, ensuring, for example, that a supplier offering a better offer (which is more complete and/or more rapid and/or . . . ) seals a deal. Such an offer can consist not only of a solution to a given problem but also of processing operations of verification of an offered solution (in the software testing sector, for example). The possibility of WNs outsourcing processing operations to trusted computers thus extends the power of the WN network, the WN network making it possible to dispense with neutral third parties in the exchanges, each WN can be produced at low cost, using accessible and relatively common technology, by a plurality of manufacturers, precisely thanks to this outsourcing possibility which allows the WNs to handle only the processing operations concerning exchanges (the exchange conditions, the payments, etc.).

Blind Proxy

Wallet Nodes make it possible to implement processing operations without disclosing the processed data or the code executed in these operations.

Let us consider a "Client" device and a "Blind Proxy" (or "Proxy"), Client running on Proxy an executable code "P" (as Program) based on data "I" (as Input) which it sends to Proxy.

The execution model adopted for this executable code P is a finite state machine, the execution of which is triggered by the receipt of an incoming message and capable of emitting outgoing messages. Thus, its receipt of an incoming message results in the generation of 0 to n outgoing messages and 0 to m state changes (persistent states).

Associated with Proxy is a pair of public/private keys, the public key ("K2") of Proxy having been certified beforehand, in the form of a signature decryptable with a certain public key "K" (on behalf of the SoC manufacturer), in order to guarantee the "blindness" property of Proxy and including the execution integrity guarantee (called "hash-locked execution").

Let us consider first the following method for producing a Blind Proxy. Below, the symbol "a" is used for an encryption; the letter "P" which can be followed by a number (P1) is used for a program; the letter "K" which can be followed by a number (K1) is used for a key, said key being the public key in the case of generating an encryption (such as in $\S_K P$) and the private key in the case of the key used to generate a signature, such as in $sign_K(X)$. This Blind Proxy method is as follows:

Provide Proxy to Client:
1. Provide (on behalf of the Proxy manufacturer) certification public key (K) (accessible by Client)
2. Generate Proxy's public key (K2)
3. K2 is certified with $sign_K(K2)$ (i.e. decryptable using K)
4. Proxy sends K2 to Client (and (K2, $sign_K(K2)$) is accessible by Client) Client provides an executable code (P) to Proxy:
5. Client encrypts P using K2 ($\S_{K2} P$) and sends $\S_{K2} P$ to Proxy
6. Proxy decrypts $\S_{K2} P$, hashes P (#P) and stores $\S_{K2} P$ in association with #P, in a table PHT (Program Hash Table)
7. Client hashes P (#P)

For each execution request:
8. Client encrypts I+#P ($\S_{K2}$input+#P) using K2 (or $\S_{K2}$input+#P+K1, where K1 is Client's public key)
9. Client sends to Proxy $\S_{K2}$input+#P and K1 (or $\S_{K2}$input+#P+K1), along with a nonce (nonce) (or sends $\S_{K2}$input+#P+K1+nonce)
10. Proxy ("blindly") decrypts $\S_{K2}$(input+#P ... ) as well as $\S_{K2} P$ ($\S_{K2} P$ being retrieved from PHT using #P)
11. Proxy (blindly) runs P (decrypted on the fly) with I (once decrypted), encrypts the results using K1 ($\S_{K1}$output) and returns nonce and $\S_{K1}$output (or all encrypted together) along with $sign_{K2}$(nonce, $\S_{K1}$output ... ) to Client, without the owner of Proxy being able to see I, P or these results
12. Client decrypts the results and checks them by decrypting their signature with K2.

As mentioned above, advantageously, in step 8, instead of simply encrypting I+#P with the key K2 Proxy, Client encrypts I+#P+K1 ($\S_{K2}$input+#P+K1), and in step 9, Client communicates its public key K1 by sending $\S_{K2}$input+#P+K1. Proxy then returns the results to Client (at its address which can be #K1) without K1 being disclosed. According to another option, nonce can also be part of the body of the encrypted message ($\S_{K2}$input+#P+K/+nonce) and in the message returned by Proxy to Client, it also appears in an encrypted form ($\S_{K1}$output+nonce). For simplicity and clarity, these options, which a person skilled in the art would easily know how to implement, are not repeated below. What is important here is the fact that #P is not disclosed, so that the user or owner of Proxy cannot establish its relationship with Client.

In one possible implementation (other implementations can naturally also be considered), the message from Client to Proxy comprises:

message: $\S_{K2}$input+#P, K1, nonce and the return (from Proxy to Client) comprises:
message: nonce, $\S_{K1}$output, [K2,] $sign_{K2}$(nonce, $\S_{K1}$output),
(or simply
message: $sign_{K2}$(nonce, $\S_{K1}$output)
in the case in which nonce and $\S_{K1}$output can be obtained by decrypting $sign_{K2}$(nonce, $\S_{K1}$output) by means of K2; however, below, the signatures are considered to consist of encryptions of hash)

nonce making it advantageously possible to make an outgoing message to correspond to an incoming message and K2 and $sign_{K2}$(nonce, $\S_{K1}$output) making it possible for Client to verify that the processing operation has indeed been performed by Proxy having this key K2 (certified).

For Client to be able to verify the certificate guaranteeing the "blindly" property (as well as the integrity of execution—it is understood here that "blindness" subsumes hash-locked execution integrity) of the processing operation by Proxy (which signed the result of this operation with $sign_{K2}$(nonce, $\S_{K1}$output)), $sign_K(K2)$ is communicated to Client beforehand and Client stores it, and/or advantageously $sign_K(K2)$ is included in each return message, as follows:
message: nonce, $\S_{K1}$output, [K2,] $sign_{K2}$(nonce, $\S_{K1}$output), $sign_K(K2)$ There are cases in which one wants the same Client to be an entity having the property of blindness or of integrity of execution and, to guarantee this, one also wants (i) the message from Client to Proxy to be signed by Client ($sign_{K1}$(nonce, $\S_{K2}$input+#P) and (ii) key K1 of Client to be certified ($sign_K(K1)$):

message: $\S_{K2}$input+#P, nonce, K1, $sign_{K1}(\S_{K2}$input+#P, nonce), $sign_K(K1)$ (here #P is the hash of the executable code that can be used by Client or Proxy).

The usefulness of the case where P is the executable code used by Client is obvious, for example, in the case of the verification of an electronic passport, with reference to FIG. 6 of application PCT No. WO2016/120826 A2: the guarantee of the integrity of execution of Client—executing a passport verification program, of which the executable code hash is #P1—means guaranteeing the existence of this passport:

message: $\S_{K2}$input+#P1, nonce, K1, $sign_{K1}(\S_{K2}$nput+#P1, nonce), $sign_K(K1)$.

One can then conceive a unified format (presented here in a non-limiting manner, since other approaches are possible) for messages from Client to Proxy and returns from Proxy to Client, which is as follows:

message: nonce1, $\S_{K2}$(data+#P1+#P2), nonce2, K1, $Sign_{K1}$(nonce1, $\S_{K2}$(data+#P1+#P2), nonce2), $sign_K$(K1).

In a message M having this unified format:
M being seen as an outgoing message (from the point of view of its emitter), nonce1 reproduces, if applicable, nonce2 received in the upstream message that triggered the processing operation that gave rise to this message M;

M being seen as an incoming message (from the point of view of its recipient), nonce2 designates nonce1 of the (or of each) outgoing message that will be emitted by said recipient during the course of the processing operation in response to the receipt of this message M;

P1 is the hash of the executable code executed by the emitter of this message M;

P2 is the hash of the executable code required to carry out the processing operation upon receipt of this message M.

Thus, it can be understood that nonce2 identifies the message in question (M), while nonce1 is the identifier of the incoming message received that triggered the processing operation that gave rise to this message M.

Conventionally, such a message comprises a header that indicates in particular the type of message, this is implicit in the text that follows.

Depending on the case, some of these arguments will be omitted in order to apply this format to different cases of use. For example, for the blind proxy method described above (in which the message from Client to Proxy comprises:

message: § $_{K2}$input+#P, K1, nonce and the return (from Proxy to Client) comprises message: nonce, § $_{K1}$output, K2, sign$_{K2}$(nonce, § $_{K1}$output), sign$_K$(K2)), according to the unified format, the message from Client to Proxy comprises the following arguments:

message: _, § $_{K2}$(data++#P2), nonce2, K1, _, _ and the return comprises the following arguments:

message: nonce1, § $_{K2}$(data+#P1+_),_, K1, Sign$_{K1}$ (nonce1, § $_{K2}$(data+#P1+_),)_, sign$_K$(K1).

Advantageously, a more complete message format comprises moreover an argument #spec containing, if applicable, the hash of a specification of the constraints linking #P1 and #P2, that is to say, limiting the set of valid #P2s following a #P1:

message: nonce1, § $_{K2}$(data+#P1+#P2), #spec, nonce2, K1, Sign$_{K1}$(nonce1, § $_{K2}$(data+#P1+#P2), #spec, nonce2), sign$_K$(K1).

In one embodiment, this specification "spec" can be the set of valid executable codes (#P1, #P2, etc.). In another embodiment, with reference to FIG. 11, for each executable code of which the hash is given (#P1), all of hashes of the valid executable codes (#P2 . . . ) are supplied in this specification (other embodiments are possible).

In the case in which, for a given message, it is required that the executable code (in its entirety) to be executed by the recipient of the message is the same as that executed by the emitter of the message, that is to say that the same #P is propagated from an incoming message received to an (or to each) outgoing message generated, it is preferable that the format of the messages be the following (and, below, this particular unified format option may be used or referred to, without this being limiting):

message: nonce1, § $_{K2}$data+#P, nonce2, K1, Sign$_{K1}$ (nonce1, § $_{K2}$data+#P, nonce2), sign$_K$(K1)

Reminder of the Principle of Implementing Wallet Nodes

With reference to FIG. 5 of WO2016120826A2, within the SoC there is a microcontroller comprising a general-purpose processor, such as a processor using RISC-V architecture) provided with an internal memory. Only this processor can access the "Sign" portion providing cryptographic functions, in particular the functionality of signature by the SoC, the latter in turn alone being able to access the portion containing the chip's Secret Key. The Secret Key portion is shown in brackets in the Figure because in some implementation options, the secret key is not stored but dynamically regenerated. The Wallet Programs portion stores the encrypted executable codes (§ P) as well as their respective hashes. The Microcontroller loads into its memory, in a secure manner, as a function of the hash (#P) included in the incoming message (or of the input via I/O) one or other of these executable codes. The latter are able to manipulate, in a non-volatile memory, persistent state variables which can only be accessed by the Microcontroller. In WO2016120826A2, the Pers. State Variables sub-system makes said Pers. State Variables (PSV) accessible only for the execution of the specific respective WPs to which these variables belong. These state variables can thus be accessed/handled (exclusively) only by their respective WPs. (In the present text, PSV means Program State Variables—persistent variables belonging to the program—as opposed to tags and NSVs (Node State Variables), which are the variables belonging to the WN.). On power-up and power-rest, the executable code stored in the Check/Load portion is the first to be loaded and executed in the Microcontroller, and hashes can then be (re)associated with the WPs available in the Wallet Programs portion. When a WM arrives (via I/O), the code of this Check/Load portion verifies the integrity and authenticity (the public key of the WN emitting this WM is used to decrypt the signature by this emitting WN and verify the integrity of the message, the key of the certification signature representative of the manufacturer is verified and the public key which it certifies is then validated as being a key of WN, which makes it possible to confirm the authenticity of said WM), the WP corresponding to said hash, if applicable, is selected in the Wallet Programs portion and loaded for execution. The emission of WM, if applicable, by said Wallet Program occurs by the intermediary of the Sign portion which verifies the hash inserted in the WM in the process of preparation before signing it. It should be noted that in a possible implementation variation, in order to emit a WM to a receiving WN, the signature subsystem of the emitting WN generates (or verifies) an encryption of the WP in the process of execution (that is to say of the currently loaded WP) with, if applicable, the data to be transmitted, by means of the public key of the receiving WN, and includes it in said WM to be emitted before signature of said WM to be emitted (and upon receipt, the receiving WN loads for execution this WP once it has been decrypted), thus guaranteeing that the same WP is re-executed in the receiving WN. Advantageously, the WP can be organized in versions; in one embodiment, the hashes of the previous versions of WP provided in the WM then accompany the latter and, for each state variable stored in the chip, the hash of the version of WP which last handled it is associated with it. Thus, the state variables of a WP can be updated by the WP itself, even if its version evolves.

Below, a WP is considered, which is transferred from one WN to another within a WM by means of a specific transmission WP (see below executable code "PP").

As already mentioned, the public key corresponding to said secret private key is "certified" by the manufacturer of said system-on-chip WN. This certificate is a signature (it is the signature, by an entity representing the manufacturer, of the public key corresponding to said secret key of the WN) whose signature key (that is to say public key representing the manufacturer) is shared between all (or at least a plurality of the) WN systems-on-chip of the same manufacturer. Said certificate is produced automatically, regardless of the production method: method wherein said secret key is engraved in the chip as in TPMs or chip cards, method wherein it is stored in a secure manner, method wherein it is automatically generated in the chip according to Physically Unclonable Function (PUF) technology introduced in [P. S. Ravikanth, «Physical one-way functions», PhD Thesis, MIT, 2001] and [Pappu et al., «Physical one-way functions», Science, 297(5589):2026-2030, 2002] (technology implemented specifically in Smartfusion2 SoC FPGAs and other chips from the manufacturer Microsemi), or according to a technique similar to the latter. The authenticity of said public key of a WN emitting a WM (in particular the authenticity of signatures carried out by means of the secret key of this WN) is automatically verified by the WN receiving this WM during its receipt in relation to said certificate. Advantageously, the system automatically includes said certificate in the WMs.

Conventionally, a logic is integrated in the SoCs, called BIST (Built-In Self Test) which is typically used for testing the secret key of the SoC. According to an inventive aspect, this same BIST logic will be used to generate the signature of the manufacturer (certificate) automatically at the time of this test, that is to say at the time of its production, the private key of the manufacturer making it possible for this signature itself to be secret. Thus, at the time of said test, if the secret key (private key) is operational and makes it possible to derive therefrom the corresponding public key, a certification request for the latter is transmitted to a signature device by means of the private key representing the manufacturer. The signature resulting therefrom, if applicable, is advantageously recorded in the SoC.

CMMU— Crypto Memory Management Unit

Next, a "Blind SoC" will be described ensuring the property of "blindness" capable of implementing the method presented at the beginning of the section Blind Proxy and the messages having the given formats, where the specific functionalities of Wallet Node (such as those of "Check/Load" and "Sign") have essentially been encapsulated in a specific unit to offer more security.

A blind SoC has a secret private key. A Blind SoC can communicate with another device by messages and can execute programs in response to the receipt of messages (as shown in FIG. 23). A Blind SoC moreover can store a program to be executed that has been received, received in an encrypted manner and/or after encryption by the Blind SoC, and can generate a hash of each program, this hash making it possible to find the encrypted program again by means of a Program Hash Table (PHT). A device (Client) can send to the Blind SoC a message containing input data for a certain program to be executed (P2), as well as the hash (#P2) of said program. In response to such a message, the Blind SoC (i) accesses the program to be executed based on the hash of the program (#P2) received in the message, (ii) decrypts the program on the fly and (iii) executes the decrypted instructions on the fly.

Advantageously, before emitting a message, a Blind SoC inserts within it the hash (#P1) of the program in the process of execution in the body of the message to be emitted, which it signs by means of its secret key. When a message has the same hash for the program in the process of execution (#P1) as for the program to be executed by the recipient of this message (#P1=#P2), said program (P1=P2) is an "executable commitment" (smart contract) in the case in which the recipient of said message offers the guarantee of integrity of execution of this program P2. (Also, if the hash (#P1) emitted for the program in the process of execution is different from the one (#P2) for the program to be executed by the recipient offering the guarantee of integrity of execution of this program (P2), but correspondence is guaranteed by means of a specification common to these programs (P1, P2 . . . , as already described with reference to FIG. 7) these programs represent an "executable commitment" (smart contract).

Blind SoC comprises a CMMU (Crypto Memory Management Unit) which stores—or which is capable of dynamically regenerating (by PUF technology, cited above)—said secret key of the Blind SoC (which can be accessed only by the CMMU which never discloses it), and it is by this CMMU that the following are carried out:

said encryption of the program before storing,
an allocation of space in the memory (addr1 . . . addr2 range) where the program thus encrypted is to be stored, this allocated space also allowing the storing of persistent state variables connected with this program and ensuring the isolation of programs with respect to one another,
said generation of the hash of the program and
said decryption for execution on the fly by at least one processor unit included in the Blind SoC,
the other processing operations described below in the present description.

Figure 21:
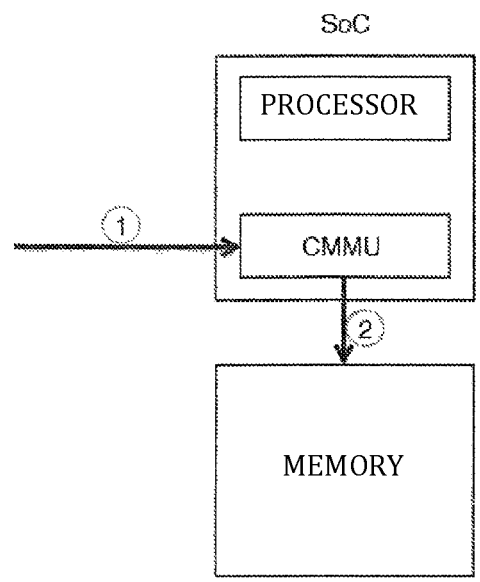
FIG. 21 diagrammatically presents an SoC comprising a CMMU receiving an executable program.

FIG. 21 diagrammatically presents the steps of receipt by CMMU of a message containing a program to be loaded in the MEMORY. It will be noted that the MEMORY can be external to the SoC or not, and that it comprises spaces reserved for variables, such as the tags described above, which do not belong to a given program but are shared. The numbered steps represent the following steps:

1) receipt of a message containing a program to be loaded into the memory
2) said program to be loaded being encrypted and the hash of said program before encryption being determined, reservation of a space in the memory which can contain this encrypted program and its persistent state variables which will also be encrypted, and storing of said encrypted program, said hash subsequently making it possible to find the program again via a table (PHT).

Advantageously, the CMMU carries out said storing of the encrypted program instruction block by instruction block and provides (to said processor) a single decrypted instruction block at a time (for execution by the processor of the instructions that the block contains). It should be noted that a microservices architecture [https://martinfowlercom/articles/microservices.html] or serverless architecture [https://martinfowlercom/articles/serverless.html], since the functions are fine-grained, can form indivisible block portions.

Thus, the method for loading programs (executable codes) into Blind SoCs advantageously comprises the following steps. Upon receipt by Blind SoC of a message containing P and #PP (in encrypted form $\S_{K2}P+\#PP \ldots$), PP being the program-loading program and P being the content of the executable code to be loaded, the CMMU:

1. decrypts $\S_{K2}P \ldots$ and calculates the hash of the program to be loaded (#P);
2. creates a symmetrical key (PK) derived from {#P+the secret key of Blind SoC};
3. encrypts the instruction blocks of this executable code with this symmetrical key ($\S_{PK}P_i$);
4. allocates the memory space (addr1 . . . addr2) in the memory for these blocks $\S_{PK}P_i$ as well as for the future persistent variable states handled by this program, and therein records these blocks $\S_{PK}P_i$;
5. inserts information containing #P, addr1, addr2 in a PHT (Program Hash Table).

When a message containing input data for a certain program to be executed (P) and the hash (#P) of this program is received by the Blind SoC, its CMMU:

1. accesses from the hash of program #P received in the message and via the PHT table, the blocks of the encrypted program to be executed §$_{PK}$P stored in the memory in the space which is reserved for it (addr1 . . . addr2);
2. decrypts on the fly the instruction blocks of P and transmits them to the processor unit;
3. the processor unit executing on the fly the decrypted instructions on the input data, CMMU stores the persistent state variables linked to Pin isolation, in addr1 . . . addr2, and the messages generated include #P and are signed by CMMU.

Thus, before emission of a message by the Blind SoC, the CMMU inserts in the message to be emitted the hash (#P) of the program in the process of execution as well as the signature of this hash by the CMMU by means of the secret key (or inserts said hash of the program into the body of the message to be emitted which it signs with the secret key), which, in the case in which #P=#P1=#P2 (or in accordance with the above description with reference to FIG. 7, in the case in which the programs are grouped according to a specification) and if the receiving entity also guarantees their integrity of execution, makes it possible to use such programs as executable commitments (smart contracts) in the sense of the present invention.

Figure 22:
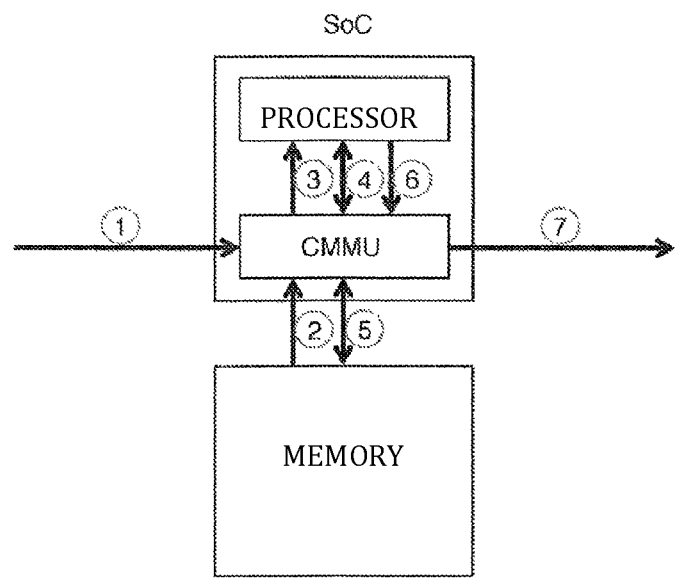
FIG. 22 diagrammatically presents an SoC comprising a CMMU receiving a message containing input data for a program to be executed.

FIG. 22 diagrammatically presents the interactions that represent these steps between the different portions (PROCESSOR, CMMU, MEMORY) of the system:
1) Receipt by CMMU of a message containing input data of a program to be executed as well as the hash of said program;
2) Based on said hash, CMMU locates said encrypted program in the PHT and loads it into its cache and decrypts it (block by block);
3) CMMU transmits on the fly (one block at a time of) the decrypted program to PROCESSOR for execution;
4) if applicable, PROCESSOR requests access to the already created persistent state variables (PSV and/or tags) or creates/updates them and demands that they be stored, or deletes them, and
5) CMMU accesses and decrypts/encrypts and stores said persistent state variables;
6) if applicable, PROCESSOR prepares a message to be emitted, and
7) CMMU inserts therein the hash of said program being executed and its signature by means of the secret key and emits the message.

Advantageously, the CMMU is capable of verifying the required intersections of sets of mirror nodes described above during receipt of a WM and for each tag transfer transaction received. With reference to FIG. 23, the WMs can be emitted by a Blind SoC (generated by the execution of a WP) or received as input from the user or by another device ("Quasi-WM" messages) and they comprise the hash #WP of this program in both cases.

FIG. 23 presents a tag transfer WM as input, which conveys a transaction (tx1), this transaction initiating in MEMORY at Tags the insertion of the tags contributed by this new transaction, each tag containing data representative of the succession (tree) of upstream transactions, as previously described, each being associated with the address of the upstream WN that generated it and the addresses of its mirror WNs. With this information, in order to validate or not validate the message, the CMMU verifies the required intersection between its mirror nodes and said addresses of mirror WNs, as well as the fact that at least one (or some, depending on configuration parameters) are hard WNs. This Figure also shows tag transfer WM as output that conveys a transaction (tx2) generated by the CMMU upon the instruction of a WP, the CMMU neutralizing (making unconsumable) the tags consumed by this generated transaction (to avoid double spending) and generating the new tag(s) which is/are its output, the respective upstream transaction trees being associated with them (based on trees upstream of them).

Furthermore, the CMMU manages the simplifications of transactions described below in section "Off-chain Bitcoin Transactions": a simplification consists in replacing at least two prior inter-WN transactions that are not yet inserted in the blockchain, by a new (or the fewest possible) transaction(s) of replacement, the CMMU ensuring that the current balance remains unchanged by these replacements (this mechanism is generic, the tag transfer transactions being more general than the Bitcoin transactions).

FIG. 23 also shows an https request generated by the CMMU which takes charge of the handshakes and cryptographic operations, leaving to the terminal to which it is connected the role of input/output interface (at TCP level) in order to ensure the integrity of the data end to end (the site accessed being a trusted site).

The CMMU also takes charge of the management and signature by the Blind SoC of Non-WM messages (as output, as shown in FIG. 23 and described above in the section "WN emitting a message to the outside world").

Figure 24:
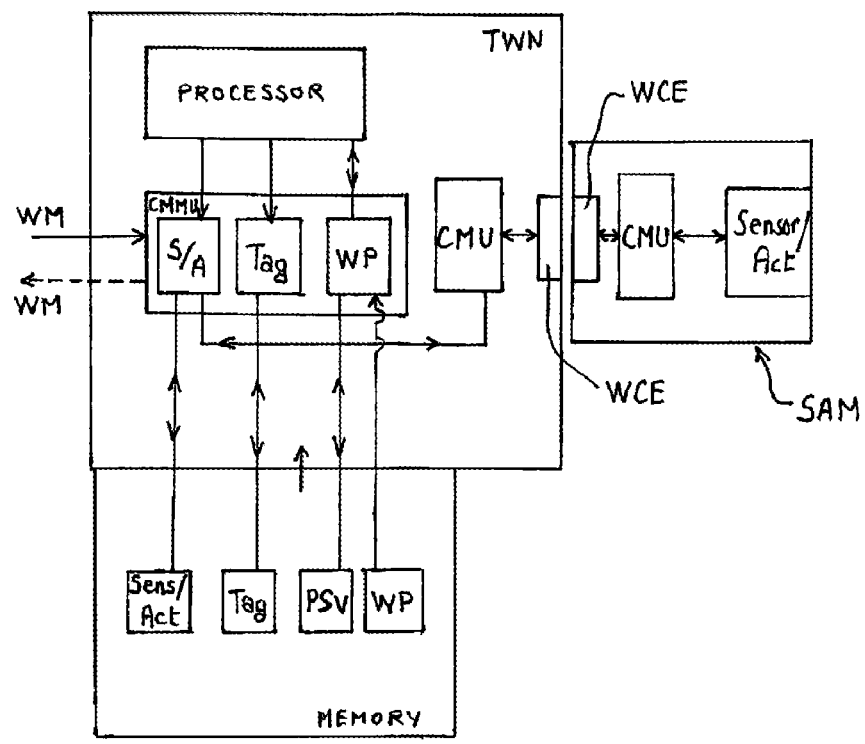
FIG. 24 presents in the form of a block diagram the general architecture of a Body-SoC and an associated sensor and actuator module.

With reference to FIG. 24, the CMMU manages the data coming from the sensor(s) of an
SAM shared by the different WPs (this is described below in the section "Interaction between Wallet Nodes and the Physical World").

Constraints on the Tags

The CMMU includes a mechanism that makes it possible to constrain the use of tags by the WPs. Thus, a tag can be reserved for use by a WP or by linked WPs (see FIG. 7), so as to prevent the units of account of the tag from being spent by a WP that is not authorized to do so.

Thus, a WP is able to indicate to the CMMU that a tag is reserved for its use, and the CMMU assigns to this tag a label indicating this reservation in the MEMORY.

This label can be removed on the initiative of said program, thus enabling the tag to be reused by other WPs.

In the case of an attempt, by a WP, to generate a transaction fed by a tag for which this WP is not authorized, the CMMU prohibits the operation, and the UAs of this tag cannot be consumed (since such a transaction cannot take place). This architecture allows the WNs to reserve the UAs materialized by tags for certain types of operations intended to be executed by the WPs that reserved them respectively, and thus to implement commitments based on UAs that are blocked for this purpose, such as the CCCs described in WO2016/120826 A2.

Improvements to the CCCs

Review of the General Framework

The general framework is a set of nodes that are beneficiaries of CCC commitments and can themselves provide a CCC commitment of the same type to other nodes, the latter to yet others, and so on, the nodes and CCC commitments thus forming a "networked-insurance" network.

Premium and Maximum Potential Contribution

A first node, having provided to second nodes a CCC commitment of a certain type, adds (typically staggered over time) in its CCC balance (sum of UA tags reserved) and in accordance with this commitment, a "premium" (similar to an insurance premium) to cover the set of these second nodes, and specifies for each second node a threshold indicating to which amount this second node is covered by it, the threshold being referred to as "maximum potential contribution." Following a disaster on one of the second nodes covered by a first node: the first node transfers to this second node, from its CCC balance, a certain amount of UAs (see "UA transfer transaction") in exchange for "premium vouchers" (see definition below) emitted by this second node. The amount of this transfer depends on the CCC balance of the first node and it is in the amount of the maximum potential contribution specified for this second particular node.

Premium Vouchers

A "premium voucher" emitted by a second node is an acknowledgement of debt "to the bearer" emitted as payment for a contribution received by this second node in execution of a CCC commitment, following a disaster, a contribution received from the first node which is the provider of this CCC commitment. This debt is reimbursable by the second node in accordance with this CCC commitment (typically staggered over time) within the limit of the amount of the premium provided for the second node, and in proportion to this received contribution (if applicable, among a plurality of received contributions). Premium vouchers are payable "to the bearer" in the sense that, as long as their respective debt amounts have not been paid off (that is to say so long as there are still UAs to be received), they represent a certain amount of long-term value, have a certain "immediate value in UAs" and can be transferred (see "UA transfer transaction") from one node to another. The "immediate value in UAs" of a premium voucher is defined as the sum of the amounts that it represents for different terms provided minus the sum of the respective interest amounts for the durations of these terms. The first bearer of a premium voucher is the first node that contributed, in execution of a CCC commitment, to the second disaster victim node which emitted this premium voucher. It should be noted that the latter transferred it to it in the "to be used only in case of disaster" mode: the immediate value of the premium voucher thus received by the first node is added to the CCC balance (which is reserved for payment of disasters) and cannot be spent (even partially) by the authorized WP(s) except for compensating a disaster according to this CCC commitment.

Concurrent Premium Vouchers

Said second disaster victim node also transfers, to said first node, all the premium vouchers which it received itself from the downstream nodes to which it contributed in the context of the same CCC, still in a "to be used only in the case of a disaster" mode, but here in a "concurrent" mode (that is to say replicated and synchronized) and for half (or for a proportion given in the CCC) of their respective values. Each premium voucher can thus be replicated over several nodes at the same time, can be used only for payment (for all or part of its immediate value) in case of a disaster, and only in the context of the CCC in question, and a payment by premium voucher consumes it at the same time (by synchronization) over all the nodes where it is located (including on the first node that contributed to the disaster which is at the origin of it and to which it was transferred first). To achieve this, each disaster payment by premium voucher, if applicable, is reported by the paying node to the other concurrent nodes where it has also been transferred and, when the value drops to zero, it is deleted over the set of these nodes.

Sending a Message

An embodiment will now be described according to which an emitted message including (and identified by) a nonce2 is considered to have been "sent" by its emitter upon receipt of an acknowledgement of receipt (ack) message returned by the recipient of this message and including said nonce2 as described above, that is to say as a value of the argument nonce 1. Said message expires after a certain time, fixed for the given executable code, a time after which it is typically re-emitted a certain number of times (see the section "Guarantee of commitment in case of non-responsiveness" below).

The acknowledgement of receipt thus has the following form:

message: nonce1:receivednonce2, § $_{K2}$(data:ack(receivednonce2)+#P), nonce2, K1, sign$_{K1}$(nonce1:receivednonce2, § $_{K2}$(data:ack(receivednonce2)+#P), nonce2), signK(K1))

Figure 8:
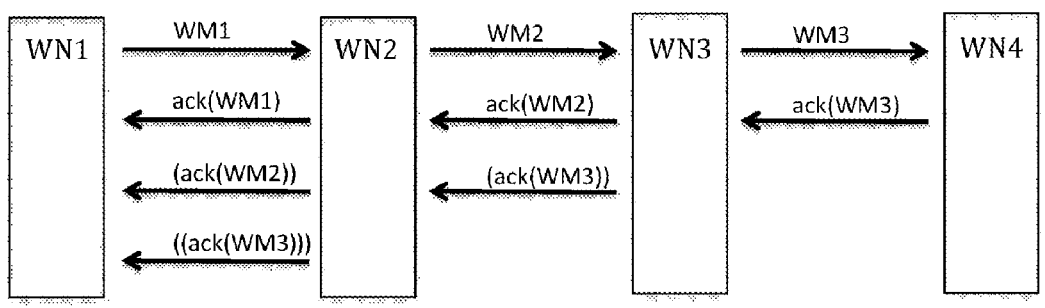
FIG. 8 shows the propagation of acknowledgements of receipt between Wallet Nodes.

In addition, with reference to FIG. 8, when the sending
of a first message (WM1) by a first emitter (WN1) to a receiving WN2 is, in the given lapse of time from the sending of WM1 (which is typically fixed for the current executable code), followed by the sending
of a second message (WM2) by WN2 to another recipient (WN3), a message noted "ack(WM2))" (in brackets in FIG. 8), propagating the acknowledgement of receipt "ack(WM2)" received from WN3 by WN2, is sent by the latter to the first emitter (WN1).

To illustrate this method, the message WM1 in reference to FIG. 8 has the following form: WM1 from WN1 to WN2: nonce1, § $_{K2}$data+#P, nonce2:N1, K1, sign$_{K1}$(nonce1, § $_{K2}$data+#P, nonce2:N1), sign$_K$(K1)

and its acknowledgement of receipt (which confirms this sending from WM1) has the following form:

ack(WM1) from WN2 to WN1: nonce1:N1, § $_{K2}$data:ack(N1)+#P, nonce2, K1, signK1(nonce1:N1, § $_{K2}$data:ack(N1)+#P, nonce2), sign$_K$(K1)

Figure 12:
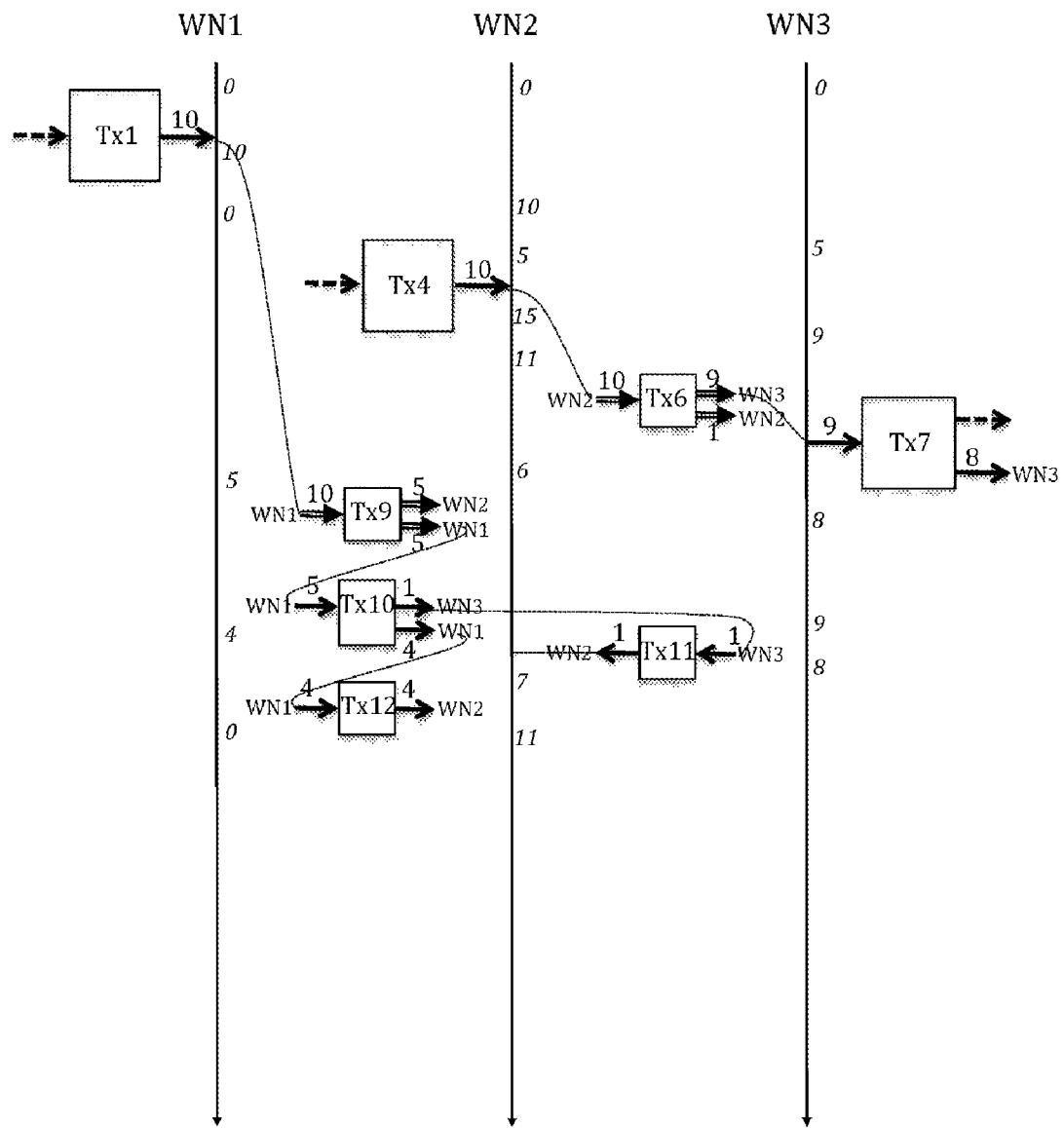

Following this first message identified by nonce2 "N1," the message WM2 of FIG. 12, sent from WN2 to WN3, has the following form:

WM2 from WN2 to WN3: nonce1, § $_{K2}$data+#P, nonce2:N2, K1, sign$_{K1}$(nonce1, § $_{K2}$data+#P, nonce2:N2), sign$_K$(K1)

Upon receipt of the acknowledgement of receipt confirming WM2 returned by WN3, which has the following form:

ack(WM2) from WN3 to WN2: nonce1:N2, § $_{K2}$data:ack(N2)+#P, nonce2, K1, sign$_{K1}$(nonce1:N2, § $_{K2}$data:ack(N2)+#P, nonce2), sign$_K$(K1)

provided that this acknowledgement of receipt reaches WN2 within the given lapse of time from sending from WM1, as shown in FIG. 12, WN2 propagates it to WN1 in a message "(ack(WM2))" which has the following form:

(ack(WM2)) from WN2 to WN1: nonce1:N1, § $_{K2}$data:{(ack(N2),payload)}+#P, nonce2, K1, sign$_{K1}$(nonce1:N2, § $_{K2}$data:{(ack(N2),payload)}+#P, nonce2), sign$_K$(K1)

payload being a content dependent on the executable code in question, such as, for example, the content of WM2.

The same method is carried out in the case of a longer chain of messages up to a given maximum depth (typically this depth being fixed for the given executable code). For example, and with reference to FIG. 8, this chain being composed
of a first message (WM1) of a first emitter (WN1) to a second emitter (WN2),
followed (within a given lapse of time) by a message (WM2) from the second to a third (WN3), then
followed (within the given lapse of time from the sending of WM1) by a message (WM3) from the third to a fourth (WN4), the acknowledgement of receipt received from the fourth (WN4) is also propagated gradually up to the first emitter (WN1), arriving at the message "((ack(WM3))" sent by WN2 to WN1 and containing information: "{(ack(N2), payload1), (ack(N3),payload2)}" corresponding to the series of exchanged messages:

((ack(WM3))) from WN2 to WN1: nonce1:N1, §$_{K2}$data: {(ack(N2),payload1), (ack(N3),payload2)}+#P, nonce2, K1, sign$_{K1}$(nonce1:N2, §$_{K2}$data:{(ack(N2),payload1), (ack(N3), payload2)}+#P, nonce2), sign$_{K}$(K1)

payload1 and payload2 being dependent on the executable code in question and being, for example, the respective contents of WM2 and WM3. Preferably, for the sake of privacy, only the portion which is usefully communicated is communicated, optionally after transformation. The advantage of this propagation of acknowledgements of receipt will be seen in the following method.

Off-chain Bitcoin Transactions

Now, the following is a description of a method which is based on WN for materializing (serializing) transactions of transfer of units of value, in such a manner as to be able to record them, for example, in a blockchain. In the implementation described below, the units of value in question are BTCs, and the Bitcoin transactions (valid and directly insertable into the Bitcoin blockchain) are generated—but without necessarily having to insert them into the blockchain, while offering the same guarantees as if they were inserted. (The same method can be transposed to other protocols based on blockchain).

We will now consider the case where the secret private key of a WN is a private key corresponding to a Bitcoin address (that is to say, the WN generates a Bitcoin address from its secret private key). A WN is thus capable of generating a Bitcoin transaction of which the input (or one of its inputs) is connected to an output (which is intended for it) of an upstream transaction (which, for example, the user of said WN was able to access due to the fact it is published in the blockchain and entered in said WN as input into its terminal), and (optionally) of broadcasting it so that it is inserted in the blockchain.

Figure 9:
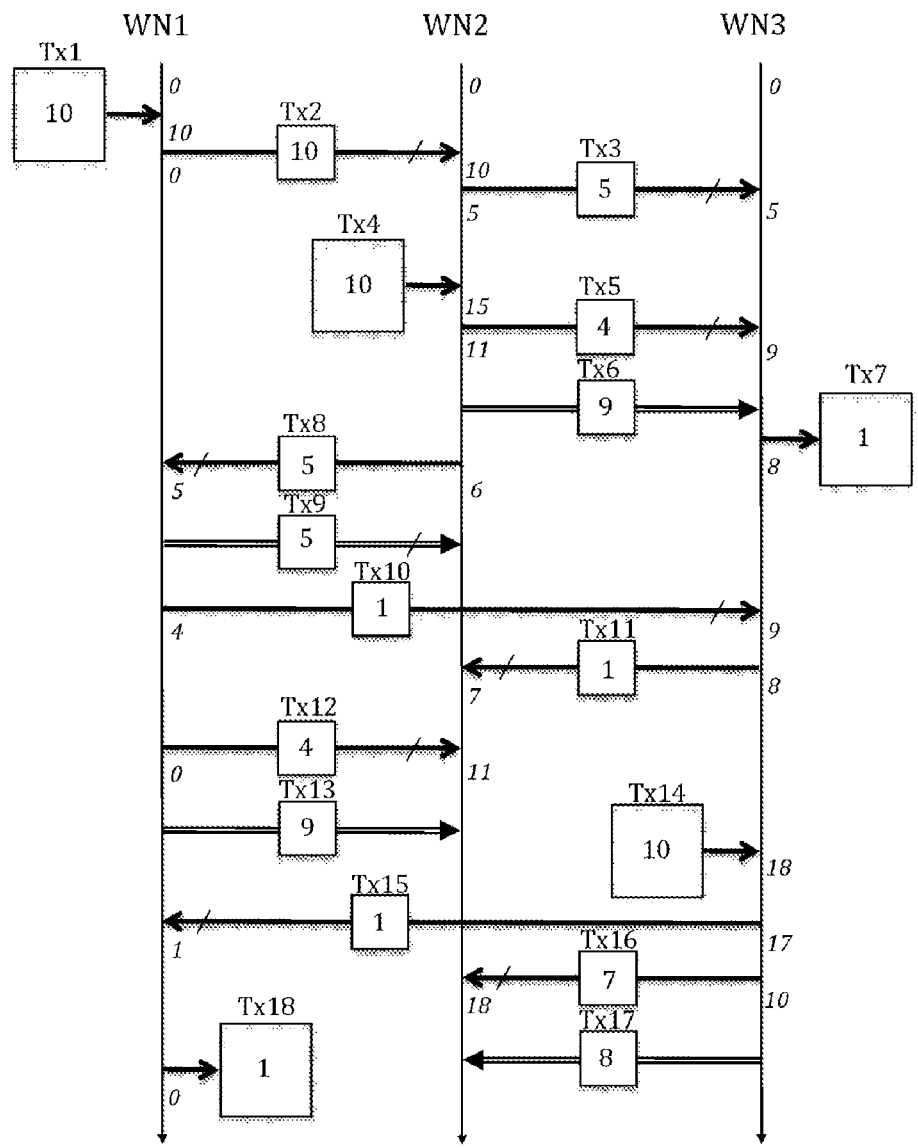
FIG. 9 diagrammatically presents an example of payments made between Wallet Nodes by abstract Bitcoin transactions.

FIG. 9 shows an example with three Wallet Nodes ("WN1," "WN2" and "WN3") wherein, firstly the user of WN1 (or a third party) creates an incoming Bitcoin transaction ("Tx1") in favor of WN1 (having an output giving 10 BTC to WN1), and conventionally broadcasts this transaction, which is then inserted in the blockchain, this having the effect of guaranteeing to the user of WN1 that only WN1 can spend the 10 BTCs that are available to it in Tx1. (It should be noted that even if Tx1 was created independently of WN1, means are provided so that WN1 is notified of it and/or verifies/detects it after its insertion in the blockchain, waits or does not wait for a certain number of confirmations of blocks, and updates its persistent state variables in relation to this new entry).

The three long vertical lines represent the evolution of these Wallet Nodes over time (from top to bottom). Thus, following Tx1, one sees in this Figure a sequence of several transactions between WNs (Tx2, Tx3, etc.), as well as other incoming transactions (from non-WN addresses, in favor of WN1, WN2 or WN3, such as Tx4 which is an incoming transaction in favor of WN2) and outgoing transactions (from WN1, WN2 or WN3 in favor of non-WN addresses, such as Tx7) with, whenever feasible, a replacement of at least two prior inter-WN transactions by a new transaction, so that, preferably, only one (or as few as possible) non-broadcast transaction remains between two given WNs, those that were replaced being deleted (this means that they are at least labeled as such and considered as if they were deleted) and the current balance remaining unchanged by these replacements. In general, the method consists in simplifying a set of transactions by updating the latter, exploiting the fact that they are not broadcast (hereafter "non-broadcast").

When a transaction transferring BTCs from WN1 to WN2 is generated (such as Tx2), it is signed by WN1 (conventional Bitcoin transaction signature) and communicated to WN2 via message. A creation (or updating or cancellation of the transaction, provided that it is non-broadcast) is confirmed by sending a message (in the sense of the previous section).

In FIG. 9, each transaction is represented abstractly by a box (a square) placed on an arrow. The number inside this box represents the amount transferred from the point of view of the user. Said incoming and outgoing transactions (that is to say transactions which are not transactions between WNs) are represented by larger boxes than the inter-WN transactions. Said balances are represented in italics (along the long vertical lines, on their right. Said deletion of an inter-WN transaction is shown by a small oblique line at the tip of the arrow representing this transaction. Said replacement transactions (such as Tx6) are represented differently by means of a double-lined arrow and when they are themselves deleted (as in the case of Tx8) this is also shown by a small oblique line.

Thus, FIG. 9 shows in the top left, an entry (Tx1) of 10 BTCs on WN1 whose balance was 0 just before. By this transaction, its balance thus goes to 10 (shown in italics). These 10 BTCs are transferred (by Tx2) to WN2, the balance of WN1 going again to 0 and the balance of WN2 going from 0 to 10. Then WN2 transfers (by Tx3) 5 BTCs to WN3 (thus 5 remain for it). Further below, 10 BTCs are transferred to WN2 from a non-WN address (by transaction Tx4 which is inserted in the blockchain), the balance of WN2 thus going from 5 to 15. WN2 transfers 4 BTCs to WN3 (Tx5), the balances on both sides thus going from 5 to 15. WN2 transfers 4 BTCs to WN3 (Tx5), the balances on both sides thus going to (15−4=) 11 and (5+4=) 9 respectively.

Now there are two non-broadcast transactions from WN2 to WN3 (Tx3 and Tx5) and they can be replaced by a transaction transferring their sum (Tx6, transferring 5+4=9 BTCs). Tx3 and Tx5 are thus deleted, which is shown in FIG. 9 by small oblique lines on the arrows representing these transactions.

WN3 transfers 1 BTC to a non-WN third party by transaction Tx7 which is broadcast. Consequently, the entire chain of transactions that feed it (in this case Tx6 and Tx4 only, as show in FIG. 11 described below) are also broadcast (inserted in the blockchain so that Tx7 can also be inserted) and they can thus not be deleted—they thus stop being replaceable.

WN2 transfers 5 BTCs to WN1 (Tx8). Then, since there is also transaction Tx2 between these WNs, these two transactions (Tx2 and Tx8) are replaced with Tx9 from WN1 to WN2, which transfers their difference (10−5=5 BTCs) due to the fact that they are in the opposite direction. Tx2 and Tx8 are thus deleted.

This replacement transaction Tx9 is itself deleted after the generation of Tx12 (both being non-broadcast), giving rise to the replacement transaction Tx13. (FIG. 9 shows this replacement as perceived by the user, while FIGS. 12 and 13 described below show the details of this at Bitcoin level).

Tx10 and Tx15 are generated between WN1 and WN3, have the same value, are in the opposite direction and non-broadcast, and can therefore simply cancel out, that is to say be deleted without giving rise to a replacement transaction. (Here again, it is interesting to see the details of this at the Bitcoin level in FIGS. 13 and 14).

Figure 13:
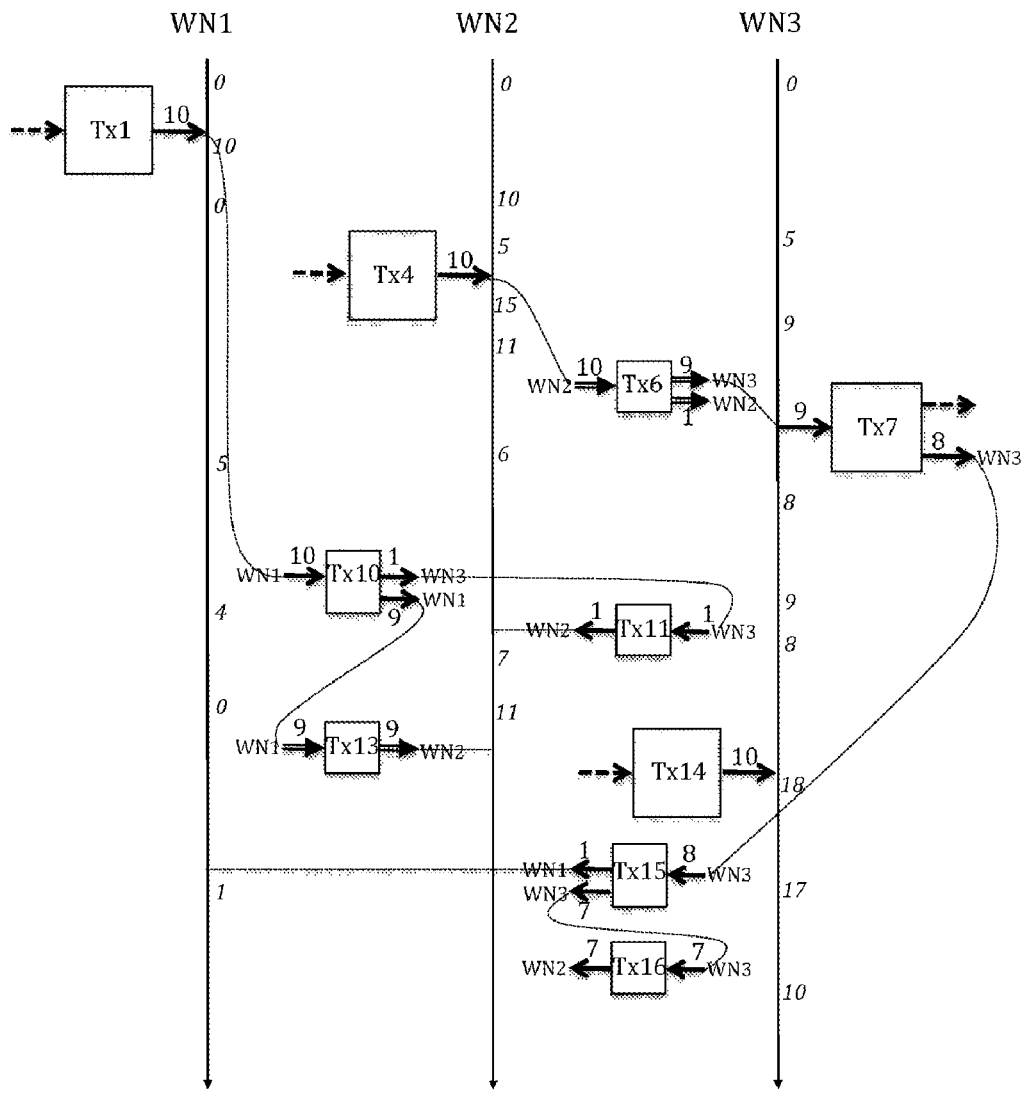
Figure 14:
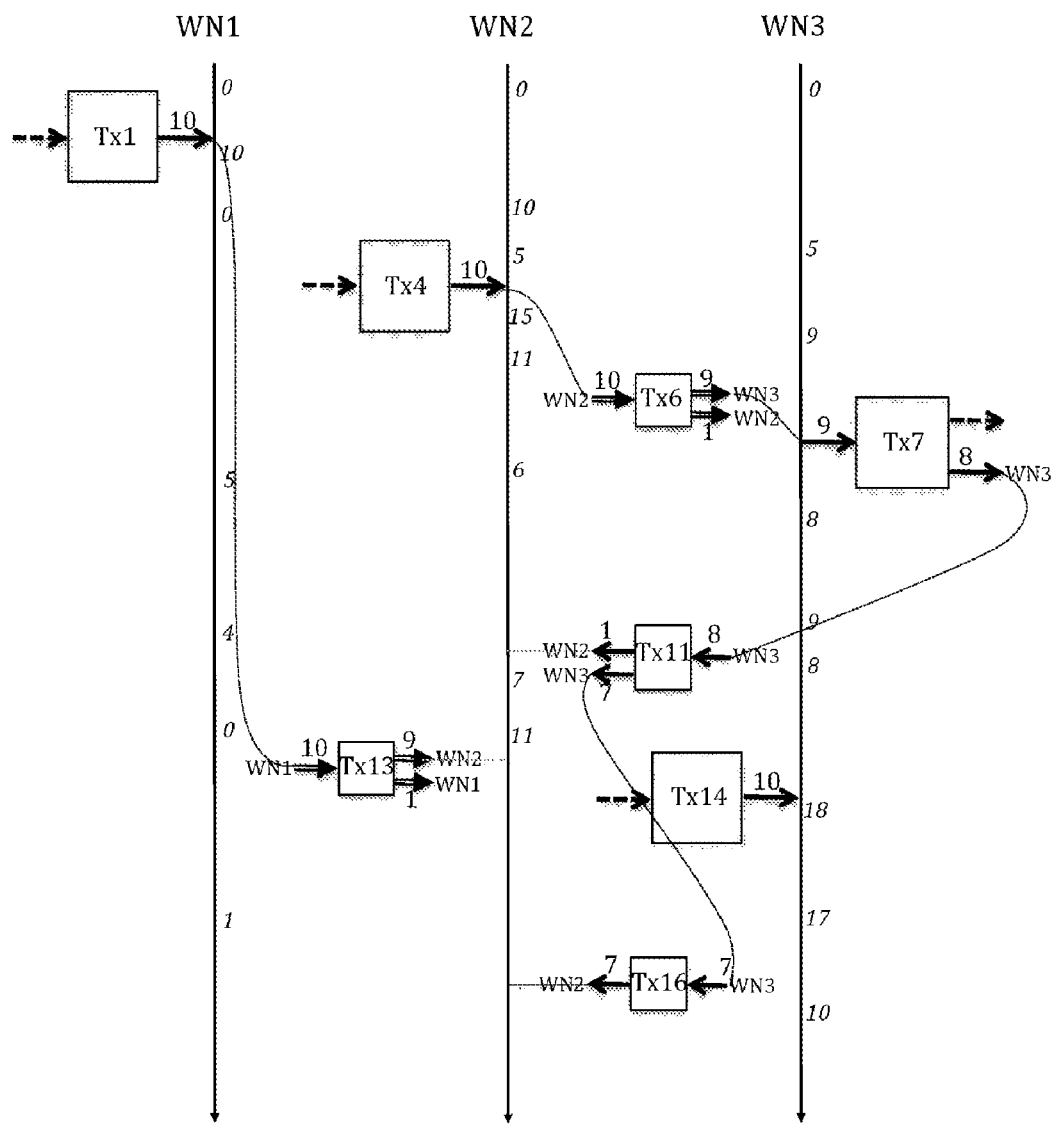

Tx11 and Tx16, which are in the same direction (from WN3 to WN2) and are non-broadcast, give rise to the replacement transaction Tx17 which transfers their sum and which itself is replaceable while it remains non-broadcast (details at the Bitcoin level in FIGS. 14 and 13). On the other hand, the outgoing transaction Tx18 (broadcast) causes the broadcast of the chain of transactions that feed it and that henceforth can no longer be deleted, in this case Tx13 (see FIG. 15).

The Bitcoin transactions shown in FIG. 9 are "abstract," in the sense that they present the amounts transferred from the user's point of view but do not show the inputs and outputs of these transactions in the sense of Bitcoins. FIGS. 10 to 15 show the real transactions corresponding to the abstract transactions in FIG. 9 (by explicitly providing their inputs and outputs).

The method of their generation is based on the fact that, corresponding to a balance available in a WN (the number in italics in the Figure) there is always at least (an amount available on) an output in favor of this WN (the total of these outputs being equal to this balance), that one can combine such outputs in order to connect them to the inputs of a transaction generated by said WN, and, in the case of overshooting, return the surplus (called "change") to said WN by an additional output (or as transaction fees). As far as the implementation of replacements/deletions is concerned, even in the case in which an output of a transaction to be deleted (for example Tx10, see FIG. 13) is connected to an input of a transaction which should not be deleted (Tx11) in the same operation, the latter can be updated automatically in order to be connected to an output available from another transaction (Tx13).

In FIGS. 10 to 15, the input(s) and output(s) of the transactions are shown with small horizontal arrows and their connections are shown with thin curved dotted lines (an output labeled "WN1" of a transaction is connected to an input also labeled "WN1" of a subsequent transaction, and so on).

It is implicit in these Figures that the creation of a transaction comprises the sending of message(s) in the sense of the previous section. For example, the generation of Tx3 by WN2 results in the sending by WN2 of a message indicating it to WN3 and this transaction is really created only upon the return of an acknowledgement of receipt by WN3 (see also the section "Guarantee of commitment in case of non-responsiveness").

Figure 10:
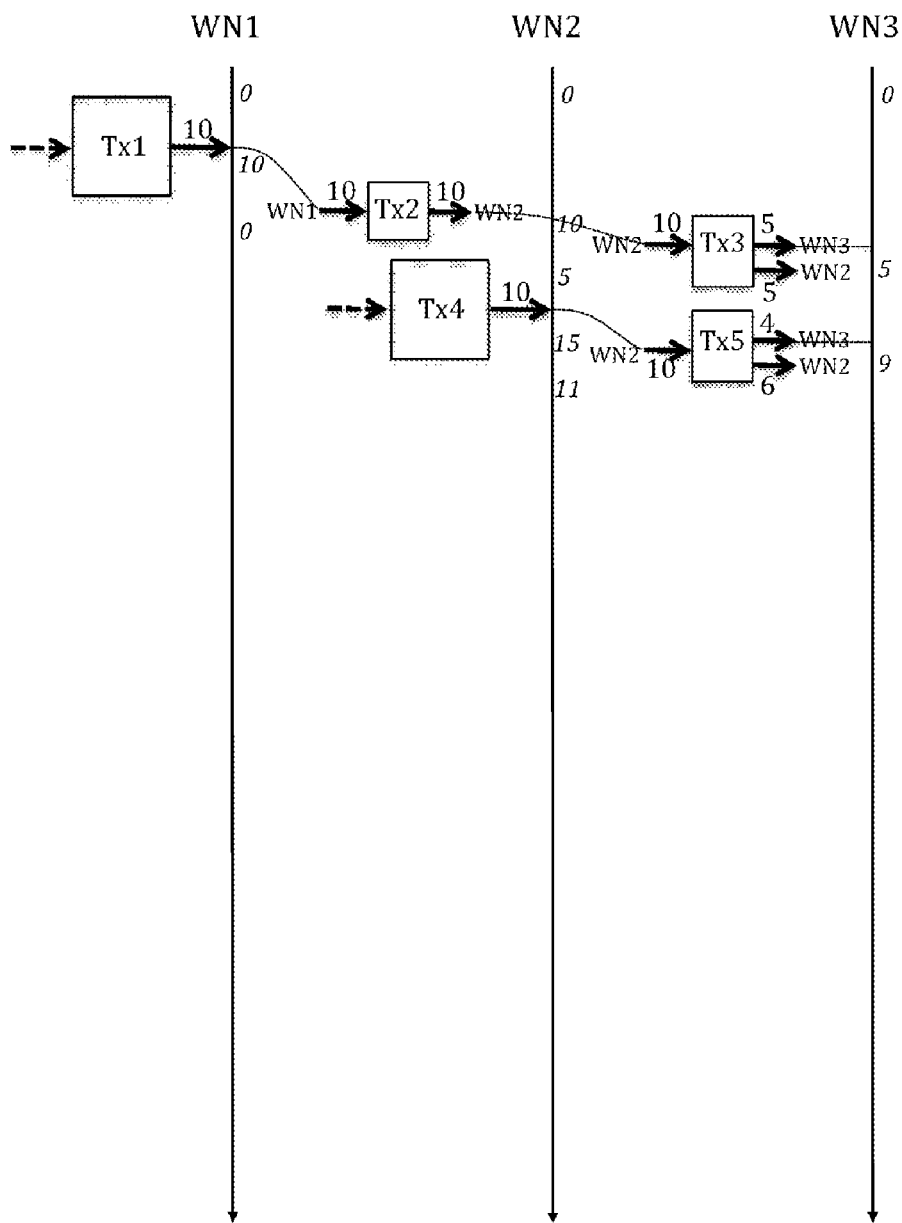
FIGS. 10 to 15 diagrammatically present real Bitcoin transactions corresponding to the abstract transactions of FIG. 9.

FIG. 10 shows the real transactions Tx1 to Tx5, which correspond to the abstract transactions having the same labeling as in FIG. 9. One can see there that although, according to FIG. 9, Tx3 transfers only 5 BTCs to WN3, its input takes 10 BTCs from Tx2 (due to the fact that Tx2 only has an output of 10 BTCs in favor of W2) and returns 5 BTCs to WN2, in addition to the output of 5 BTCs in favor of WN3.

Figure 11:
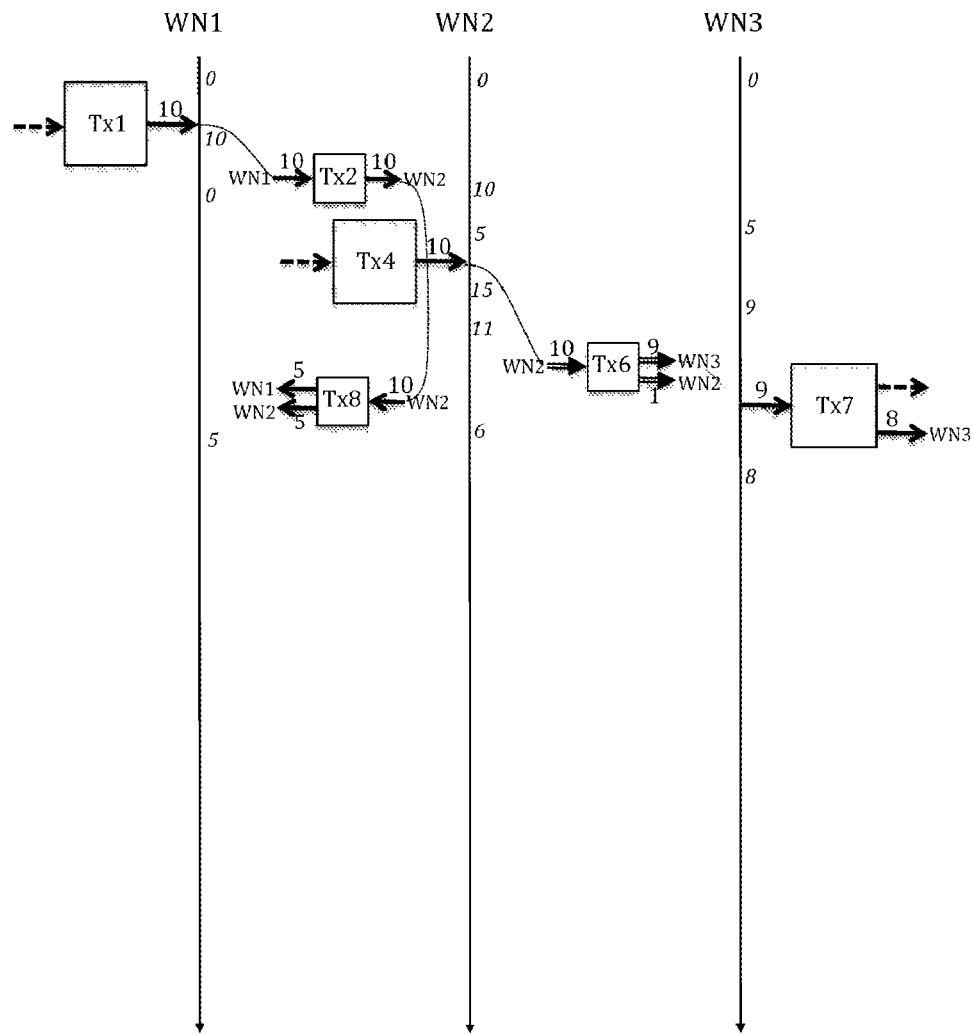

Transactions Tx3 and Tx5 in FIG. 10 are replaced in FIG. 11 with the transaction Tx6, generated by WN2 (and of which replacement notification is sent to WN3). To carry out this replacement, WN2 can connect Tx6 to Tx2 or to the incoming transaction Tx4. The latter is preferred due to the fact that the chain of supply transactions upstream is shorter (or by application of more complex heuristics). In fact, this same Figure represents the outgoing transaction Tx7 which is broadcast from the start and if, on the other hand, Tx6 were connected to Tx2, Tx2 would also have had to have been broadcast and could not have been replaced later, as shown in FIG. 12.

FIG. 12 shows the result of the replacement of Tx2 and Tx8 by Tx9, as well as the generation of the transactions Tx10 by WN1 (to WN3), Tx11 by WN3 (to WN2) and Tx12 again by WN1 (but to WN2).

FIG. 13 shows the replacement by Tx13 of the replacement transaction Tx9, following the generation of Tx12. In fact, as shown in FIG. 9 (and FIG. 12), the cumulative effect of these two transactions is to provide 5+4=9 BTCs from WN1 to WN2. This replacement has the effect of updating the input of Tx10, as well as its second output which is now connected to the new transaction Tx13. In this Figure, one also sees the generation of transactions Tx14 to Tx16.

The generation of Tx15 has the effect of cancelling the effect of Tx10; in fact, it transfers 1 BTC in the opposite direction. FIG. 14 shows the result of this cancellation which leads to the updating of the input and the output of Tx11.

Figure 15:
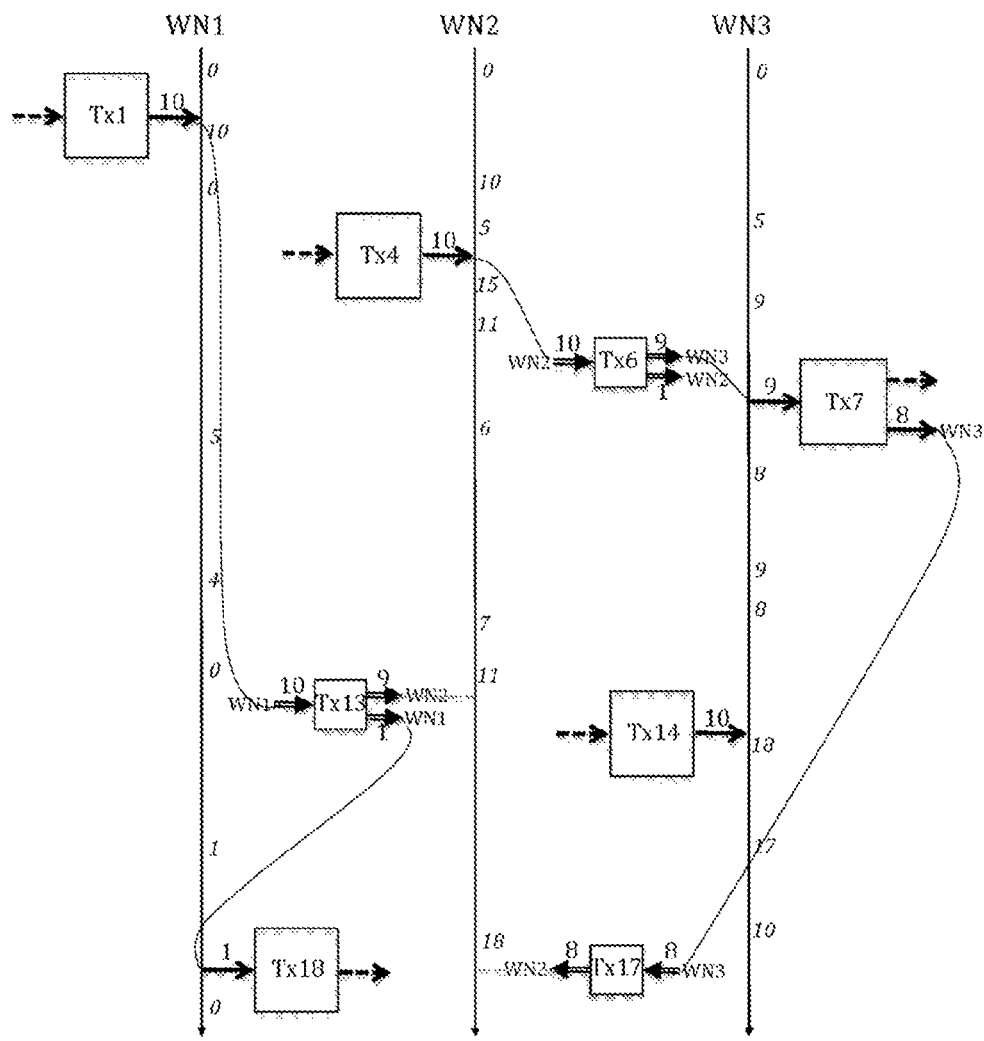
Figure 16:
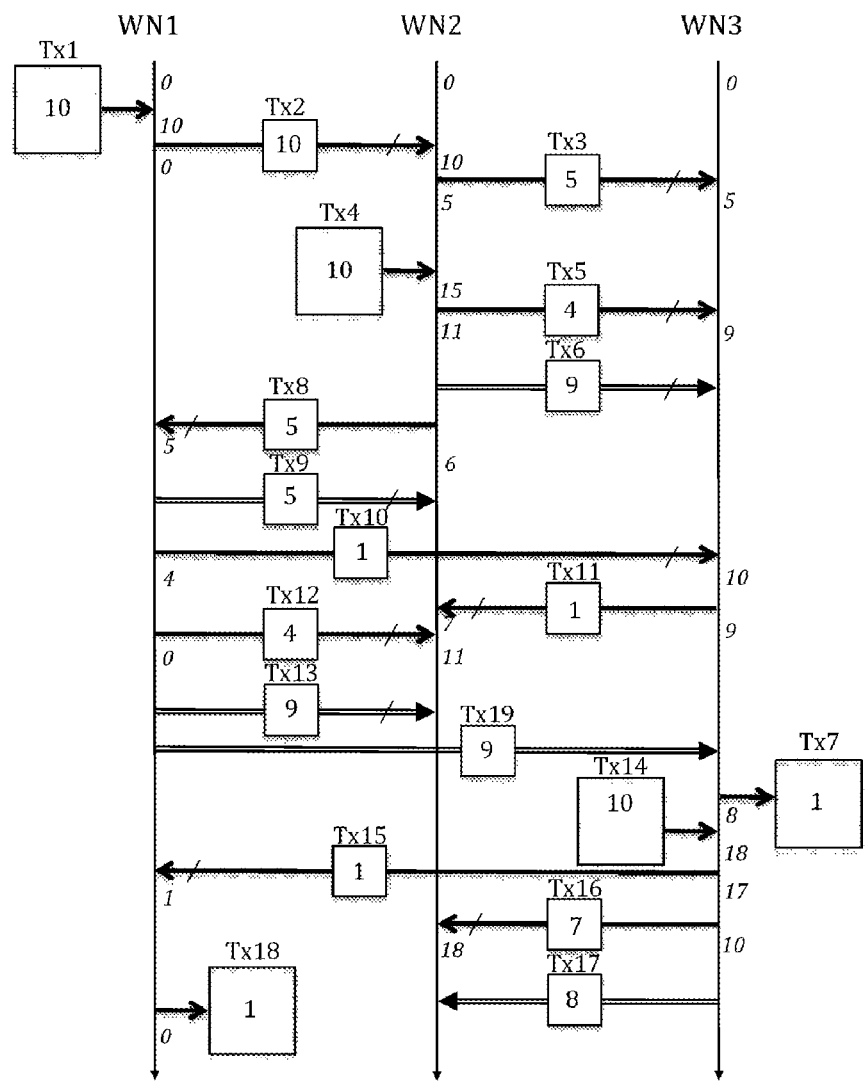
FIG. 16 diagrammatically presents another example of payments made between Wallet Nodes by abstract Bitcoin transactions.

Finally, in FIGS. 15, Tx11 and Tx16 are replaced by Tx17 which connects its input to the output of Tx7. This Figure also shows that WN1 generates the outgoing transaction Tx18 fed by Tx13, which makes T13 broadcast and thus not deletable.

Above (and in application PCT WO2016/120826 A2) the property of guarantee of integrity of execution and blindness of the WNs has already been described, according to which, upon receipt of a WM, the WN necessarily executes the specific WP indicated in this WM, to the exclusion of all other instructions, on the input data provided, to the exclusion of all other data, and emits only the WMs which, if applicable, are provided in said WP with respect to these input data and the persistent state variables, by ensuring the inaccessibility without discontinuity at the same time of the input data, their processing, the state variables and the result of processing.

The operations described above for generation and handling of Bitcoin transactions (which can be inserted or not in the blockchain) make use of these properties for securing said deletions/replacements. Thus, for example, the generation by WN1 of the replacement transaction Tx6 (with reference to FIGS. 9 and 11) does not present the risk that WN2 (or its user or owner) does not delete transaction Tx2 which Tx6 replaces. In fact:

- as long as WN2 does not broadcast Tx2 for insertion in the blockchain (for example following a command of the user), the user cannot see the content of Tx2 (this content comprising the signature by WN1 of this payment and which the user of WN2, were it not for the blindness property, could have copied and broadcast later by other means);
- a broadcast command is not taken into account by WN2 after Tx2 is deleted (or when Tx2 is labeled as being in "deleted" mode) in WN2;
- when the content of Tx2 has been disclosed to the user (following its broadcast), it can no longer be deleted/replaced in the sense of the present method of the invention.

It should be noted that all different possible Bitcoin transaction types can be generated. The transactions are communicated by WMs to WNs having the addresses specified on or for the outputs of these transactions. Required signatures can be communicated by WMs. For example, a transaction requiring n out of m signatures (multisig) can be generated by WNs and communicated by WMs to m potential signers some of which will return their signature.

Thus transactions of micro-payments [https://en.bitcoin.it/wiki/Contract #Example_7:_Rapidly-adjusted_. 28micro.29payments_to_a_pre-determined_party] and the establishment of payment channels and payments in such channels, particularly according to the Lightning Network protocol [https://lightning.network/lightning-network-paper.pdf] can be generated by WNs and simplified according to the method described here.

The fact of not having to insert a transaction in the blockchain presents the advantages, in particular, of (1) instantaneous confirmation, (2) non-payment of fees and (3) theoretically unlimited volume of possible transactions.

In which cases does a transaction need to be inserted in the blockchain?

The incoming transactions (from non-WN addresses) must necessarily be inserted in the blockchain beforehand in order to prevent double spending. Thus, the WN does not take into account (or confirm) an incoming transaction until it is visible in the blockchain.

The outgoing transactions are only broadcast optionally, to the extent that there is (almost) no risk of double spending by the WN (the risk of tampering with a system-on-chip of the state of the art being low, particularly in the presence of mirror WNs—see the description of mirror WNs above). In practice, an outgoing transaction is inserted in the blockchain at the time when at least one output intended for a non-WN address is to be spent. Its content then becomes accessible, as do the upstream transactions, and these transactions stop being deletable.

The inter-WN transactions can advantageously not be broadcast, but there is no restriction on broadcasting them (at any time). A broadcast transaction (for the purpose of having it inserted in the blockchain) will not be replaced since it cannot be deleted, but the other transactions continue to have the above-mentioned advantages, except when they feed it (the loss of advantage is local to the broadcasttransaction+the chain of the upstream transactions which feed it).

It has been seen that the inter-WN Bitcoin transactions generated are confirmed upon receipt of acknowledgement of receipt (from their respective beneficiaries) and that two transactions between two given WNs are, in the case where none of them is broadcast, simplified (replaced by a single transaction or simply canceled) in some cases. Now, with reference to FIGS. 16 to 19, a method for simplification (including by replacement or simple cancellation) of a plurality of transactions between more than two WNs will be described. This method uses the method of propagation of acknowledgements of receipt described above, their payloads (also described above) propagating the information of the BTCs transferred between non-directly adjacent WNs.

FIGS. 16 to 19 take up again the example in FIGS. 9 to 15, except that in FIGS. 16 to 19, transaction Tx7 is generated (by WN3) after the transaction Tx13 has been confirmed (generated by WN1). (It should be noted that the same method could have been described with the example shown in FIGS. 9 to 15 but considering that Tx7 is not broadcast before Tx13 has been confirmed.)

Thanks to the propagation by WN2 to WN1 of the acknowledgement of receipt by WN3 of Tx6 for 9 BTCs, transactions Tx9 and Tx12, also for a total of 9 BCTs, being confirmed (upon receipt by WN1 of acknowledgements of receipt by WN2), WN1 replaces these three transactions by a single transaction Tx19 which transfers 9 BTCs directly from WN1 to WN3. In an implementation variation (and it is this variation which is shown in FIGS. 16 to 19), first of all Tx9 (5 BTCs) and Tx12 (4 BTCs), both from WN1 to WN2, are replaced by Tx13 (9 BTCs, from WN1 to WN2), then the latter and Tx6 (9 BTCs, from WN2 to WN3) are replaced with Tx19 (9 BTCs) from WN1 to WN3.

Figure 17:
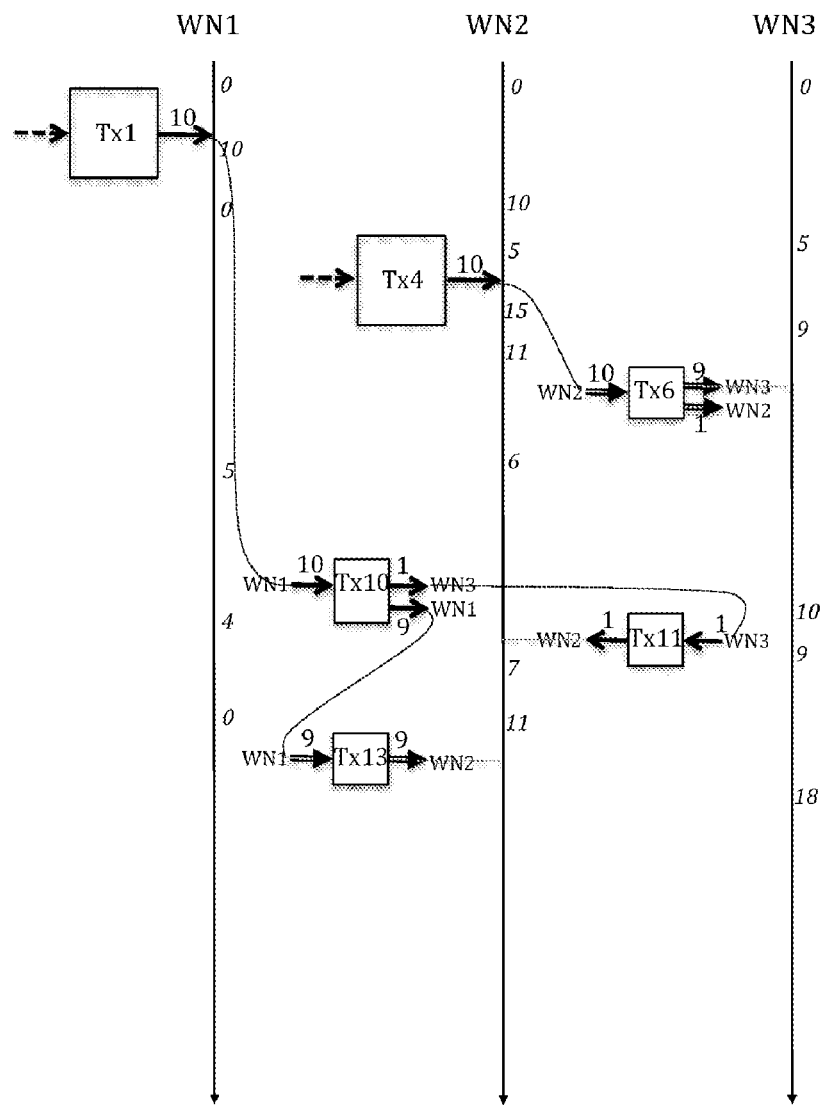
FIGS. 17 to 19 diagrammatically present the real transactions corresponding to the abstract transactions in FIG. 16.
Figure 18:
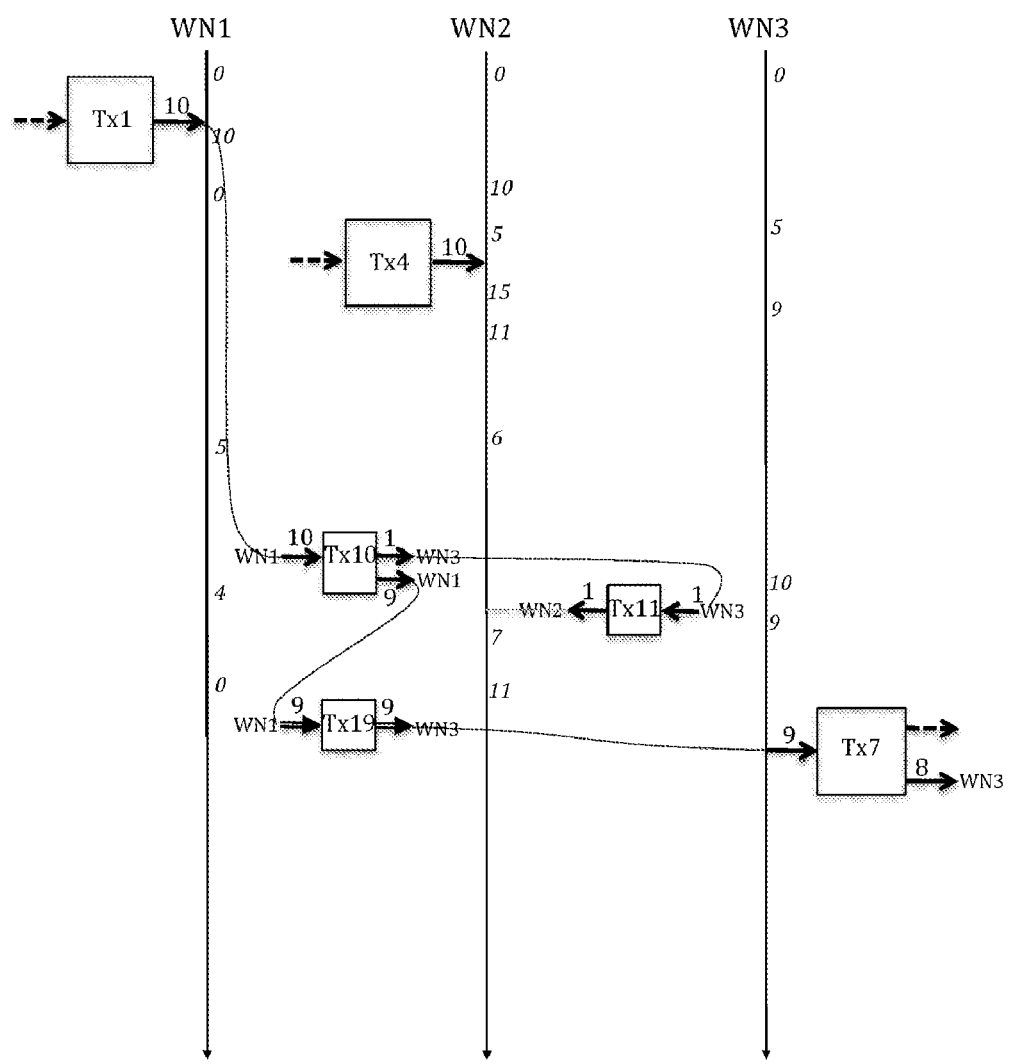
Figure 19:
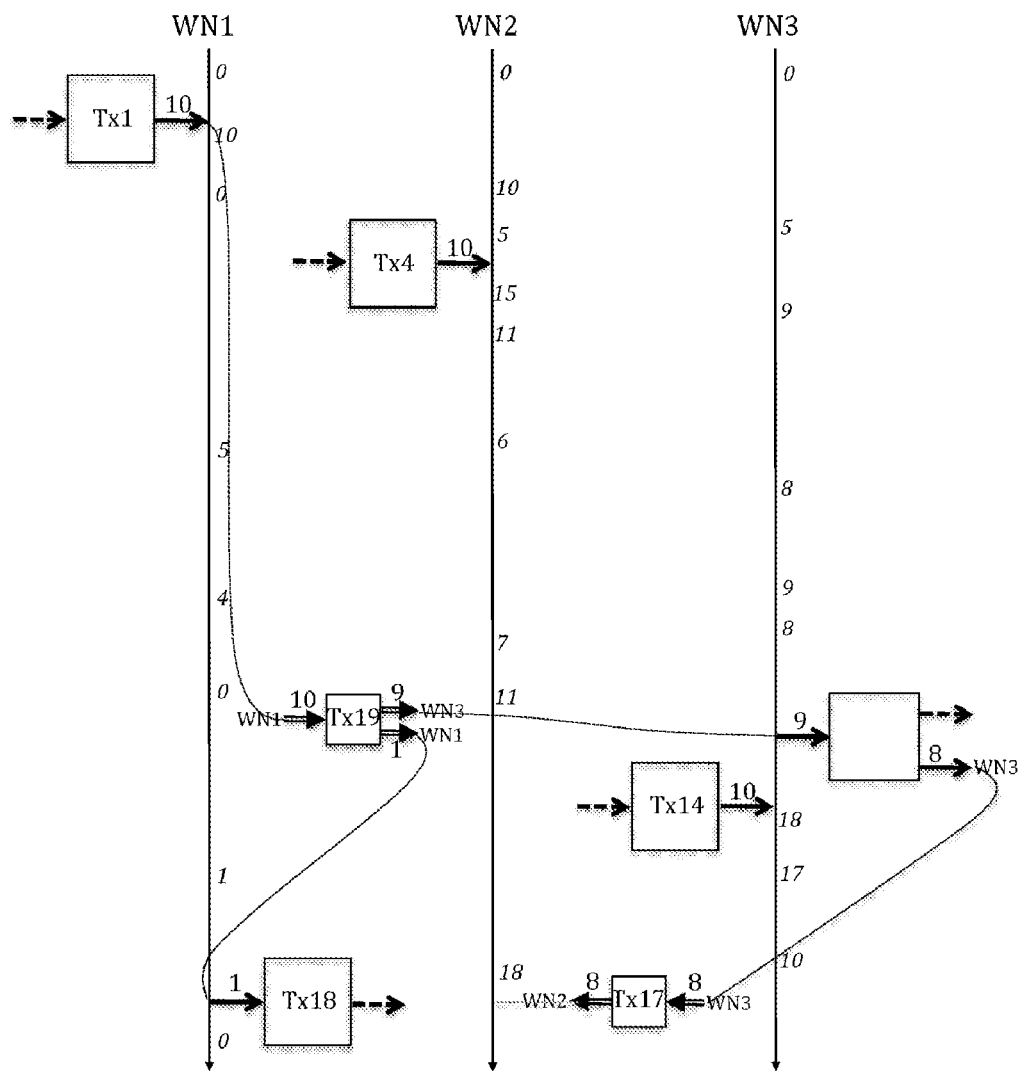
Figure 20:
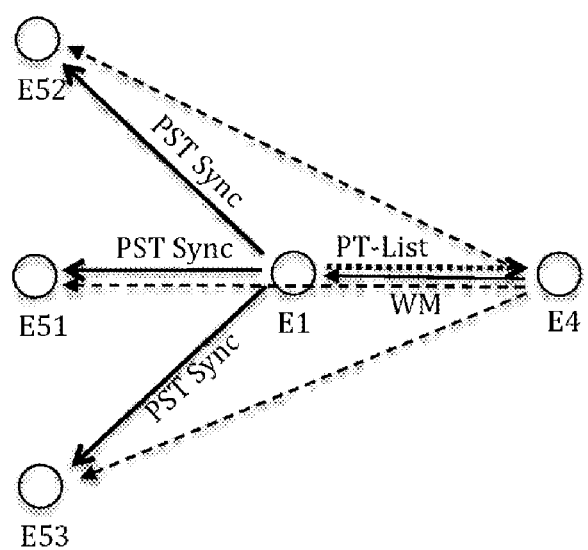
FIG. 20 diagrammatically presents the method for guaranteeing the commitments of a Wallet Node that might become unresponsive.

In order to present the generated real Bitcoin transactions, FIG. 17 repeats FIG. 13 except without Tx7 and the following being generated again. FIG. 18 shows the transaction Tx19 (9 BTCs from WN1 to WN3) which replaces the transactions Tx13 (9 BTCs from WN1 to WN2) and Tx6 (9 BTCs from WN2 to WN3, by taking 10 BTC from Tx4 and keeping for itself a change of 1 BTC) shown in FIG. 17. Lastly, as shown in FIG. 19, all nine inter-WN transactions of this example have been simplified to form a set of only two transactions (Tx19 and Tx17).

It is understood that this method can also be applied to simplify the inter-WN transaction routes in a network of more than three WNs (without limitation of this number).

It will also be noted that transactions can be replaced with a view to including the payments of transaction fees when they are broadcast.

The units of account in question (BTCs) are advantageously implemented in the form of tags and said Bitcoin transactions are tag transfer transactions of which the UAs are BTCs (as described above).

Thus, the possibility of having the UAs of tags consumed by different types of WPs (smart contracts), provided they are authorized to do this (see description of tags and CCCs) makes it possible to provide a system based on Bitcoin with the power of the smart contracts of a system such as Ethereum.

Mixed Network of WN SoCs and WN Enclaves

As a reminder, application PCT No WO2016/120826 A2 describes a system-on-chip (WN SoC) in which, in reaction to the receipt of a message by a device provided with a processor, a first program (here called "WNRoT," for "Wallet Node Root of Trust"), composed of non-modifiable instructions, loads into this system-on-chip an executable code whose hash corresponds to a given hash included in said received message. The execution which follows this executable code, in said device, is thus predetermined with respect to this received message. Said correspondence is guaranteed to the extent that appropriate access restrictions between the different portions of said system-on-chip exist and cannot be altered. The executable code thus imposed by the emitter of the message is arbitrary and able to update state variables (only the executable code having these state variables being capable of modifying them) and generate yet other messages which themselves will propagate this same hash code to yet other such devices.

The system thus makes it possible to guarantee the executable commitments (Wallet Programs or Smart Contracts) which said executable codes represent. For example, FIG. 7 of this PCT application shows a payment of 10 units of account (UA) from a node "WN 1" to another node "WN 2," the same Wallet Program, executed separately on each of these two nodes—with different input messages and on different persistent state variables, in this case these variables are UA balances—subtracting 10 UAs from the balance of WN 1 and adding 10 UAs to the balance of WN 2, a WM indicating that this payment has been sent from WN 1 to WN 2.

This guarantee only exists, however, so long as said device remains responsive (active, switched on)—a restriction lifted thanks to the mirror WNs described above (see also the section "Guarantee of commitment in case of non-responsiveness" below)—however, it will be noted that some smart contracts, such as the above-mentioned payment WP, can function even without the responsiveness constraint: even if the recipient of the payment is non-responsive, in an implementation that involves returns of WMs, the WN (here WN 2) deemed to have been paid will receive the amount paid and increase its balance accordingly as soon as it becomes responsive again.

This guarantee is due to the fact that (i) the device receiving a message reacts according to the smart contract which this message imposes, and (ii) that this message itself was generated in the context exactly of the same smart contract since it was produced by the same executable code. This device is implemented in a system-on-chip provided with a secret private key (accessible exclusively by a signature sub-system "Sign," see FIG. 5 of this PCT application) and able:

in reaction to the receipt of a message (WM) containing a hash (#WP), to load for execution, from a sub-system of arbitrary executable codes (Wallet Programs), the WP arbitrary executable code of which the hash of the content corresponds to said hash (#WP) contained in said message (WM);

before signature of a message (WM) to be emitted, to cause the signature sub-system (Sign) to generate or verify the hash of the currently loaded arbitrary executable code (#WP), for inclusion in said message (after optional encryption of this hash with other data to be transmitted), thus guaranteeing that the same hash is re-propagated from a received message to an emitted message (or, advantageously and as already described, the WNs exchange WMs including different hashes of different WPs to be executed, but whose correspondence is guaranteed by means of a common specification of the WPs to be executed, included in the WMs).

And, in the section "CMMU," another embodiment of a WN SoC has been seen here wherein basically the functions belonging to the WNs (corresponding to the functionalities of the portions Check/Load, Sign, etc.) have been encapsulated in a unit called a Cryptographic Memory Management Unit.

Now, a method will be described enabling cooperation between WN SoC type entities and secure unit type entities, here called "enclaves," embodying the principles of the WNs referred to above, specifically the principle that at each node the WP programs are encrypted and the node in question accesses these encrypted programs in a secure manner on the basis of hashes of these programs (#WP) contained in the incoming messages (WMs). Hereinafter, the term "enclave" is understood in the general sense of "TEE" (Trusted Execution Environment) and is not restricted to the SGX enclaves of Intel processors.

The term "enclave" can therefore indiscriminately refer to both the enclave itself and the secure environment capable of generating such an enclave.

Thus, a WM can be sent by a WN system-on-chip or an enclave and received by a WN system-on-chip or an enclave. The protocols used for these exchanges will now be described.

It should be remembered that, according to the format options described above, any message coming from a WN SoC has the following form:

message: nonce1, $\S_{PK2}$data . . . , nonce2, PK1, Sign$_{SK1}$(nonce1, $\S_{PK2}$data . . . , nonce2), sign$_{SK}$(PK1)

where

SK1/PK1 is the pair of private/public keys of the emitter of the message,

SK2/PK2 is the pair of private/public keys of the recipient of the message and

SK is the private key of the authority of trust representing or approving the manufacturer, certifying the public key PK1 of the emitter, $\S_{PK2}$data . . . is the content (payload) of the message, this content being encrypted with PK2, nonce2 identifies the message in question and nonce1 is the identifier of the received incoming message that triggered the processing operation that gave rise to this message, and the signature sign$_{SK}$(PK1) (called "certificate") is deemed to have been verified by the recipient of the message by decrypting it with the public key PK of the authority of trust representing or approving the manufacturer, the purpose of this verification being to ensure that the message comes from a WN SoC.

It is considered here that, on receiving any message coming from an enclave:

the certificate (the signature sign$_{SK}$(PK1) of the authority of trust) indicates that an enclave is involved and $\S_{PK2}$data . . . includes a certificate of authenticity of the program executed and the integrity of this execution.

An enclave is here characterized in that it has the following properties:

"isolation": the enclave isolates its data and processing operations and at no time is its state of execution (or execution stack) visible from the operating system;

"secret key": the enclave possesses a secret private key that only it can access;

"remote certification": the enclave is capable of providing a certificate of authenticity and integrity of execution of a program that it executes (in particular of said first WNRoT program or executed Wallet Program);

"certified": the enclave or processor that contains the enclave is certified by an authority of trust representing or approving the manufacturer of the processor (an authority that provides its signature of the public key or of the address of the enclave); and "general purpose": said first program composed of non-modifiable instructions loaded firstly into the enclave—such as WNRoT in the case of the WN protocol—can be selected from a plurality of first programs (corresponding to the protocol used).

As regards the last of the above properties ("general purpose"), as said first program can be selected from a plurality of programs, the address (or public key) of the certified enclave is insufficient to guarantee that it behaves as a WN (as was the case until now for the WN SoC); it is also necessary to ensure that said selected program is "WNRoT."

Thus, the protocol (WN protocol) of communication between wallet nodes, so that a WM can be sent from a WN1 node to a WN2 node, WN2 here being an enclave (whose certificate has been verified by WN1), comprises the following steps:

1. WN1 announces to WN2, by a pre-message, the existence of a WM to be sent to it;
2. WN2 generates a certificate (of authenticity of the program and of integrity of its current execution) for WNRoT, and returns it to WN1;
3. WN1 verifies the certificate received and (if verification is successful) sends WM to WN2.

Here, provided that these three steps occur in the same enclave that remains dedicated to this instance of the execution of the protocol and is capable of exclusively receiving the expected message, the enclave guarantees the authenticity and integrity of WNRoT, that is to say, the enclave is guaranteed to behave as a WN.

In the case where this exclusive behavior is not guaranteed (or in order to increase security if this behavior is ensured), then at step 2, WN2 generates a nonce (newly generated random number which is only used once) and sends it in addition to the certificate, and at step 3, WN1 encrypts with this received nonce the content of the WM which it sends to WN2. More precisely, the steps involved are as follows:

1. WN1 announces to WN2, by a pre-message, the existence of a WM to be sent to it;
2. WN2 generates a certificate (of authenticity of the program and of integrity of its current execution) for WNRoT, as well as a nonce, and returns the certificate and nonce to WN1;
3. WN1 verifies the certificate received, encrypts the content of the WN with the nonce received and sends it to WN2.

In a certain implementation, the WM sent at step 3 contains the hash #WP (as described above in the presentation of the WMs), and WN2 can then:
load the corresponding WP (via a Program Hash Table—PHT) and
execute it on the data contained in the WM received at step 3 (and which, if applicable, WN2 has decrypted with the nonce key).

As a variation, advantageously, at step 1, WN1 sends #WP and, at step 2, WN2 loads WP (thus using the waiting time of the WM that will be received at step 3). More precisely, the steps involved are as follows:

1. WN1 transmits #WP to WN2;
2. WN2 generates a certificate for WNRoT (and a nonce), returns the certificate (and the nonce) to WN1 and loads WP;
3. WN1 verifies the certificate received, then (encrypts with the nonce received the content of the WM and) sends the WM to WN2;
4. WN2 (decrypts the data contained in WM and) executes WP on the (decrypted) data of WM.

In the case where WN1 is an enclave—that is to say, the certificate of the key PK1 of the emitter of a received message (i.e. the signature sign$_{SK}$(PK1) of the authority of trust, which can be included in the received message or can be accessed elsewhere) indicates that WN1 is an enclave—after verifying this certificate, WN2 verifies that the message received at step 1 or 3 includes (in §$_{PK2}$data . . . ) a certificate of authenticity of the executed program and of integrity of this execution.

As previous described, in the case where the recipient of a WN is a WN SoC, the WM can directly take the following form:

message: nonce1, §$_{PK2}$data+#WP, nonce2, PK1, Sign$_{SK1}$ (nonce1, §$_{PK2}$data+#WP, nonce2), sign$_{SK}$(PK1)

which, compared to the protocol for sending a WM to an enclave, has the advantage of one step instead of three, as well as a reduced area of vulnerability.

Advantageously, if, as a result of a message received, an enclave is capable of dynamically (re)generating the derived keys "SKd,PKd" (private/public, the private key only being accessible by the enclave) from a main secret key (seal key) and from the hash #WP of a given WP, the data (or payload) of a WM other than #WP are encrypted by means of the secret derived key SKd and thus can only be decrypted by a specialized (initialized) enclave for the given WP.

Resuming the unified format, the encryption with PK2 is here replaced by an encryption with PKd2, except for #WP which is still encrypted with PK2.

message: nonce1, [§$_{PKd2}$data,] §$_{PK2}$#WP, nonce2, PK1, Sign$_{SK1}$(nonce1, [§$_{PKd2}$data,]§$_{PK2}$#WP, nonce2), sign$_{SK}$(PK1)

On receipt of a message, the recipient WN can as a first step at least decrypt #WP with its private key SK2, deriving therefrom a pair of keys SKd2,PKd2 if this has not already been done, and communicating PKd2 to the emitter if it has not already done so.

If the recipient of such a message is a WN SoC, the exchange is performed in a single message if the emitter knows PKd2, and with an additional interaction in order to communicate PKd2 to the emitter if it does not.

As previously stated, if the recipient of such a message is an enclave, the WN protocol (detailed above) involves WN2 sending to WN1 a certificate of execution and integrity of WNRoT (this condition is automatically required by WN1) before WN1 transmits the data content of the message to WN2. Thus, the approach is as follows: upon receipt of a message (WM1) containing #WP, the enclave returns the certificate for WNRoT and waits for an additional message (WM2) in order to know data, and loads (via a Program Hash Table, PHT) a WP corresponding to #WP then executes it as soon as possible on data; lastly, advantageously a random encryption key can be sent from WN2 to WN1 in order to strengthen the security since WN1 encrypts data with this key.

The invention exploits the fact that the enclaves involve a two-stage protocol (because WN1 must verify WNRoT before communicating the data content of the message) and that the derived keys also require a two-stage protocol (because the enclave must first be dynamically reconfigured on the basis of an incoming message containing a #WP), and combines these respective two stages in the following four steps:

1. WN1 transmits #WP to WN2 (in a message WM1):
message: nonce1, §$_{PK2}$ #WP, nonce2, PK1, Sign$_{SK1}$ (nonce1, §$_{PK2}$ #WP, nonce2), sign$_{SK}$(PK1)
2. WN2 generates a certificate for WNRoT (and optionally a nonce, not shown below), returns to WN1 the certificate and the derived key PKd2 (as well as, if applicable, said nonce) and loads WP:
message: nonce2, §$_{PK1}$PKd2+WNRoT, nonce3, PK1, Sign$_{SK1}$(nonce2, §$_{PK1}$PKd2+WNRoT, nonce3), sign$_{SK}$(PK2)
3. WN1 verifies the certificate received, then sends a message (WM2) to WN2 (after, if applicable, encrypting with said received nonce the content of this message);
message: nonce3, §$_{PKd2}$data, nonce4, PK1, Sign$_{SK1}$ (nonce3, §$_{PKd2}$data, nonce4), sign$_{SK}$(PK1)
4. WN2 decrypts the data §$_{PKd2}$data contained in WM2 with SKd2 (and, if applicable, said nonce) and executes WP on the decrypted data.

Advantageously, and as previously described, at step 2, the pair of keys SKd2,PKd2 is (re)derived dynamically (upon receipt of #WP from WN1 at step 1), thus avoiding the need to use the main key SK of the enclave.

Mirror Enclaves

As regards the constraints on mirror nodes, described in particular in the sections "Mirror WNs" and "Tags," "hard WNs" can be formed either by SoCs or by enclaves.

Interaction Between Wallet Nodes and the Physical World

It will be remembered that application WO2016120826A2 described the concept of "tags" associated with instances of products capable of being transferred from an entity to which an "Owner Wallet Node" (OWN) is associated to another entity to which another OWN is associated, the Tag having in this case been created by an initial OWN.

Thus, when the tag is transferred from an nth OWN to an n+1$^{st}$ OWN, it is guaranteed (by the design of the WNs) that the nth OWN will no longer keep it.

The transactions of these "tag" transfers between one OWN and the next are described in detail in the sections "Tags" and "CMMU" above.

In practice, an initial OWN assigns a randomly generated tag number to a new tag and because no other initial OWN will ever give this same number to another tag, the tag numbers are unique.

To illustrate the use of a tag, let us suppose firstly that a given tag represents a chair with the following characteristics:

- a serial number (given by the manufacturer of the chair) has been affixed beneath the chair during its manufacture, in a practically unalterable way, at least unalterable without the alteration being visible (if you look beneath the chair),
- the initial OWN is associated with the manufacturer of the chair,
- the initial OWN associates the serial number of the chair to the tag number.

In this example, the tag can advantageously be embodied by an RFID tag (glued beneath the chair) which stores, for example, the tag number, the associated serial number, and an identifier of the initial OWN (and later an identifier of the current OWN).

It should be noted that the tag could as a variation be embodied by a paper label on which this same information is written, or the tag might not be specifically embodied but be identifiable by the serial number marked beneath the chair; in fact, it is not necessary to embody the tag because the tag data are transmitted from one OWN to the next.

An embodiment will now be described where an object identified by a tag (instance of product) is associated with a WN capable of interacting, via one or more sensors and/or one or more actuators, with the outside physical world of the object in question. Hereinafter, such a WN is called a "Body SoC" or "BS"—in actual fact, the WN in question is "hosted" by said Body SoC (or by a "Body Enclave"), as described later, but for simplicity we will consider here the particular case where a BS hosts only one WN and, as somewhat loosely described in this section, these two separate entities, namely the Body SoC (which is a hardware and software entity) and the WN (which is a software entity), are amalgamated together.

Let us therefore take an example of a tag representing a lock of a main door to a dwelling. Here again, the manufacturer generates a serial number, clearly engraved on the lock and practically unalterable, and associates it with the tag number (generated by its initial OWN representing the manufacturer).

In this example, the manufacturer will advantageously associate with this lock a BS, which will be embedded unalterably in the lock and connected to a status sensor capable of indicating the current status of the lock (here "open" or "closed" in a basic embodiment), and to an actuator such as an electrical contactor powering an electromagnet in order selectively to lock or unlock the door.

The BS of the lock is capable of transmitting (by a WM) the current status of the lock to its OWN (typically associated with the caretaker of the dwelling) and the latter can, with the aid of a WM sent to the BS, operate the electrical switch to change this status (i.e. open or close the door).

In the case where a tenant, to whom another OWN is associated, leases this dwelling, the control of the BS is transferred (by a tag transfer transaction—see above) from the caretaker's OWN to the tenant's OWN, then automatically retransferred (by a reverse transaction) to the caretaker's OWN when the lease comes to an end.

Advantageously, the caretaker's OWN can verify during a procedure proposed to the caretaker (for example by an automatic character-reading/recognition means) that the serial number of the lock object in the BS associated to this lock does in fact correspond to the serial number engraved on the lock.

One aim of a BS is to provide the concerned OWNs with a current status of the associated object so as to be able to trust it and act on this object in a reliable manner.

To this end, according to one possible architecture, a BS as described here is physically separate from a sensor and/or actuator module (or from a module comprising several sensors and/or actuators) and secure means of communication are provided between the two.

FIG. 24 shows the architecture of an SoC associated with a Sensor/Actuator Module (SAM).

The connection between the BS and the SAM is achieved with the aid of a dedicated wireless connection. Preferably, this channel is equipped with means to detect the break or alteration of communication between the WN and the detector(s) or sensor(s), capable of revealing whether the sensor(s) or detector(s) have been tampered with, replaced, altered, etc.

The sensors can be of any sort: capable of performing a physical and/or chemical measurement, capable of revealing a binary state of an element of the physical world (open/closed, etc.).

The dedicated wireless connection can incorporate on the BS side and SAM side a Communications Management Unit (CMU) associated with a Wireless Communications Element (WCE).

The security of the connection between the BS and the circuit of the sensor(s) can include several aspects.

a) Securing the Physical Layer

This can be based on an electrical contact created between the BS and the circuit, or on a wireless connection. In the first instance, securing the physical layer can be achieved by determining at the BS the impedance characteristics, static or dynamic, of the sensor/actuator circuit. The impedance characteristics of the circuit, embodied for example by the waveform obtained by applying an electrical impulse, are stored at the first connection and regularly verified. A change in response indicates that the circuit has been moved, altered or even replaced.

In the case of a wireless connection (electromagnetic, optical, acoustic, . . . ), the analysis of the behavior of the connection in the time domain or in the frequency domain can also be stored at the first connection, making it possible to verify that the circuit has not been moved, altered or replaced.

It will be understood that these verifications are performed independently of the content of the messages exchanged between the BS and the circuit.

The physical connection between the BS and the circuit is thus learnt.

b) Securing the Exchanges

The exchanges can be secured according to different approaches depending on whether the sensor/actuator circuit possesses or does not possess a processing means.

In the first case, the values (usually analog) supplied by the sensor(s) can form the object of a probability test (range of possible values), or the command signals sent by the BS to an actuator can be utilized (in a way similar to the test of the physical layer) in order to verify the characteristic impedance of the circuit.

In the second case, the exchanges can be rendered secure, for example, by periodically or continuously emitting a signal from the BS to this circuit and by verifying whether the response matches an expected response. The detection of an alteration can be a detection of a substitution, a movement or a change in the operating conditions of the sensor and/or detector module, for example by a variation of the expected signal, in the communication between the WN and the circuit of the sensor(s) or detector(s).

In addition to the learning process described above, or in replacement thereof, the association between a BS and an SAM is achieved by an initial pairing procedure between the BS and the SAM, then a procedure verifying the persistence of association is performed.

In a possible form of pairing, the communication management unit provided in the BS causes the sending to the SAM, via the associated WCE element, either automatically or in the context of the execution of a WP including a pairing function, of a pairing signal, and, after specific processing of this signal by the SAM, the response is stored. This may be a response containing a unique ID of the SAM, and/or an ID resulting from the transformation of an ID sent by the BS, of an ID derived from a PUF unclonable function (see above), etc.

The persistence of the association between the BS and the module can be achieved, for example, by periodically sending, from the BS to the module via the CMU and WCE, a signal encoding a specific piece of information (frequency varies widely depending on the application, which can range, for example, from every microsecond to every day) and by verifying a received response (which can advantageously comprise a variable component so as to avoid fraud by listening in).

As the BS and SAM are paired, the signals delivered by the SAM sensor(s) and to be transmitted to the BS, and/or the command signals generated in the BS and to be transmitted to the SAM, can be transmitted from one element to the other by an appropriate protocol, capable of implementing any appropriate securing solution (encoding or encryption of data, addressing mechanism dealing in particular with the case where the same BS has connections with several SAMs, etc.).

Moreover, this same transmission can be exploited to verify that the SAM occupies a fixed position in relation to the BS (for example by a process of "distance bounding" using travel times).

Depending on the architecture chosen, the processing operations linked to pairing, to the persistence of the connection and to the transfer of data can be implemented either in a dedicated processor belonging to the CMU, or in another processing means of the BS.

Moreover, the data coming from the sensor(s) of an SAM are stored in a Sens/Act state variables memory shared by the different WPs and managed by an appropriate memory management unit, associated or not associated with the CMMU (here associated with the CMMU and designated as CMMU-S/A).

It will be understood that, depending on the nature of physical layer and the nature of the exchange protocol between the BS and the circuit, the CMUs can take very different forms. In the case of verification of a physical layer, the CMU on the BS side can comprise a simple analog electronic circuit, delivering a logic signal revealing whether the connection has been altered in relation to that established at the time of the first connection.

By contrast, in more sophisticated embodiments, the CMUs on the BS side and circuit side can comprise dedicated microcontrollers connected to the operating circuits of the wireless connection (modulation, amplification, aerial or other emitter, . . . ).

Preferably, a standard protocol is implemented so that different types of SAMs meeting this standard can be connected to the same BS.

It is also envisaged that a BS can communicate, via the same WCE or through several WCEs, with several SAMs each having their own function.

Preferably, the wireless emission/reception portion of an SAM is physically integrated in a secure manner (embedded in resin, etc.) with the physical function to be performed (sensor, actuator) so as to limit the risk of fraud with respect to the physical world.

Wireless communication between the BS and the SAM can be achieved by any of the known technologies, particularly magnetic capacitive, electromagnetic (including optical), acoustic (ultrasound), etc. technologies.

Depending on the case, the WCE will be a plate, coil or aerial, a source of electromagnetic radiation, a piezoelectric or equivalent element, etc.

Depending on the technology chosen, the CMU will comprise appropriate modulation and amplification circuits.

In the case of Near Field Communication (NFC), it is possible, in a particular embodiment, to create an SAM based on an off-the-shelf sensor or actuator, to which is added an off-the-shelf NFC tag (or other RFID tag), the exchange protocol with the NFC tag enabling the pairing and persistence described above. The transmission of actuating signals or captured signals, which in this particular case is not ensured by the NFC tag, is managed in this case by a specific additional interface, wired or wireless.

According to another embodiment, a programmable NFC module equipped with wired input/output pins for the sensor(s) and actuator(s) is used. Everything is encapsulated, with a battery if applicable, in order to achieve physical integrity.

In these last two embodiments, an important aspect of security is that the sensor/NFC tag unit is not moved in relation to the BS. This security feature can be implemented in a particularly advantageous manner by analyzing one or more parameters of the time domain of the wireless transmission between the BS and the tag (duration of the pulses, pulse lag, amplitude of the wave component of the pulses, pulse fall time, etc.).

This security feature can be further enhanced by analyzing one or more parameters of the frequency domain of the transmission (spectrum values).

Body Enclave and WN SoC Mixed Network

A method will now be described that enables cooperation between:
WN system-on-chip type entities (as described in PCT Application no. WO2016/120826 A2 and above in this text) and
so-called "body enclaves," capable of executing WPs and having access to input/output and memory means, such as the WN enclaves described above, but in addition:
each capable of hosting a plurality of WNs (real WN or countersigner WN) which are dynamically initialized upon receipt of messages, capable of sharing WPs between different hosted WNs, capable of handling
   not only data at each hosted WN (such as tags) and data (PSV) at each WP of a hosted WN,
   but also data at the body enclave,
capable of being connected to the real world by sensors and actuators (SAM), and
capable of storing the data of sensors and actuators and sharing them between different hosted WNs and different WPs of a hosted WN, selectively.

The pair of private/public keys (SK/PK) of each WN hosted by a body enclave is generated (blindly, without revealing it) by the first body enclave that hosts it, then, advantageously, transmitted to the body enclaves that host its countersigners (also blindly, the private key SK remaining secret), this generation enabling the hosted WNs to receive the message contents (payload) encrypted by means of their public keys PK (alternatively, a hosted WN can receive contents encrypted with a derived key—see below the method using a pair of derived keys "SKd,PKd").

The WN enclaves described above in the section "WN SoCs and WN Enclaves Mixed Network" are regarded here as a particular case of body enclave including only one WN.

The approach described in the section "WN SoCs and WN Enclaves Mixed Network" is resumed here, however, in the WN protocol (in order to send a WM from a node WN1 to a node WN2), in the case where the receiver node WN2 is hosted in a body enclave (called "Body 2" below), the address of WN2 (derived from its public key) is also transmitted, so as to enable Body2 to initialize in relation to WN2 (and not only in relation to #WP). Thus, for example, the first variation described in the section "WN SoCs and WN Enclaves Mixed Network" is modified as follows (the messages are shown here diagrammatically to indicate the approach, without this constituting a limitation):

1. WN1 transmits #WP as well as the address of WN2 to a body enclave Body2 hosting WN2
   message: nonce1, $\S_{PKBody2}$WN2+#WP, nonce2, PK1, Sign$_{SK1}$(nonce1, $\S_{PKBody2}$WN2+#WP, nonce2), sign$_{SK}$(PK1)
2. Body2 generates the certificate relating to the execution of WNRoT, returns this certificate to WN1, initializes for WN2 and loads WP
   message: nonce2, $\S_{PK1}$att(WNRoT), nonce3, PK2, Sign$_{SKBody2}$(nonce2, $\S_{PK1}$att(WNRoT), nonce3), sign$_{SK}$(PK1)
3. WN1 verifies the certificate received, then sends to Body2 a data content encrypted with the public key PK2 of WN2
   message: nonce3, $\S_{PKBody2}\S_{PK2}$data, nonce4, PK1, Sign$_{SK1}$(nonce3, $\S_{PKBody2}\S_{PK2}$data, nonce4), sign$_{SK}$(PK1)
4. WN2 decrypts data and executes WP on data.

Also adopting the same approach as that described in the section "WN SoCs and WN Enclaves Mixed Network," advantageously, in the case where, as a result of a message received, an enclave is capable of dynamically generating derived keys "SKd/PKd" (private/public, the private key being accessible only by the enclave) based on a main secret key (seal key) and a WN2 address of the wallet node receiving the message (and optionally of the hash #WP if the advantage of not using the secret key of WN is desired) specified in the message,
   the data (or payload) of the message, i.e. the data other than the address WN2 of the receiver node (and the identification #WP of the WP to be executed) are encrypted by means of the secret derived key Skd and can thus only be decrypted by a specialized enclave for the given wallet node WN2 (and the given WP).

Going back to the unified format, the encryption with PK2 is thus replaced by an encryption with PKd2, except for WN2 (and #WP) that are still encrypted with PK2.
   message: nonce1, [$\S_{PKd2}$data+#WP,] $\S_{PK2}$WN2, nonce2, PK1, Sign$_{SK1}$(nonce1, [$\S_{PKd2}$data+#WP,] $\S_{PK2}$WN2, nonce2), sign$_{SK}$(PK1)
(or
   message: nonce1, [$\S_{PKd2}$data,] $\S_{PK2}$WN2+#WP, nonce2, PK1, Sign$_{SK1}$(nonce1, [$\S_{PKd2}$data,] $\S_{PK2}$WN2+#WP, nonce2), sign$_{SK}$(PK1))

Upon receipt of a message, the recipient WN can initially at least decrypt WN2 (or WN2+#WP) with its private key SK2, derive therefrom a pair of keys SKd2,PKd2 if this has not already been done, and communicate PKd2 to the emitter if it has not already been communicated.

If the recipient of such a message is a WN SoC, the exchange is done in a single message if the emitter knows PKd2, and, if it does not, with one additional interaction in order to communicate PKd2 to the emitter.

As stated above, if the recipient of such a message is a body enclave, the protocol (detailed below) involves WN2 sending to WN1 a certificate of execution and integrity of WNRoT (this is a condition automatically required by WN1) before WN1 will transmit the data content of the message to WN2. The following approach is therefore adopted: upon receipt of a message (WM1) containing WN2 (+#WP), the enclave initializes for WN2, returns the certificate for WNRoT and waits for an additional message (WM2) to know data, and loads (via a Program Hash Table—PHT) a program WP corresponding to #WP then executes it as soon as possible on data.

The invention exploits the fact that the enclaves use a two-stage protocol (because WN1 must verify WNRoT before communicating the data content of the message) and that the derived keys also require a two-stage protocol, because the body enclave must first be reconfigured on the basis of an incoming message containing a WN2 (+#WP), and combines these two respective stages in the following four steps:

1. WN1 transmits WN2+#WP to Body2 (in a message WM1):
   message: nonce1, $\S_{PKBody2}$WN2+#WP, nonce2, PK1, Sign$_{SK1}$(nonce1, $\S_{PKBody2}$WN2+#WP, nonce2), sign$_{SK}$(PK1)
2. Body2 verifies the signatures, decrypts $\S_{PKBody2}$WN2+#WP, retrieves PKd2 from WN2, generates a certificate for WNRoT, returns to WN1 the certificate and the derived key PKd2, initializes WN2 and loads WP:
   message: nonce2, $\S_{PK1}$PKd2+att(WNRoT), nonce3, PK1, Sign$_{SK1}$(nonce2, $\S_{PK1}$PKd2+att(WNRoT), nonce3), sign$_{SK}$(PK2)
3. WN1 verifies the signatures and the received certificate, then sends a message (WM2) to WN2 transmitting data:
   message: nonce3, $\S_{PKd2}$data, nonce4, PK1, Sign$_{SK1}$(nonce3, $\S_{PKd2}$data, nonce4), sign$_{SK}$(PK1)
4. WN2 decrypts the data $\S_{PKd2}$data contained in WM2 with SKd2 and executes WP on the decrypted data.

Advantageously and as stated above, at step 2, the pair of keys SKd2,PKd2 is (re)derived dynamically (upon receipt of WN2 (+#WP) from WN1 at step 1) and it is then possible to avoid using the main key SK of the enclave.

Body SoCs

Unlike body enclaves, body SoCs are dedicated (to the processing operations of the WNs, with tags and sensors): they are not general-purpose.

The section "CMMU—Crypto Memory Management Unit" described the CMMU. Here, upon receipt of a message intended for a given WN (specified in the message—see above the description of messages transmitting § $_{PKBody2}$WN2+#WP), the CMMU initializes with respect to the NSVs and Tags, belonging to the recipient WN, as well as with respect to the PSVs for the #WP indicated in the message. FIG. 22 is a diagrammatic presentation of the interactions between the different parts (PROCESSOR, CMMU, MEMORY) of the system:

1) Receipt by CMMU of a message containing the input data of a program to be executed as well as the address of the recipient WN and the hash of said program;
2) CMMU locates in the PHT table, based on said hash, said encrypted program, loads it into its cache and decrypts it (block by block); also, the CMMU initializes with respect to the data capable of being accessed in MEMORY (namely: NSVs, Tags, PSVs, etc.);
3) CMMU transmits on the fly (one block at a time) the decrypted program to PROCESSOR for execution;
4) If applicable, PROCESSOR requests access to said previously created data or creates/updates them and requests that they be stored, or deletes them, and
5) CMMU accesses and decrypts/encrypts and stores said data;
6) If applicable, PROCESSOR prepares a message to be emitted, and
7) CMMU inserts therein the hash of said program in the process of execution and its signature by means of the secret key and emits the message.

With reference to FIG. 23, the CMMU of a body SoC is capable of receiving the emitted WMs
- by executing a WP program, or
- by the user on a terminal to which the Body SoC is connected, or even by another device ("Quasi-WM" messages), messages which in both cases contain the address of the recipient WN and the hash #WP of the program to be executed within the context of this WN.

Upon receipt of a WM and for each tag transfer transaction received (see below the section "GuardWN, GuardTx and GuardedTx"), the CMMU of the body SoC is advantageously capable of verifying the required intersections of the set of mirror nodes described above.

Figure 25:
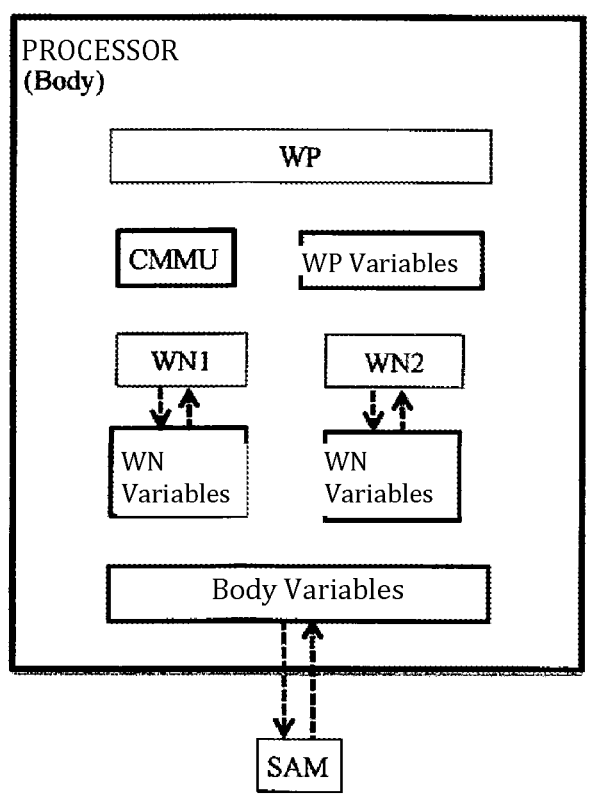
FIG. 25 presents in the form of an operational block diagram the manner in which the Body-SoC potentially implements different WNs, and the different types of memories.

Lastly, with reference to FIG. 25, the CMMU manages the data coming from the sensor(s) of an SAM, it being possible for these data to be shared by different WNs and by different WPs of a WN. The Figure below is a diagrammatic presentation of a hard WN (Body Enclave or SoC) and illustrates the fact that it manages its sensor/actuator data independently, these data being shared by the different hosted real WNs (and these data being transmitted to its mirrors).

Mirror Body SoCs and Body Enclaves

With regard to the constraints on the mirror nodes described particularly in sections "Mirror WNs" and "Tags," the "Hard WNs" can now be formed
- either by the body SoCs,
- or by the body enclaves, and, according to that described above, the securing of a network of nodes capable of executing WP programs in response to the receipt of WM messages comprises, advantageously, the following two architectures in combination:
- at each body SoC or enclave node, the WPs are encrypted and the node in question (its CMMU or its root program WNRoT respectively) accesses these encrypted programs on the basis of the hashes of these programs (#WP), contained in the incoming messages,
- at each body SoC or enclave node, an architecture determining the countersigner nodes (body SoC or enclave), duplicating messages from/to the countersigner nodes, and determining the identical character of the messages received.

More precisely, as regards the second architecture, in the network of body SoC and body enclave nodes, the nodes being capable of assigning different connection weights to one another, at each node:
- based on the connection weight values, at least one countersigner node is assigned to the node in question, having in relation thereto a connection weight greater that a threshold,
- a list of countersigner nodes is kept of nodes capable of receiving messages from the node in question, each node and its countersigner nodes forming a set of mirror nodes and
- when a message must be sent by an emitter node to a receiver node, this message is sent (redundantly) by at least some of the mirror nodes of the emitter node to at least some of the mirror nodes of the receiver node, and the receiver node validates the message only if:
  - the respective sets of mirror nodes of the emitter and receiver nodes have an intersection whose number of elements exceeds a given threshold and if
  - the receiver node has received this same message (redundantly) from at least one given fraction of said mirror nodes belonging to this intersection.

Furthermore, when the message in question contains a tag transfer transaction (of units of value), the receiver node only validates the message (as described below) if the respective sets of mirror nodes of at least some of the guardWNs of the tags in question and of the receiver node have an intersection whose number of elements (being Body SoC or enclave) exceeds a given threshold.

The method of securing body SoC and body enclave nodes by guardWNs will now be described.

GuardWN, GuardTx and GuardedTx

This aspect of the invention ensures that, for a transaction (for the transfer of tags such as BTCs) transmitted in a WM to a receiver WN, it is sufficient for only some of leaves of the tree upstream of this transaction (uptree) to have a certain number of mirror nodes in common with said receiver WN in order for the latter to accept this WM.

Definitions (Some are Reminders or Additions to Definitions)

Value tag (or "tag"): Data (such as a certain BTC amount) representing a certain amount of units of account of a certain type. An "uptree" is associated to a tag.

Transaction (or "tx"): Transfer of tags from at least one upstream WN to at least one downstream WN (except for "generation txs" which are created ex-nihilo and do not have an upstream). The incoming tags come from upstream txs (except for generation txs) and the outgoing tags are intended for beneficiary WNs (or other types of signers), which can in particular be multi-signatures ("n-of-m multi-sig"). A tx thus has tags associated with its inputs and its outputs respectively, the total sums of tags associated with the inputs being equal to the total sums of tags associated with the outputs (except for generation txs). It is considered here that, as in Bitcoin, each input refers to one and only one output of an upstream tx.

Generation tx: Tx having no input.

Uptree (or "upstream tree," or even "provenance tree"): An assembly (with a tree structure) composed of a considered given tx and txs feeding the latter; a tree whose root node is said considered given tx and wherein, for each node of the tree, the upstream txs of a node (that is to say the txs whose outputs feed the inputs of this node) are its child nodes. The leaves (the farthest upstream transactions) of an uptree are called "guardTxs."

Dtree (or "downstream tree," or even "distribution tree"): An assembly (with a tree structure) composed of a considered given tx and txs fed by the latter; a tree whose root node is said considered given node and wherein, for each node of the tree, the downstream txs of a node (that is to say the txs whose inputs are fed by the outputs of this node) are its child nodes.

GuardTx (or "incoming tx"): Tx fed by a tx considered (by its beneficiary and by the downstream beneficiaries) as being inserted/confirmed in a blockchain or generated ex-nihilo (generation tx). The WN generating a guardTx is called a "guardWN." The dtree of a guardTx is composed of txs called "guarded Txs."

GuardWN: WN having generated a considered guardTx (of which each tx of the dtree, including the guardTx itself, has it as a signer associated with all the outputs—hence the name of "guardedTxs" given to them). It is said that the guardWN "guards" a guardTx and the guardedTxs of the dtree of this guardTx.

Tx guarded by a given guardWN: Tx whose said given guardWN is a signer on all the outputs. GuardedTx: Tx of which:
 at least one of the signers (on an input) is a guardWN;
 each output (there may be one or more outputs) is associated with:
  either only said guardWN,
  or a multisig of which one of the signers is said guardWN,
 said guardWN guaranteeing that the downstream txs (which are fed by these outputs) are also guardedTxs guarded by said guardWN.

It will be understood that, with this model, if a guardWN is trusted, all of the txs of its dtree are trusted.

It is thus proposed that the receiver WN of a WM transmitting a given tx only directly accepts it if it has mirror nodes (body SoC or enclaves) in common with the guardWNs guarding this tx. If it does not, the receiver WN can optionally insert the txs of the uptree into the blockchain (after their replacements for simplification and additions of transaction fees, as described above) or use a payment channel (on a protocol such as Lightning Network).

Figure 26:
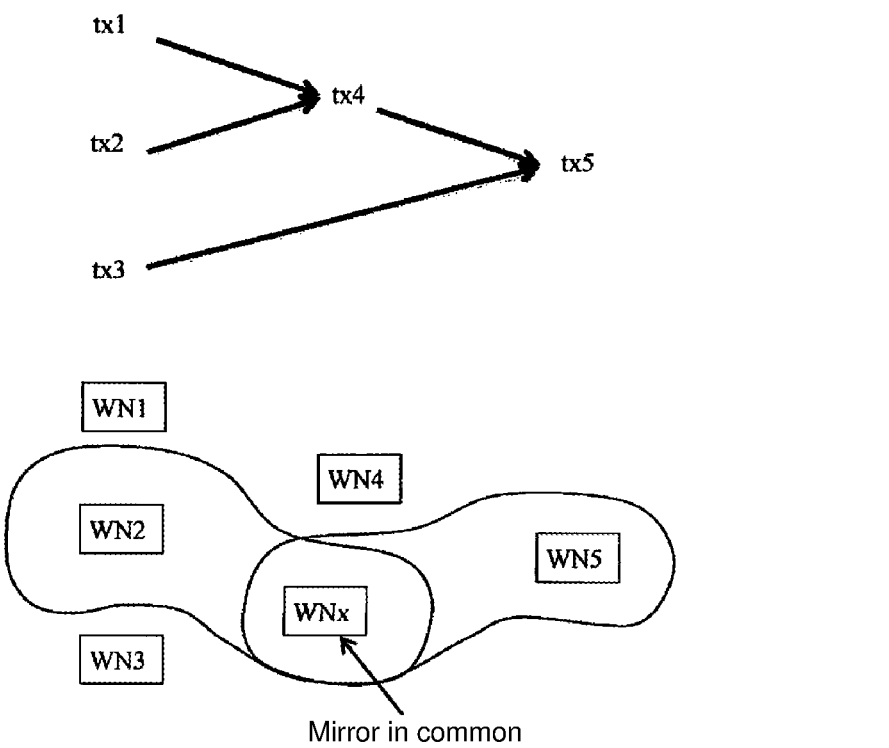
FIG. 26 shows a function for securing tree chain transactions.

FIG. 26 shows a simplified example with an uptree of five transactions tx1 to tx5, and the existence of a mirror (WNx) in common between a GuardWN—WN2—having generated transaction tx2, and the WN—WN5—generating the farthest downstream transaction tx5. In this example, WN5 can accept tx4 provided that it has a certain number (depending on configuration parameters) of WNx mirrors (Body SoC or enclave) in common with the GuardWNs WN1, WN2 and WN3 (or with only some of them, provided that the additions of collateral signers have been made, see description below).

Figure 27:
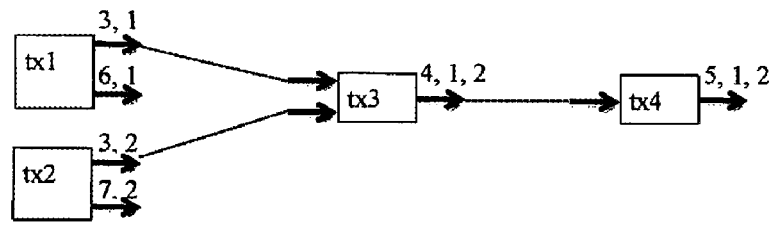
FIGS. 27 to 29 diagrammatically present tree chain transactions not compulsorily broadcast and an associated securing process.

FIG. 27 shows transactions tx1, tx2, tx3 and tx4 which are generated by WNs "1," "2," "3" and "4" respectively. Here tx1 and tx2 are guardWNs. The numbers on their outputs represent the WNs whose respective signatures are required on the inputs that these outputs feed. Thus, the first output of Tx1 requires a signature of WN 3 as well as the signature of guardWN 1, and so on.

Here, tx3 and tx4, as guardedTxs, must reproduce on their respective outputs the fact of requiring signatures 1 and 2 on the inputs of subsequent transactions which they feed. It is thus that the required signatures of guardWNs propagate downstream step by step—for example, tx3 requires that tx4 is signed by guardWNs 1 and 2, and the latter (as well as their "hard WN" mirrors, redundant for greater reliability) will only sign tx4 if this requirement is re-propagated to subsequent transactions, and so on step by step. The entire dtree from each guardWN is thus secured.

Method of Adding Collateral Signers

According to the method of this aspect of the invention, on generating a guardedTx whose inputs are fed by the upstream txs guarded by different guardWNs, all of the outputs of this guardedTx are generated as multisigns whose signatories include these different guardWNs (collateral WNs).

In the case in point, it is advantageous to combine the branches of the uptree in order to offer the downstream WNs "OR" options rather than the "AND" conditions of guardWNs (with which it is necessary to have mirror nodes in common).

Definition of "collateral guardWNs": these are nodes being the respective guardWN signers required by the outputs of transactions feeding the same downstream transaction in common. It is thus advantageous to add the collateral guardWNs to the required signers. More precisely: Upon generation of a guardedTx, whose inputs are fed by the upstream txs guarded by different (collateral) guardWNs, said txs are replaced by txs guarded (on all their outputs) by all of these different guardWNs (completing them on both sides), and this process continues step by step upstream, up to the leaves of the uptree (the guardTxs).

With reference to the preceding Figure, guardWNs 1 and 2 are (by definition) collateral due to the fact that they feed the same transaction (tx3).

Figure 28:
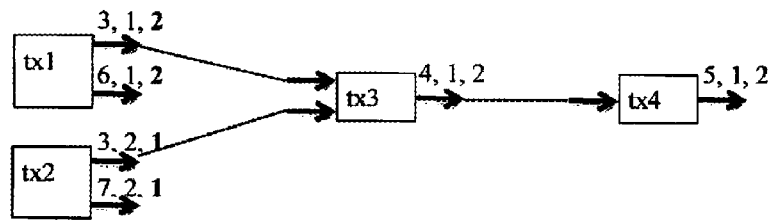

FIG. 28 shows the result of applying the method (of adding the collateral signers by replacing the upstream transactions in question) for the example of the preceding Figure. It will be seen that the signature of guardWN 2 (in bold) is now also required on the input fed by tx2.

As the replacement in question adds said requests for signatures of collateral guardWNs on all the outputs of the transactions in question (tx1 and tx2), the second output of tx1 now also requires the signature of guardWN 2, and because now 1 and 2 jointly control the dtree of tx1, the downstream WNs will not need to have mirrors in common with 1 and with 2, but with 1 or with 2. (Clearly, this method cannot be applied too many times, but serves to reduce the number of guardWNs that need to be in mirror form.)

Variable Ceilings of Payment Channels

Payment channels that are "Multi-hop Layer 2 Network (on Bitcoin, Ethereum, etc.)" channels are known, the most successful of which is currently the Lightning Network [https://lightning.network/lightning-network-paper.pdf] implemented by using multisig operators, "CheckLockTimeVerify," "CheckSequenceVerify" and a very ingenious method of exchanging secrets for de facto invalidation of a previous version of a set of transactions. As previously described in the section "Off-chain Bitcoin Transactions," such off-chain transactions can be generated by WNs, with the advantage that they will not be revealed (blindness), the entire method offering greater trust, the blockchain serving as a last resort if the WN is tampered with.

Figure 29:
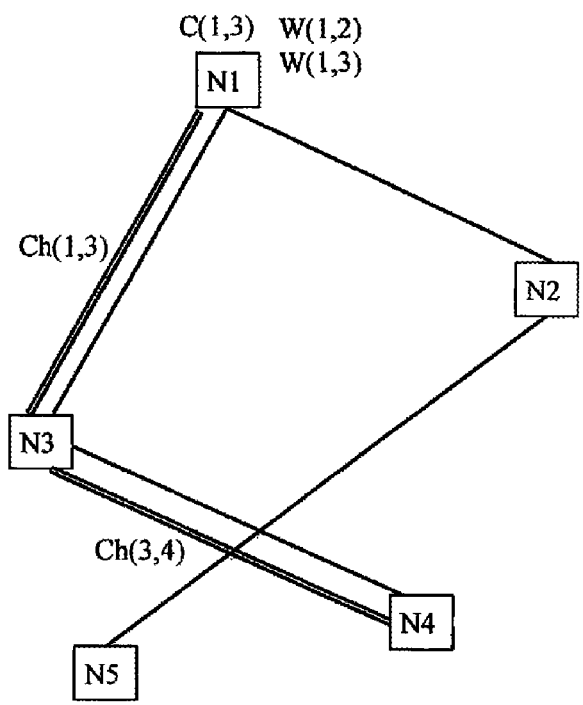

FIG. 29 is a diagrammatic presentation of nodes exchanging units of account through compulsory non-broadcast transactions via payment channels between nodes, each node having a channel (Ch(i,j)) with another node possessing a ceiling (C(i,j)) of units of account that can be transferred by this channel with no need for broadcasting. A transfer of units of account between two nodes can be performed via a chain of nodes having in pairs a payment channel. The nodes possess connection weights (W (i,j)) in relation to other nodes, representative of a degree of trust or proximity between the nodes or users associated with the nodes. The ceilings of units of account of a given node on a given channel (deposits made when setting up the channel) are here adjusted (increased) depending on a connection weight of said node in relation to the node with which it possesses said given channel. The weight of one node in relation to another node is typically determined on the basis of the existence of real (IRL) connections or quasi-real connections within the node's surrounding.

Clearly, the present invention is not limited to the embodiments and aspects described above. Furthermore, with his general knowledge will know how to combine all the embodiments and other aspects capable of offering particular advantages.

The invention claimed is:

1. Secure processor (SoC; enclave), characterized in that it is capable of hosting a plurality of WNs of a network, and in that it comprises a cryptographic memory management unit (CMMU) with encryption, capable of ensuring a secure execution of programs in which:
   stored (or dynamically regenerated) in the CMMU is a secret program encryption key that can only be accessed by the CMMU;
   the CMMU is capable of storing at least one program to be executed after encryption by the CMMU with the aid of said secret key and of generating a hash of the or of each program enabling the encrypted program to be found;
   said processor is capable of executing programs only at the command of the CMMU;
   the interactions between network nodes are performed exclusively by messages and the messages are received/emitted exclusively by the CMMU;
   the messages contain the identification of a receiver WN hosted in the processor and the identification of a certain program to be executed by the receiver WN, identified by its hash;
   in response to the receipt of a message:
   the processor initializes as a receiver WN and the CMMU (i) accesses the encrypted program to be executed by this WN on the basis of the hash of the program received in the message (specifically via a PHT), (ii) decrypts the program instructions, and (iii) transmits to the processor to execute the decrypted instructions concerning said received data,
   the processor storing for each hosted WN a pair of keys intended for the signature of contents of messages generated by said WN with the aid of the private key of said pair.

2. Secure system-on-chip (SoC), in which is stored in a manner that is accessible only by the SoC, a private SoC key, or the SoC is capable of dynamically regenerating this private key, the SoC being capable of communicating with another device through messages and being capable of executing smart contracts (WP) in response to the receipt of messages, and of storing at least one smart contract to be executed in secure processing conditions, the SoC also comprising means of communication between the system and an external module comprising at least one sensor and/or an actuator, these means comprising, at least on the system side, a communication management unit (CMU), and means of securing said communication capable of preventing at least the replacement of one module by another module, the execution of at least one smart contract being capable of receiving as input from said management unit a sensor datum coming from said module and/or of emitting as output an activation datum to said module.

3. System-on-chip according to claim 2, comprising means of signing with the aid of said private key a sensor datum received from the module in the context of the execution of a smart contract, and of sending said signed datum to another secure device constituting a party to the smart contract.

4. System-on-chip according to claim 2, comprising means of receiving a signed activation instruction from another secure device constituting a party to a smart contract, in order to verify said signature and to apply said instruction to said module.

5. System-on-chip according to claim 2, wherein the security means comprise a means of learning at least one permanent property of the connection between the SoC and the module.

6. System-on-chip according to claim 5, wherein the learning means are capable of storing said property at said connection, and the securing means are capable of periodically comparing the current property with the stored property.

7. System according to claim 5, wherein the connection is wired and said property is an impedance property.

8. System according to claim 5, wherein the connection is wireless, and said property comprises at least one characteristic of the time and/or frequency domain of said connection.

9. System according to claim 8, wherein said property comprises a combination of characteristics of the time and/or frequency domain of said connection.

10. System according to claim 8, wherein the module comprises a part forming an RFID tag.

11. System according to claim 8, wherein the module comprises a standard wireless communication tag fixed in a tamper-proof way to an off-the-shelf sensor and/or actuator.

12. System according to claim 11, wherein the tag is an RFID label.

13. System according to claim 2, wherein the security means comprise means of logical pairing between the system and the module.

14. System according to claim 13, wherein the security means comprise means of verification of the persistence of pairing.

15. System according to claim 13, wherein the means of verification of the persistence of pairing and/or the means of communication comprise the sending of a nonce to the module and the analysis of a response from the module taking said nonce into account.

16. System according to claim 2, which comprises a specific memory for data from the sensor and/or actuator coming from/bound for said module and a management unit of said memory capable of reading and/or writing data into said memory during the execution of a smart contract from among the smart contracts authorized to access these data.

17. System according to claim 16, wherein said memory management unit forms part of a general memory management unit (CMMU) also comprising a management unit of the access to a memory of smart contracts (WP) and a memory of data (PSV) respectively associated with the different smart contracts.

18. System according to claim 17, wherein said general memory management unit also comprises a management unit of a memory for units of account (tags) received by transactions included in messages (WMs), capable of reading and/or writing data in said unit of account memory during the execution of a smart contract from among the smart contracts authorized to access these units of account.

19. System according to claim 17, wherein the general memory management unit (CMMMU) is capable of loading a smart contract (WP) for execution from a smart contract designation (#WP) contained in a message (WM) arriving in the system.

20. System according to claim 2, wherein sensor and/or actuator data coming from/bound for said module are transmitted on the fly between a means of execution of a smart contract and the communication management unit.

* * * * *